(12) United States Patent
Schneider et al.

(10) Patent No.: US 9,134,130 B1
(45) Date of Patent: Sep. 15, 2015

(54) MISSION PLANNING SYSTEM AND METHOD

(71) Applicant: Telos Corporation, Ashburn, VA (US)

(72) Inventors: Jeffrey R. Schneider, Leesburg, VA (US); Rosario Ramil C. Alfonso, Ashburn, VA (US); Anbby G. Chua, Ashburn, VA (US); Mary Benadette J. Cornista, Manila (PH); Alwyn M. Balingit, Manila (PH); Emmanuel N. Ramos, Manila (PH); Lizette Concessa P. Asilo, Manila (PH)

(73) Assignee: Telos Corporation, Ashburn, VA (US)

( * ) Notice: Subject to any disclaimer, the term of this patent is extended or adjusted under 35 U.S.C. 154(b) by 0 days.

(21) Appl. No.: 14/230,954

(22) Filed: Mar. 31, 2014

(51) Int. Cl.
| | |
|---|---|
| *G06Q 10/04* | (2012.01) |
| *G01C 21/34* | (2006.01) |
| *G01C 21/00* | (2006.01) |
| *G05D 1/00* | (2006.01) |
| *G06T 19/00* | (2011.01) |
| *G01C 21/20* | (2006.01) |
| *G08G 5/00* | (2006.01) |
| *G01C 21/22* | (2006.01) |
| *G09B 19/00* | (2006.01) |

(52) U.S. Cl.
CPC ............... *G01C 21/00* (2013.01); *G01C 21/20* (2013.01); *G01C 21/22* (2013.01); *G01C 21/34* (2013.01); *G05D 1/00* (2013.01); *G05D 1/0088* (2013.01); *G06Q 10/047* (2013.01); *G06T 19/00* (2013.01); *G06T 19/003* (2013.01); *G08G 5/003* (2013.01); *G08G 5/0034* (2013.01); *G08G 5/0039* (2013.01); *G09B 19/00* (2013.01)

(58) Field of Classification Search
CPC ...... G09B 19/00; G06T 19/00; G06T 19/003; G05D 1/0088; G05D 1/00; G08G 5/0034; G08G 5/0039; G08G 5/003; G06Q 10/047; G01C 21/00; G01C 21/34; G01C 21/20; G01C 21/22
USPC ............... 701/23, 25, 26, 408, 409, 467, 522, 701/532, 533, 537, 538; 434/11; 345/419; 340/995.1, 995.19; 348/113, 116
See application file for complete search history.

(56) References Cited

U.S. PATENT DOCUMENTS

| | | | | |
|---|---|---|---|---|
| 6,122,572 | A | * | 9/2000 | Yavnai .......................... 701/23 |
| 6,134,500 | A | * | 10/2000 | Tang et al. .................... 701/528 |
| 2009/0234521 | A1 | * | 9/2009 | Kumar et al. .................. 701/19 |
| 2011/0216059 | A1 | * | 9/2011 | Espiritu et al. ................ 345/419 |
| 2011/0256511 | A1 | * | 10/2011 | Cragg ............................ 434/11 |

OTHER PUBLICATIONS

"TELOS SE7EN: Mission Planner User Guide", Mar. 2012, Telos Corporation.

* cited by examiner

*Primary Examiner* — Russell Frejd
(74) *Attorney, Agent, or Firm* — Miles & Stockbridge PC

(57) ABSTRACT

A system and method for planning missions is provided. The system includes at least one client computer coupled to a network, and a server, coupled to the network, that includes a processor coupled to a memory storing instructions that, when executed by the processor, perform a method for planning missions that includes providing a graphical user interface (GUI) to the client computer, creating a mission including a plan, updating the plan and providing the updated plan to the client computer.

20 Claims, 67 Drawing Sheets

MISSION PLANNING SYSTEM AND METHOD

TECHNICAL FIELD

The present invention relates to planning, and, more particularly, to mission planning systems and computer-based methods.

BACKGROUND

Mission planning generally involves the use of sand tables, physical models and paper-based documents, maps and overlays to plan missions for a variety of applications, such as, for example, defense and intelligence applications, first responder applications, commercial applications, and the like. Defense and intelligence applications include, for example, mission planning and training, wargaming, after action review, etc. First responder applications include, for example, situation awareness, hazardous route planning, emergency response rehearsal, etc. Commercial applications include, for example, supply chain and logistics, shipping and delivery planning, etc.

These mission planning methods can be costly and time consuming, do not necessarily support real-time testing and review, and may require extensive rework when missions need to be modified or iterated. While certain aspects of mission planning have been implemented in software programs installed on individual computers, there is a need for an interactive electronic sand table that allows users to create, plan and fully manage missions and logistical routing in a collaborative geospatial environment.

SUMMARY

Embodiments of the present invention advantageously provide systems and computer-based methods for planning missions. One embodiment of the present invention provides a system for planning missions that includes at least one client computer coupled to a network, and a server, coupled to the network, that includes a processor coupled to a memory storing instructions that, when executed by the processor, perform a method for planning missions. One embodiment of a method for planning missions includes providing a graphical user interface (GUI) to a client computer, creating a mission including a plan, updating the plan and providing the updated plan to the client computer.

In this embodiment, the GUI includes a mission center screen and a plan edit screen, the mission center screen has a mission panel and a plan panel, and the plan edit screen has at least a map layer and a mission element panel.

The mission and plan are created in response to a sequence of requests from the client computer. The plan has a plurality of sequential stages, each stage has a plurality of sequential waypoints, and each waypoint has a plurality of symbols and associated movement paths along the map layer.

The plan is updated, in response to a further request from the client computer, by changing the movement path end location associated with a symbol in a waypoint of a stage, and changing the movement path start location associated with the symbol in either the subsequent waypoint of the stage or the first waypoint of the subsequent stage.

The plan is also updated, in response to a further request from the client computer, by changing the movement path start location associated with a symbol in a waypoint of a stage, and changing the movement path end location associated with the symbol in either the preceding waypoint of the stage or the last waypoint of the preceding stage.

The updated plan is then provided to the client computer.

There has thus been outlined, rather broadly, certain embodiments of the invention in order that the detailed description thereof herein may be better understood, and in order that the present contribution to the art may be better appreciated. In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
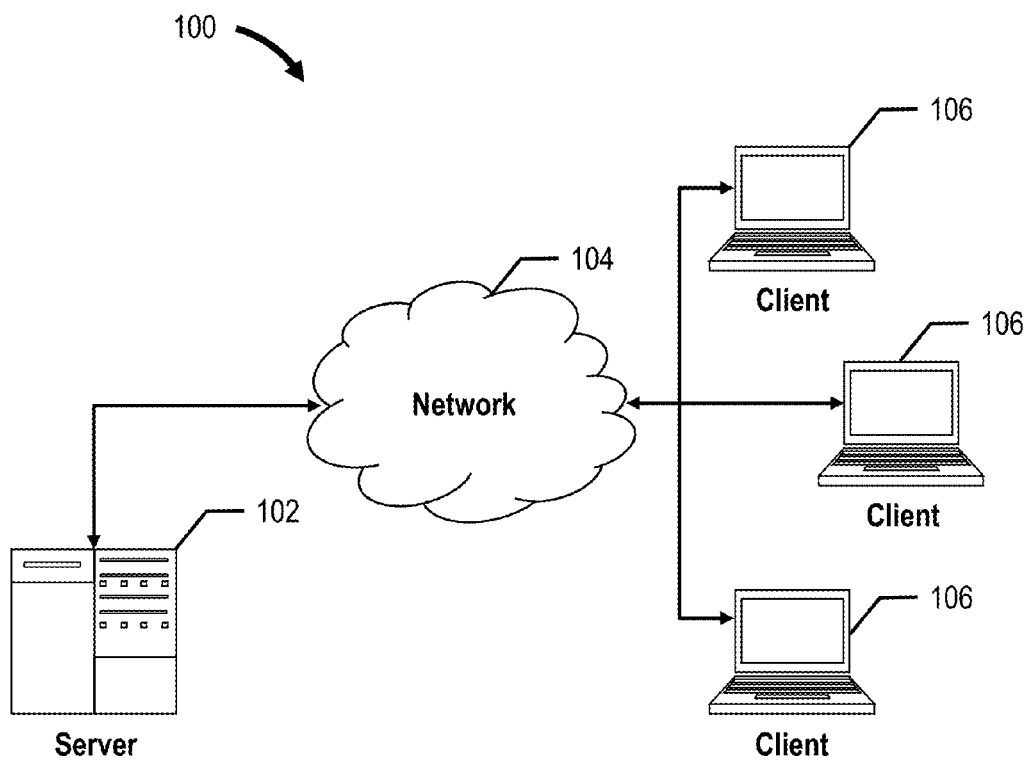
FIG. 1 is a diagram of a system for planning missions, in accordance with an embodiment of the present invention.

The invention will now be described with reference to the drawing figures, in which like reference numerals refer to like parts throughout. Embodiments of the present invention advantageously provide systems and computer-based methods for planning missions, as described in more detail below.

FIG. 1 is a diagram of a system 100 for planning missions, in accordance with an embodiment of the present invention. System 100 includes at least one server 102 coupled to a network 104, and at least one client computer 106 coupled to the network 104. The client computer 106 may be any type of portable or non-portable personal computing device, such as, for example, a personal digital assistant (PDA), smart phone, tablet computer, laptop computer, notebook computer, desktop computer, etc., while the server 102 is a dedicated computer appropriately-configured to respond to requests from client computers 106 over the network 104, such as, for example, a personal computer, a server appliance, an enterprise server, a rack server, a tower server, a blade server, a minicomputer, etc. The network 104 may couple the server 102 to the client computer 106 using one or more network topologies, architectures and protocols, such as, for example, wired and/or wireless networks, local area networks (LANs), wide area networks (WANs), virtual private networks (VPNs), secured and/or unsecured networks, Ethernet, LocalTalk, Token Ring, FDDI, WiFi, TCP/IP, etc. Data encryption techniques may protect data flowing through the network 104, as well as data stored on servers 102 or client computers 106.

In the embodiment depicted in FIG. 1, the system 100 employs a client-server architecture, which advantageously employs network computing resources, such as the server 102, to effectuate the mission planning process, while the client computers 106 provide the user interface platform. Additionally, data associated with planning a mission may be remotely acquired and communicated, over network 104, to the server 102 for processing, analysis and incorporation into the mission planning process. Data may be stored in one or more local or network storage systems coupled to, or forming a part of, server 102, and may be input using a variety of input devices and computer systems, such as, for example, client computers 106. Generally, these data may include sensor data, environmental data, geographic data, asset data, target data, Internet-based multimedia data, etc.

In other embodiments, mission planning, as well as data processing and analysis, may occur on a single computer coupled to the network 104, such as a single client computer 106. In alternative embodiments, mission planning, as well as data processing and analysis, may occur in a peer-to-peer architecture using multiple computers coupled to the network 104, such as two or more client computers 106. Generally, client computers 106 execute a combination of COTS operating system and application software, as well as one or more mission planner software applications or modules. Non-transitory computer-readable medium, such as, for example, non-volatile memory, optical disks, etc., may be used to store instructions for execution by the processors of server 102 and client computers 106. These instructions embody the various aspects of the present invention discussed below.

Figure 2:
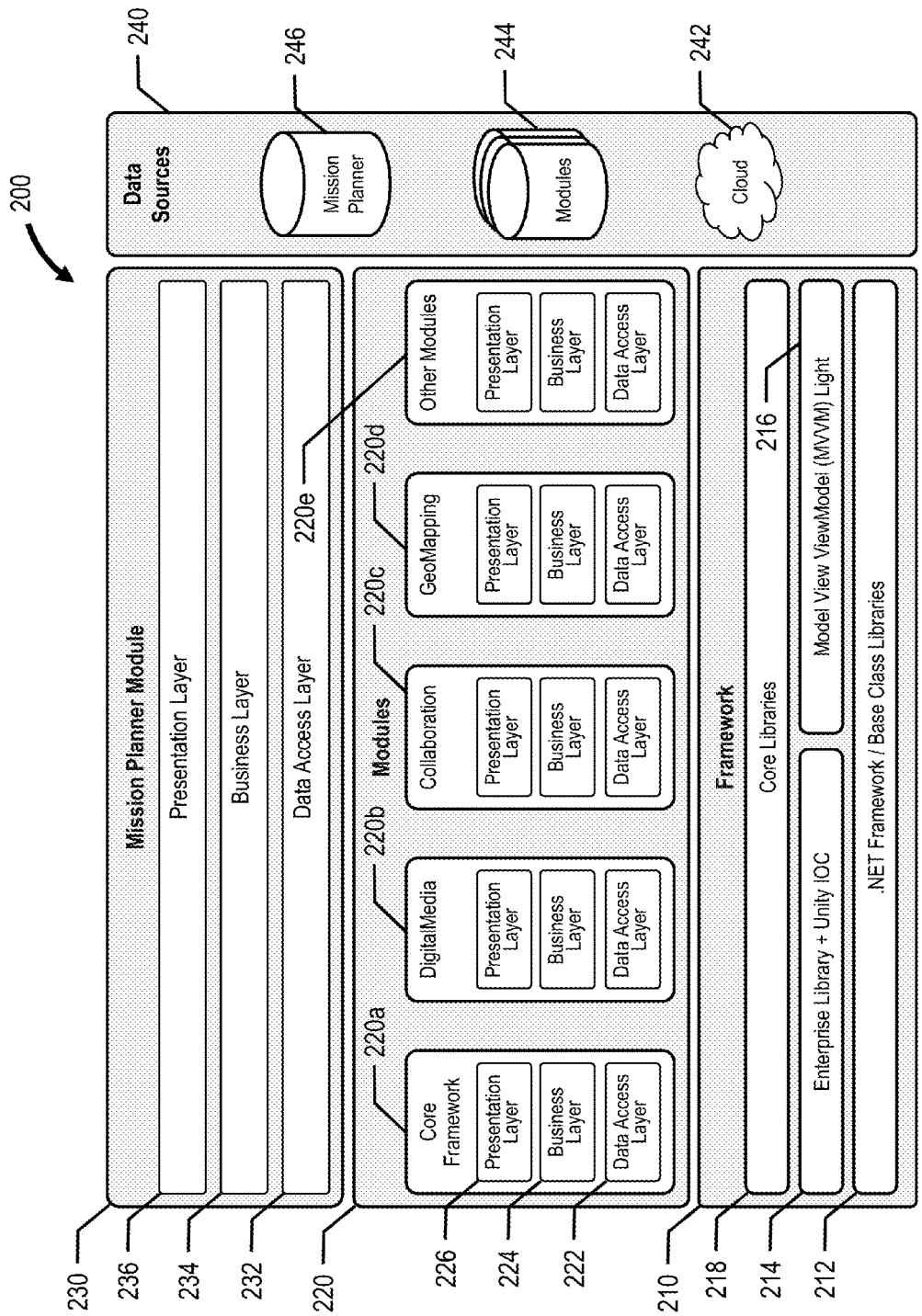
FIG. 2 is a diagram of a software system architecture, in accordance with an embodiment of the present invention.

FIG. 2 is a diagram of a software system architecture 200, in accordance with an embodiment of the present invention. In a preferred embodiment, Object Oriented Programming (OOP) techniques provide a foundation for software system architecture 200, which includes framework 210, supporting modules 220 and mission planner module 230. Other software applications may also be provided. Data sources 240 provide data to one or more of these components. In this embodiment, software applications, such as mission planner module 230, are user-executable programs, while supporting modules 220 provide common, higher-level functionality for software applications. Generally, a software application or module that uses OOP techniques employs classes, which may be arranged into one or more class libraries, to define data and associated procedures that represent complex data, concepts, real-world entities, etc. At runtime, the software application or module creates or instantiates objects from these classes, which interact to effectuate the purpose(s) for which the software application or module was written. The use of other programming techniques, such as, for example, imperative, functional, structured, etc., in combination with OOP techniques, is also contemplated by the present invention. Classes, class libraries, software applications and modules may be written using a variety of programming languages that support one or more of these programming techniques, such as C, C++, C#, Java, Visual Basic, XAML/WPF, SQL, WCF, WPF, etc.

Framework 210 advantageously provides common, lower-level functionality for both supporting modules 220 and mission planner module 230, including, for example, comprehensive visualization and presentation of data, enhanced collaboration in multi-user environments, integration with disparate data sources, custom development and design that may be touch-optimized for various hardware, software and mobile platforms, interoperability with existing and legacy systems, access to real-time or near real-time information, secure communication and data sharing, etc.

In one embodiment, framework 210 includes a .NET Framework/Base Class Libraries component 212, an Enterprise Library/Unity IOC component 214, a Model View ViewModel (MVVM) component 216, as well as additional core libraries 218. Framework component 212 includes an application virtual machine that provides security, memory management, exception handling, etc., for supporting modules 220 and mission planner module 230, as well as one or more base class libraries that provide user interface components, data access services, network communications, etc. Framework component 214 includes a collection of classes that provide services for common application requirements such as, for example, logging, caching, encryption, etc., as well as an IOC container to support dependency injection. Framework component 216 includes one or more class libraries that support a Model View ViewModel (MVVM) architecture for supporting modules 220 and mission planner module 230, which separates the graphical user interface (GUI), i.e., the view, from the business logic or back end, i.e., the model. Framework 218 includes an additional collection of classes and utilities that offer specific functionality not provided in the other framework 210 components. In this embodiment, framework 210 runs on Microsoft Windows; other embodiments may support other software platforms, including, for example, Apple OS X and iOS, etc.

In one embodiment, supporting modules 220 include core framework module 220a, digital media module 220b, collaboration module 220c, geomapping module 220d, common feature module 220e, as well as other modules not depicted in FIG. 2, such as, for example, a 3D module, an asset management module, a command and control module, a risk assessment module, a presentation module, etc. Each supporting module 220 includes a data access layer 222, business layer 224 and presentation layer 226, and may include additional layers, components or functionality, which are explained in more detail below. Similarly, mission planner module 230 includes a data access layer 232, business layer 234 and presentation layer 236, and may include additional layers, components or functionality. The data access layers 222, 232 represent data access logic, the business layers 224, 234 represent the business objects and logic for the module or application, and the presentation layers 226, 236 represent the user interface for the module or application. As noted above, software applications, such as mission planner 230, access supporting modules 220a-e for various functionality and support services.

Figure 3:
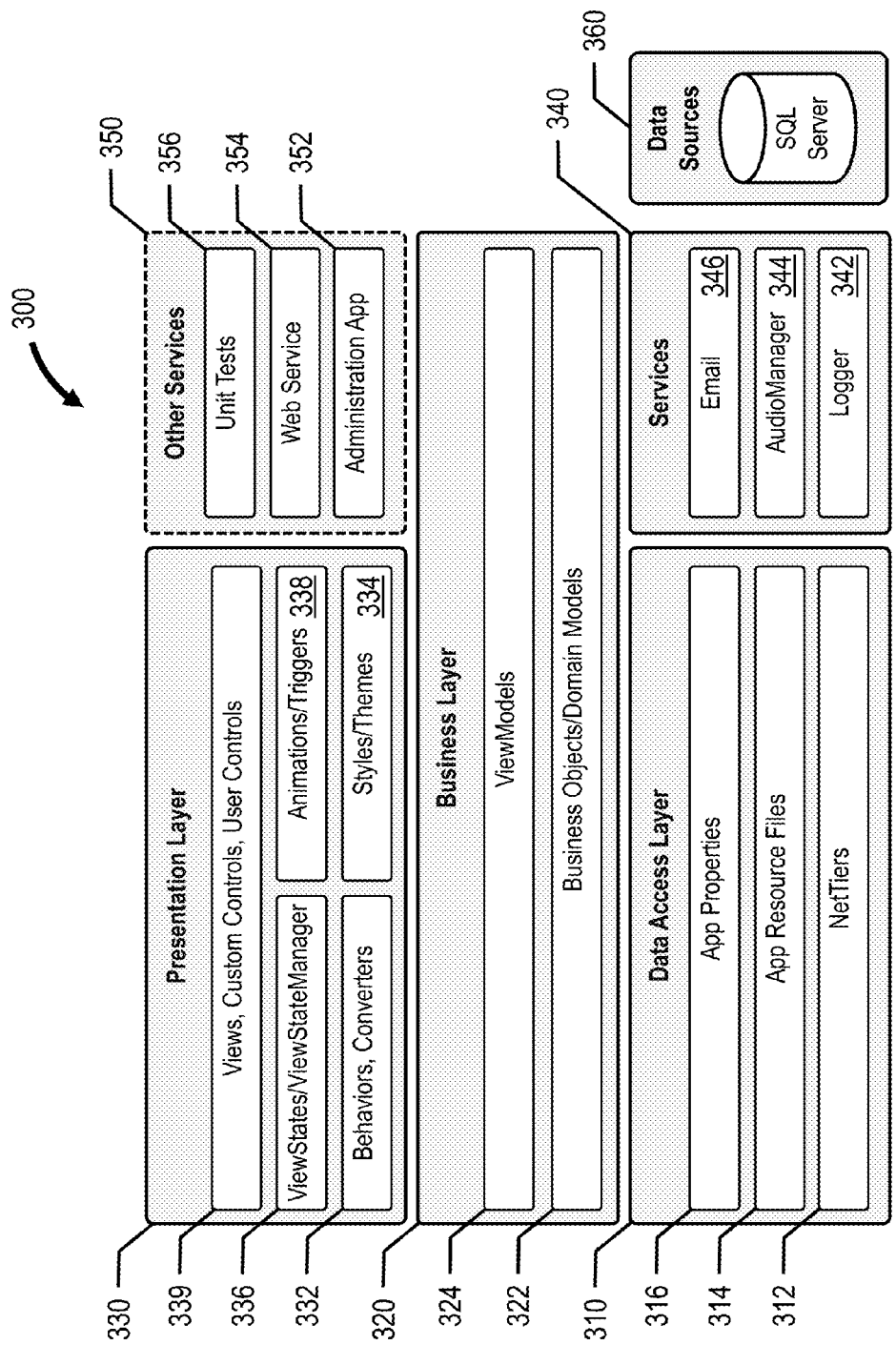
FIG. 3 is a diagram of a software module architecture, in accordance with an embodiment of the present invention.

FIG. 3 is a diagram of a module architecture 300, in accordance with an embodiment of the present invention. In one embodiment, module architecture 300 includes a data access layer 310, a business layer 320, a presentation layer 330, services components 340 and 350, and data sources 360. Data access layer 310 includes a NetTiers component 312 that facilitates creating customized application tiers in .NET software applications, an app resource files component 314 that contains module level resources such as, for example, images, style, audio, etc., and an app properties component 316 that contains module level configurations. Business layer 320 includes a business objects/domain models component 322 and a ViewModels component 324, which provide the respective model and view components for the particular software module or application. The presentation layer 330 includes a behaviors/converters component 332, a styles/themes component 334, a ViewStates/ViewStateManager component 336, an animations/triggers component 338 and a view, custom controls and user controls component 339. The behaviors/converters component 332 represent scripts that are attached to visuals to affect their interaction with other visuals, and objects that provide ways of transforming and using data within XAML. The styles/themes component 334 defines how views will look. The ViewStates/ViewStateManager component 336 handles various states and transitions for views, such as, for example, normal, expanded, busy, etc. The animations/triggers component 338 are XAML entities that represent changes in the user interface.

Services layer 340 includes a logging component 342, an audio manager component 344 and an email component 346. Services component 350 includes an administration application 352 that manages the tables and data for the software module or application, a web service component 354 that may expose the business objects for consumption by other systems, and a unit tests component 356 that may be created to test the various objects in the business layer 320.

In preferred embodiments, mission planner module 230, in combination with the other elements of system 100 and software system architecture 200, effectuates the many aspects of the present invention. In order to set the context for the various aspects of the present invention, the "Telos® SE7EN™: Mission Planner 2.4 User Guide" (March 2012) is incorporated herein by reference in its entirety.

In preferred embodiments, the mission planner module 230 is a multi-user, collaborative digital sand table application for map-based mission planning. The mission planner module 230 allows users to create, customize and playback missions using plans that include stages and waypoints. The mission planner module 230 may include standard symbol sets, some of which may advantageously comply with certain standards, such as, for example, the MIL-STD-2525B military Symbol standard, the "Department Of Defense (DOD) Interface Standard: Common Warfighting Symbology," NATO's Allied Procedural Publication 6A (APP-6A) Military Symbols for Land Based Systems, etc.

In some embodiments, users may create and manage missions using, but not limited to, hand gestures, and, in certain embodiments, the application 230 leverages touch enabled operating systems, such as Microsoft Windows 7, allowing users to navigate through data sets. The user manipulates the map using these gestures or by using a mouse. For example, the mouse wheel or other button can be used to zoom in or out of the map. In the ensuing description, use of a mouse is presumed.

Figure 4:
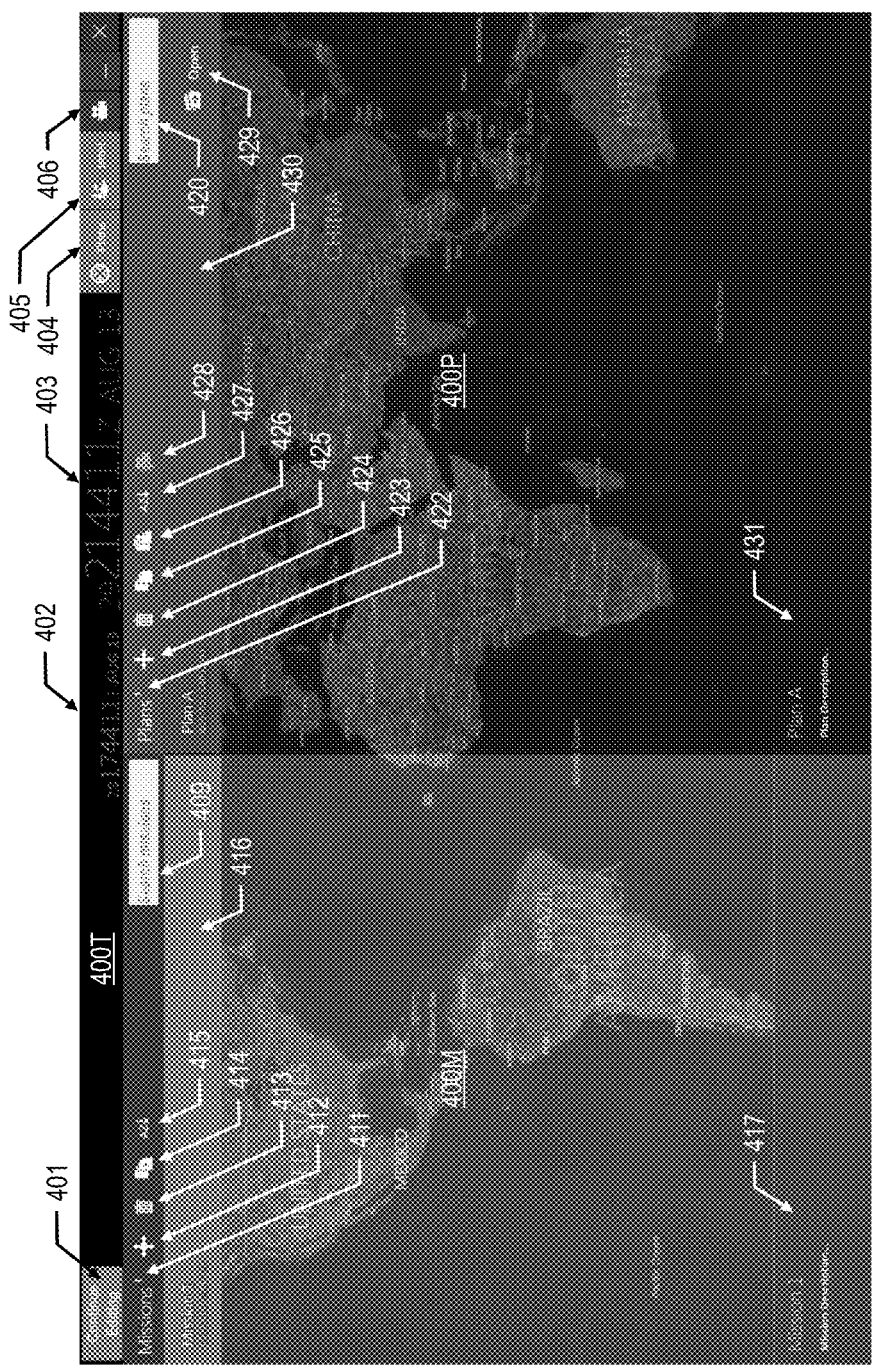
FIG. 4 presents a missions center screen of a graphical user interface for a mission planning module, in accordance with an embodiment of the present invention.

FIG. 4 presents a missions center screen 400 of a graphical user interface for mission planning module 230, in accordance with an embodiment of the present invention. The missions center screen 400 displays missions and plans created by users, and appears after the mission planning module 230 is launched by the user. The missions center screen 400 includes a toolbar 400T, a missions panel 400M and a plans panel 400P.

The toolbar 400T includes a continue editing command 401, a Juliet military date time group display 402, a Zulu military date time group display 403, a plans tab 404, an intel tab 405, a launch videos panels command 406, and minimize and exit commands. The continue editing command 401 allows users to return to the plan being edited or viewed, which appears when exiting a plan being edited or viewed. The Juliet military date time group display 402 displays the date and time of the machine on which the mission planner module 230 is executing. The date and time format is DDHHmmSSJ MMM YY. For example, Ser. No. 10/135,057J Oct 11 represents 13:50:57 Juliet time on the 10th of October, 2011. The Zulu military date time group display 403 displays the standard military date and time in the following format: DDHHmmSSZ MMM YY. For example, 27154501Z Aug 11 represents 15:45:01 Zulu time (which is to say UTC) on the 27th of August, 2011. The plans tab 404 launches the plans panel when the mission intel panel is open. The intel tab 405 launches the mission intel panel. The launch videos panel command 406 launches the videos panel.

The missions panel 400M displays all commands and listing for viewing and managing missions, and includes, inter alia, a search mission field 409, a mission counter 411, an add mission command 412, a delete mission command 413, a duplicate mission command 414, a sort missions command 415, a missions listing 416, a mission info panel 417, etc. The search mission field 409 allows users to search missions. The mission counter 411 displays the number of missions in the missions listing. The add mission command 412 allows users to create a new mission. The delete mission command 413 allows users to delete the selected mission, including all of the associated plans, stages, and waypoints. The duplicate mission command 414 allows users to create a duplicate copy of a selected mission. The sort missions command 415 allows users to sort the missions listing by alphabetical order or by date of creation. The missions listing 416 displays all missions, including names and date and time of creation. When a mission name is selected, the mission info panel displays the selected mission's name and description. The mission info panel 417 displays the selected mission's name and description, and allows editing of this information.

The plans panel 400P displays all commands and listing for viewing and managing plans, and includes, inter alia, a search plan field 420, a plan counter 422, an add plan command 423, a delete plan command 424, a copy plan command 425, a paste plan command 426, a sort plans command 427, a create video command 428, an open plan command 429, a plans listing 430, a plan info panel 431, etc. The search plan field 420 allows users to search plans. Users can enter a partial or full plan name in the search field. The plans counter 422 displays the number of plans in the plans listing. The add plan command 423 allows users to create a new plan. The delete plan command 424 allows users to delete the selected plan, including all of the associated stages and waypoints. The copy plan command 425 allows users to create a copy of the selected plan, including all of the stages and waypoints of the duplicated plan. The paste plan command 426 allows users to paste the selected plan that has been copied within the same mission or another mission. The sort plans command 427 allows users to sort the plans listing by alphabetical order or by date of creation. The create video command 428 allows users to create a video recording of a selected plan. The open plan command 429 takes the user to the plan edit screen. The plans listing 430 displays all plans in a selected mission, including names and date and time of creation. When a plan name is selected, the plan info panel displays the selected plan's name and description. The plan info panel 431 displays the selected mission's name and description, and allows editing of this information.

Figure 5:
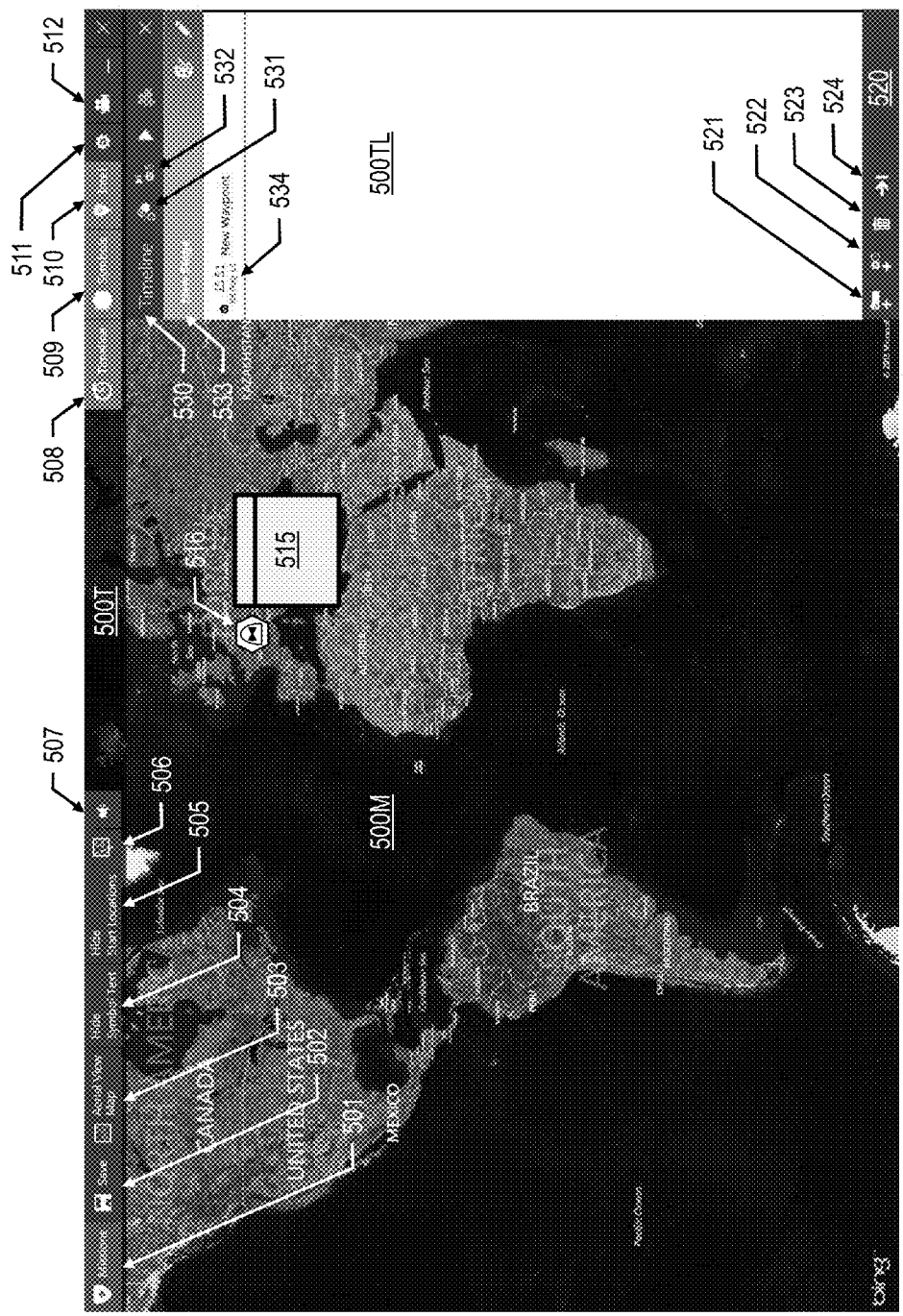
FIG. 5 presents a plan edit screen of a graphical user interface for a mission planning module, in accordance with an embodiment of the present invention.

FIG. 5 presents a plan edit screen 500 of a graphical user interface for a mission planning module 230, in accordance with an embodiment of the present invention. The plan edit screen 500 is presented when an open plan command 429 associated with a particular plan is selected in the plans panel 400P of the missions center screen 400. The plan edit screen 500 includes a toolbar 500T, a map 500M, and a timeline panel 500TL.

The toolbar 500T includes, inter alia, a missions command 501, a save command 502, a map view command 503, a show/hide symbol text command 504, a show/hide start locations command 505, a clear workspace command 506, an alert sound command 507, a timeline tab 508, a symbols tab 509, an intel tab 510, a settings tab 511, and a videos tab 512. The missions command 501 allows users to return to the mission center screen 400. The save command 502 allows users to save all the changes or modifications made on the selected plan, including the associated stages and waypoints. The map view command 503 allows users to set the map view, including aerial view, road view and WMS map view. The map view command 503 symbol changes according to the selected map view mode. The show/hide symbol text command 504 allows users to enable or disable the display of symbol text, which may include, inter alia, unique designation and higher information (e.g., infantry 132nd). The show/hide start locations command 505 allows users to disable or enable faded symbol that marks the starting position of each symbol in the waypoint. The clear workspace command 506 allows users to hide all open symbol context and map intel context menus. The disable/enable alert sound command 507 allows users to turning off or on the alert sound.

Several tabs are presented in the toolbar 500T that, when selected, present various panels to the user in the right side of the plan edit screen 500, including a timeline tab 508, a symbols tab 509, an intel tab 510, a settings tab 511 and a videos tab 512. The timeline panel 500TL is displayed by default when the plan edit screen 500 is first presented to the user. The timeline tab 508 displays the timeline panel 500TL. The symbols tab 509 presents a symbols panel 500S (shown in subsequent figures) that allows users to view and select symbols for a mission. The intel tab 510 displays an intel panel (not shown) that allows users to view the map intelligence data associated to the selected plan. The settings tab 511 displays a settings panel (not shown) that allows users to modify the settings for symbol and intel pushpin sizes. The videos tab 512 displays a video panel (not shown) that allows users to view the list of plans queued for video recording.

The timeline panel 500TL displays the stages and waypoints for the plan. A toolbar 520 is located at the bottom of the panel, and a media bar 530 is located at the top of the panel. The timeline panel toolbar 520 includes, inter alia, an add stage command 521, an add waypoint command 522, a delete command 523, and a go to the last waypoint command 524. The media bar 530 displays playback and record options, and includes, inter alia, an animate all symbols command 531, a step-by-step waypoint command 532, as well as a play all command, a create video command, and a close timeline panel command. The timeline panel 500TL also include a stage bar 533 for each stage, a waypoint bar 534 for each waypoint within each stage.

A symbol context menu 515 appears when a symbol 516 plotted on the map 500M is selected. The symbol context menu 515 allows users to view and modify symbol information. In one embodiment, the symbol context menu 515 provides several tabs, including, inter alia, an information tab, a nesting tab and a path drawing tab (tabs not shown for clarity). The information tab allows users to view and/or modify symbol attributes, such as, for example, SDIC description, hierarchy, category, unique designation, higher formation, speed, weight, etc. The custom movement parameters, found under the information tab, affect business rules, such as the speed with which that symbol moves on the map, as well as other data. The information tab also provides management of the symbol's path, providing deletion of the path segment, entire path, or the symbol itself and also allows for expanding the context menu view. The nesting tab allows users to access and manage nested child symbols. The path drawing tab allows users to manage path drawing mode.

To create a mission, the user selects the add mission command 412 in the mission panel 400M of the missions center screen 400. The mission planner module 230 will then create and display the new mission in the mission list 416 in the mission panel 400M. The mission name and description can be modified by the user. In one embodiment, the mission planner module 230 instantiates a mission object based on a mission class in accordance with object oriented programming techniques, and populates the mission object with the relevant data. Additionally, the mission planner module 230 also creates a default plan for the new mission, a default stage for the plan, and a default waypoint within the stage. The plan is displayed within the plans listing 430 in the plans panel 400P of the missions center screen 400. The plan name and description can be modified by the user. In one embodiment, the mission planner module 230 instantiates a plan object based on a plan class in accordance with object oriented programming techniques, links the plan object to the mission object, and populates the plan object with the default data. The plan class may include classes and/or data structures representing the stages and waypoints of the plan; alternatively, the stages and waypoints may be separate classes, and stage and waypoint objects may be instantiated as needed, and linked accordingly.

Figure 6A:
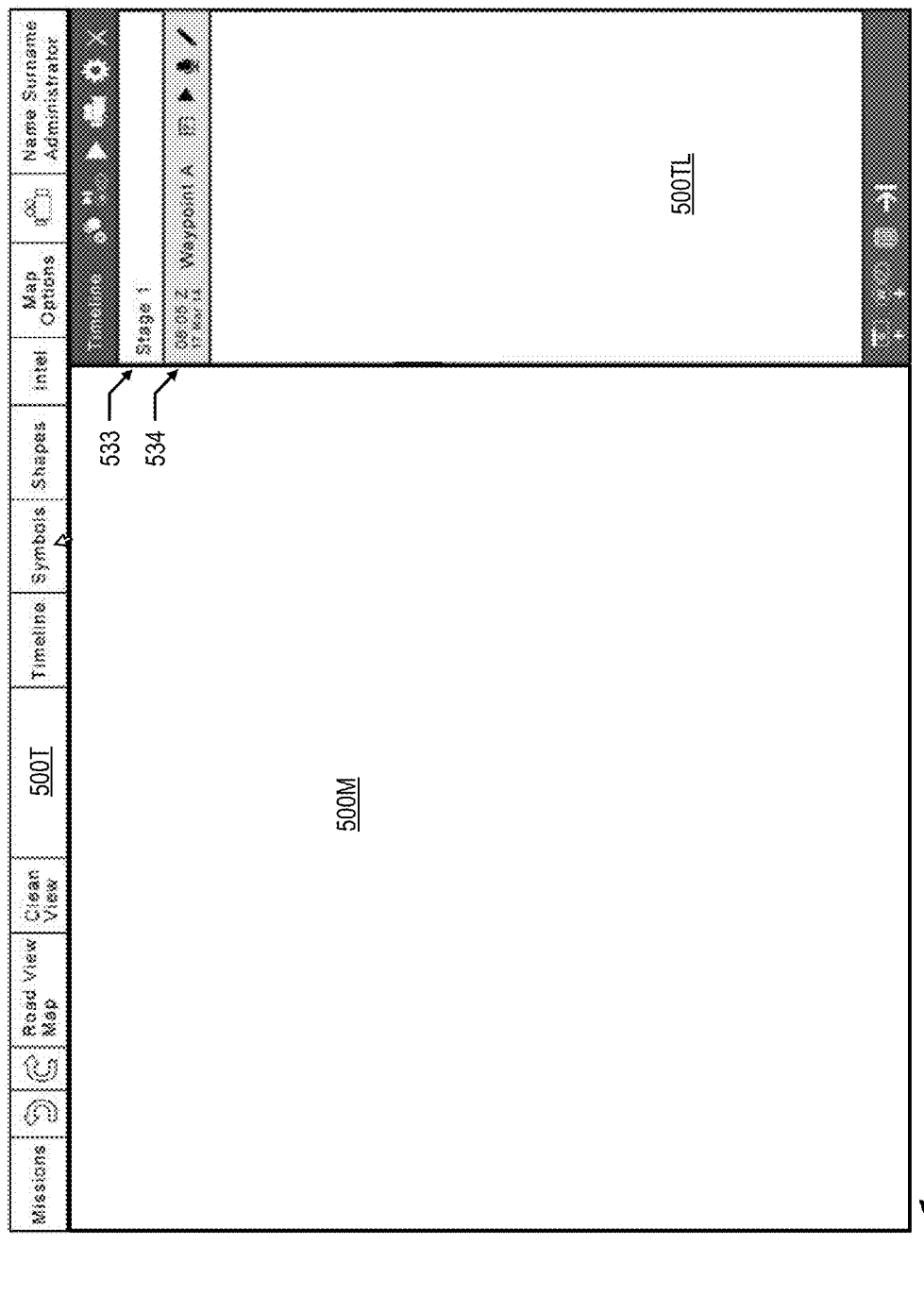
FIGS. 6A to 6H and 7-11 present a series of plan edit screens depicting a baseline plan, in accordance with an embodiment of the present invention.
Figure 6B:
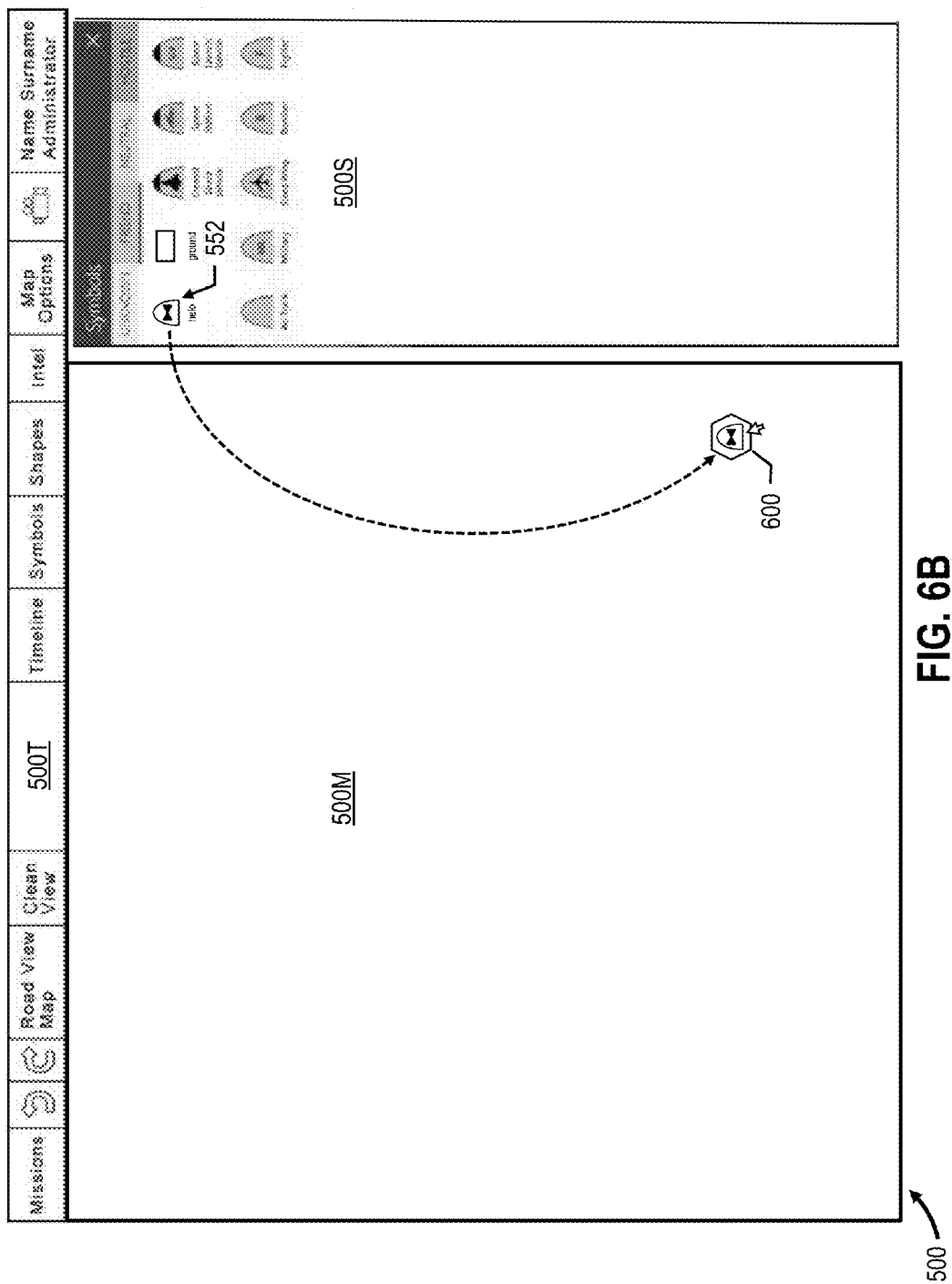
Figure 6C:
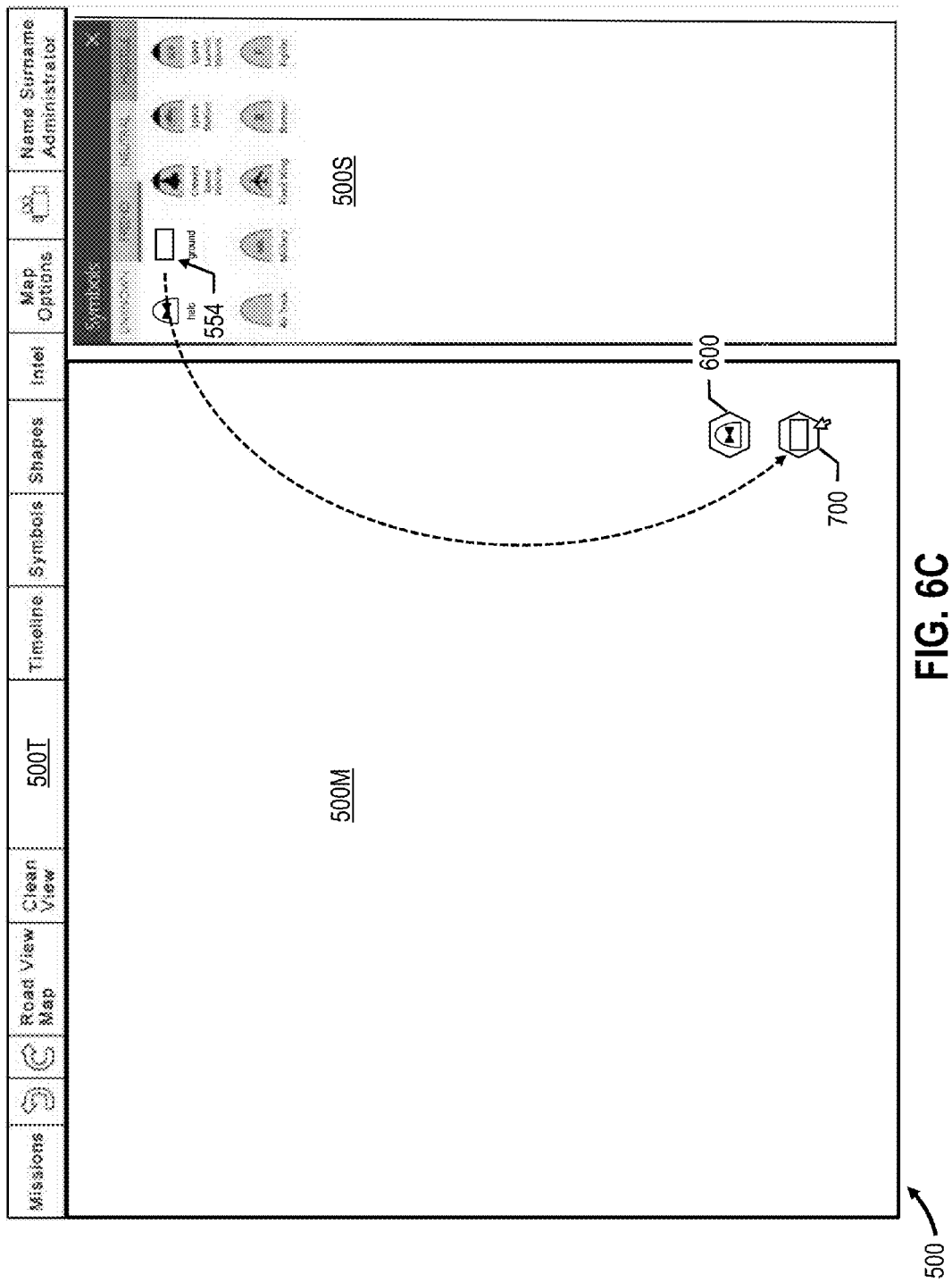
Figure 6D:
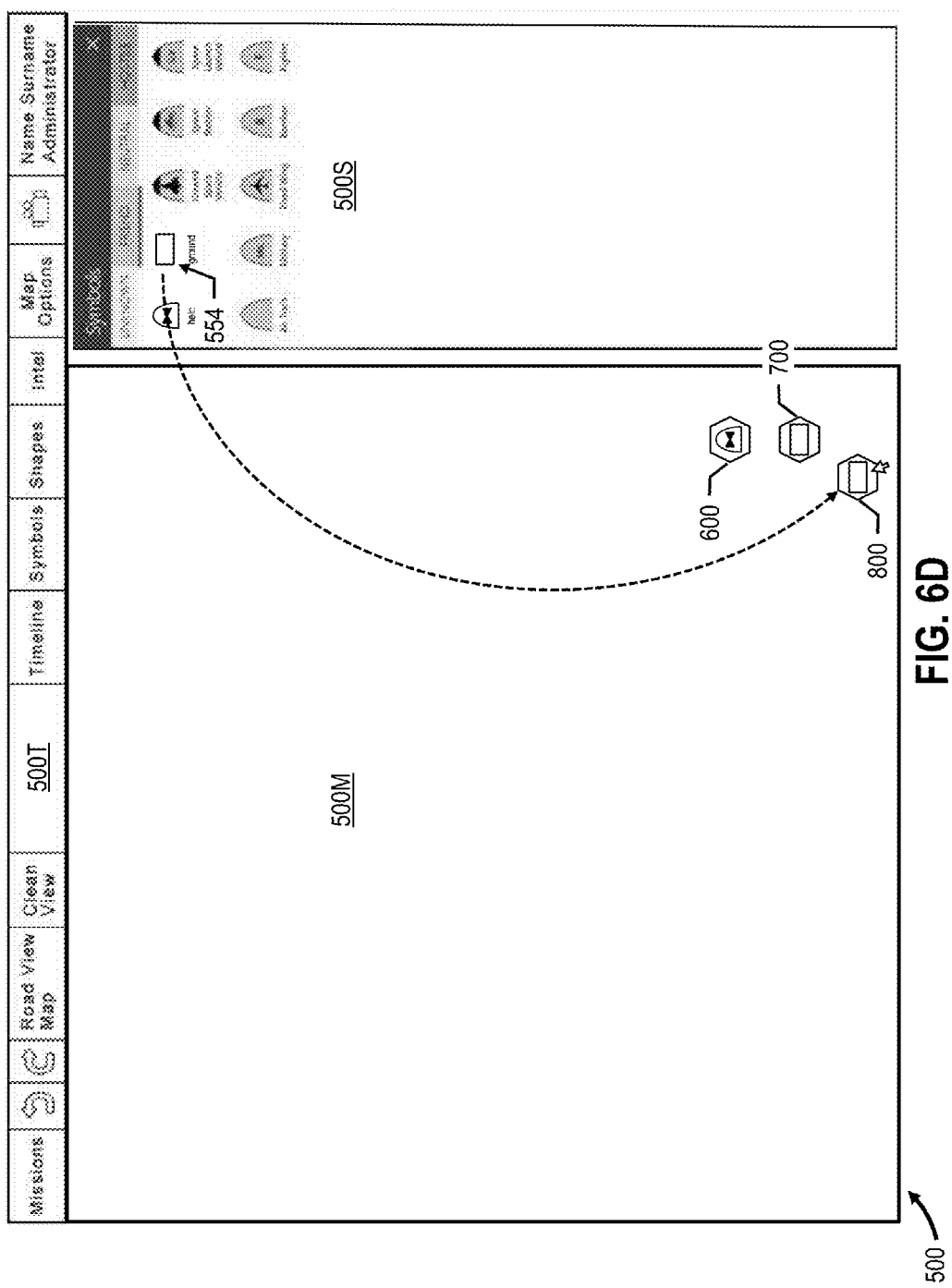

After the mission is created, the user selects the open plan command 429 in the plan panel 400P to begin editing the default plan. The mission planner module 230 then presents plan edit screen 500, as depicted, for example, in FIG. 6A. After navigating the map display to select the region of interest (map not shown for clarity), the user selects the symbols tab 509 in order to access the symbols panel 500S, and then drags and drops various symbols from the symbols panel 500S to the map displayed in the mission panel 500M. For example, in FIG. 6B, the user has selected, dragged and dropped the helo symbol 552 from the symbols panel 500S onto the mission panel 500M at a particular location on the map. The helo symbol 552 is converted to symbol 600, and the user may then access and enter data into the symbol context menu 515. In FIG. 6C, the user has selected, dragged and dropped the ground symbol 554 from the symbols panel 500S onto the mission panel 500M at a particular location on the map. The ground symbol 554 is converted to symbol 700, and the user may then access and enter data into the symbol context menu 515. Similarly, in FIG. 6D, the user has selected, dragged and dropped the ground symbol 554 from the symbols panel 500S onto the mission panel 500M at a particular location on the map. The ground symbol 554 is converted to symbol 800, and the user may then access and enter data into the symbol context menu 515. In one embodiment, the mission planner module 230 instantiates a symbol object based on a symbol class in accordance with object oriented programming techniques, links the symbol object to the waypoint object, and populates the symbol object with the data.

Figure 6E:
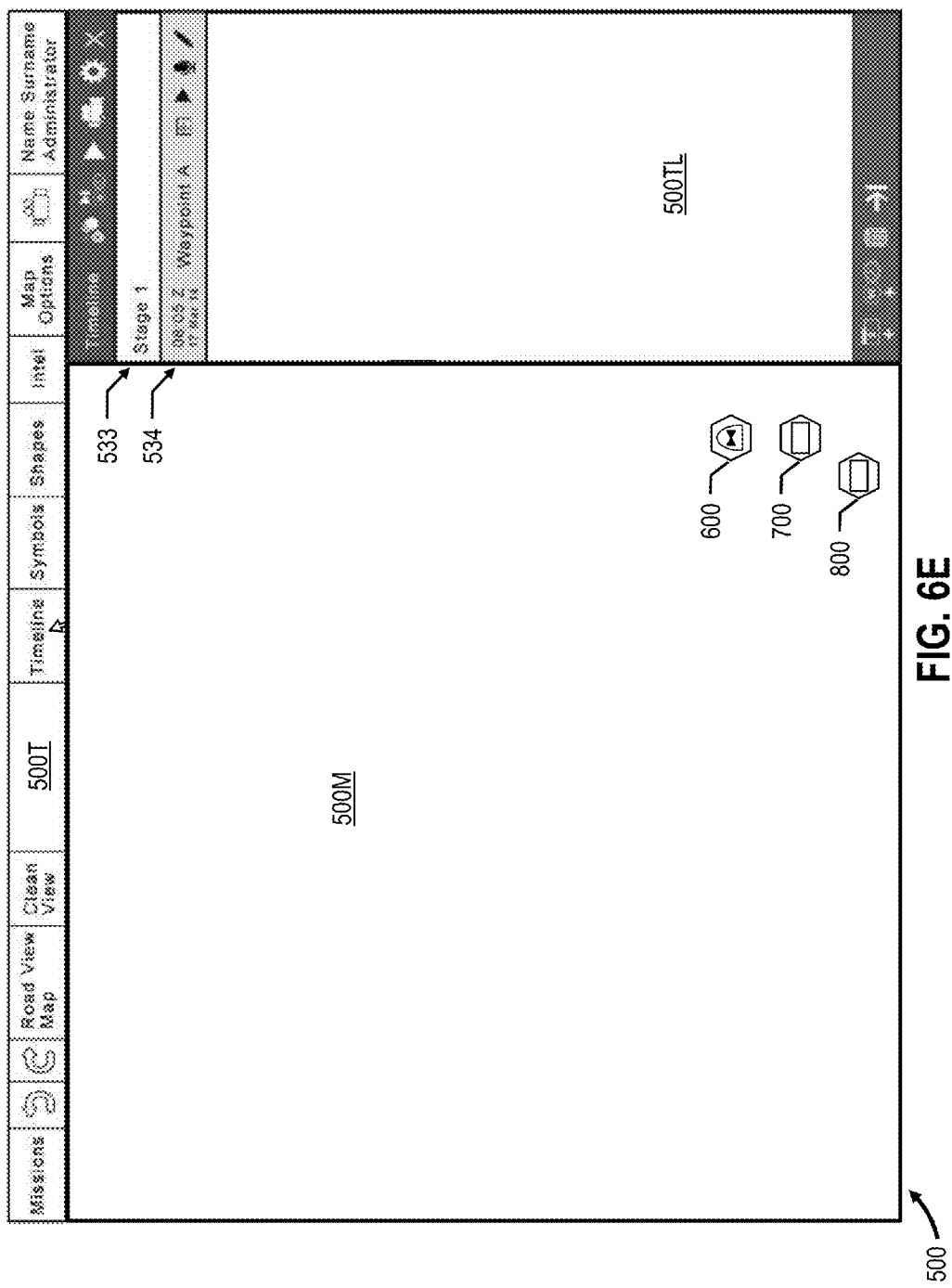

After one or more symbols have been placed on the map, the user selects the timeline tab 508 to access the timeline panel 500TL, as depicted in FIG. 6E. The default Stage 1 is displayed in the stage bar 533, and the default Waypoint A is displayed in waypoint bar 534. Generally, movement of each symbol is effected by selecting, dragging and dropping the symbol to one or more locations on the map. Symbol movement may be accomplished in one path segment, multiple path segments, straight paths, freeform paths, etc., by successively dragging and dropping the symbol on the map. For simplicity, a single straight path will be used to represent each symbol's movement in each waypoint of Plan A.

Figure 6F:
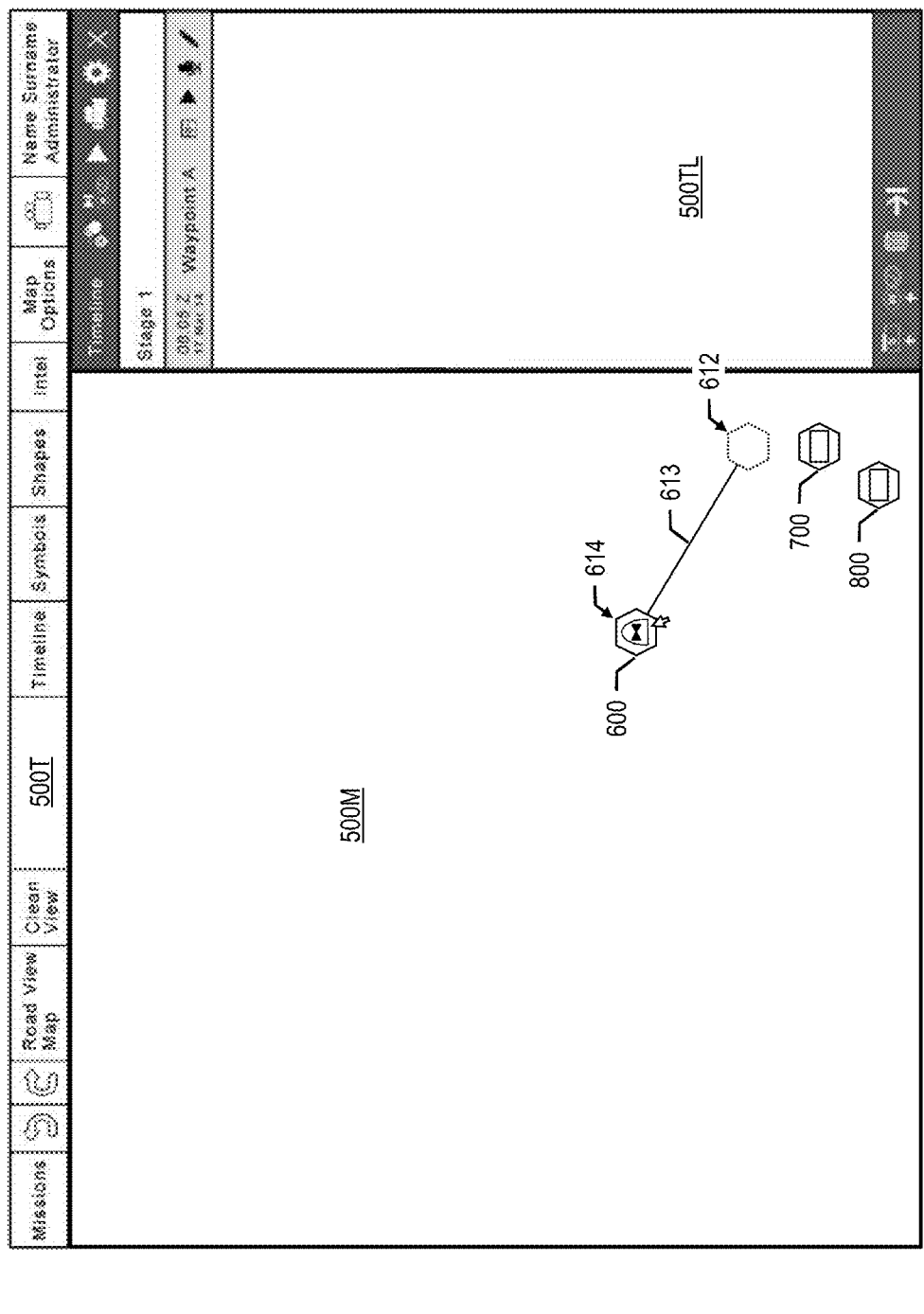
Figure 6G:
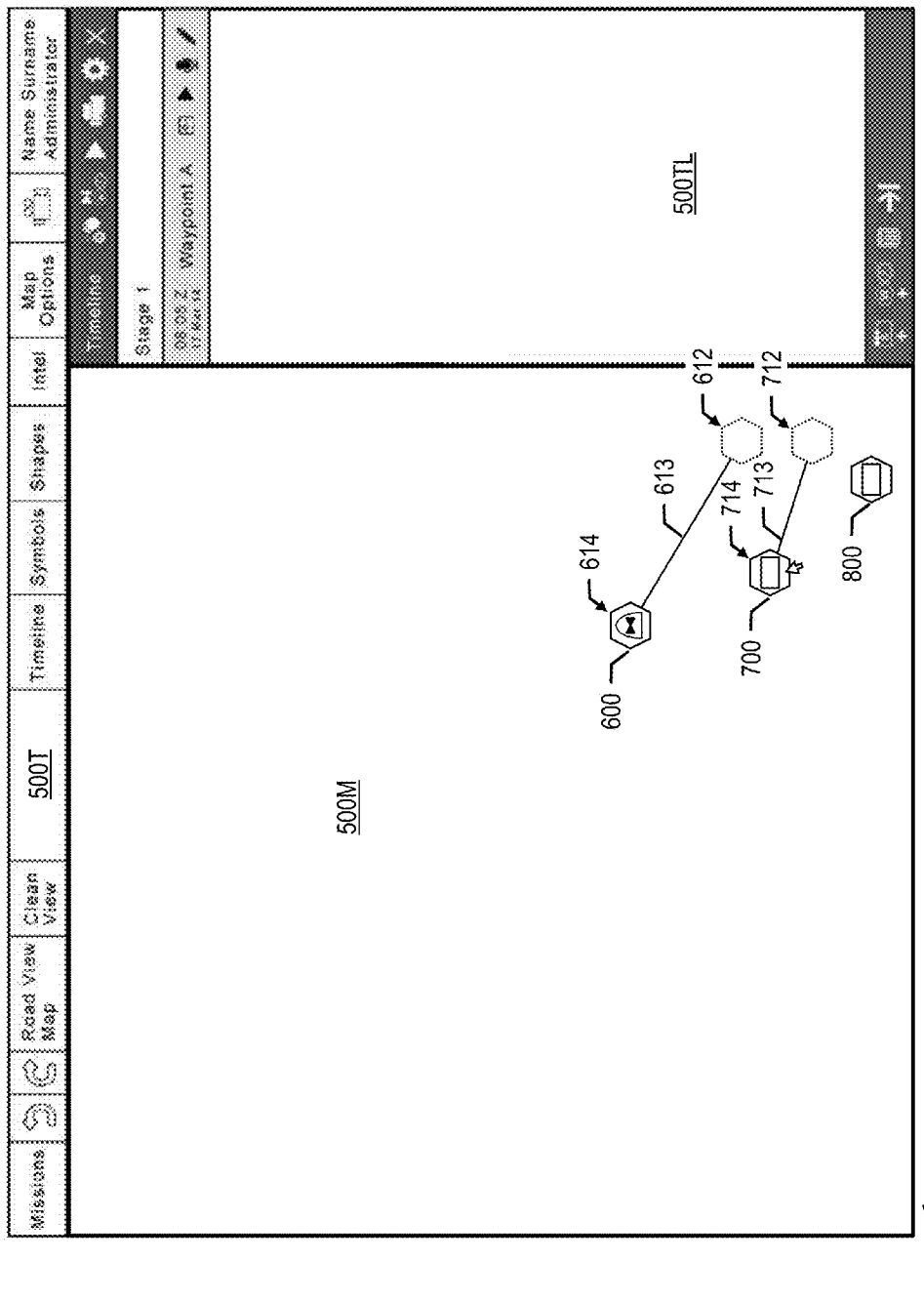
Figure 6H:
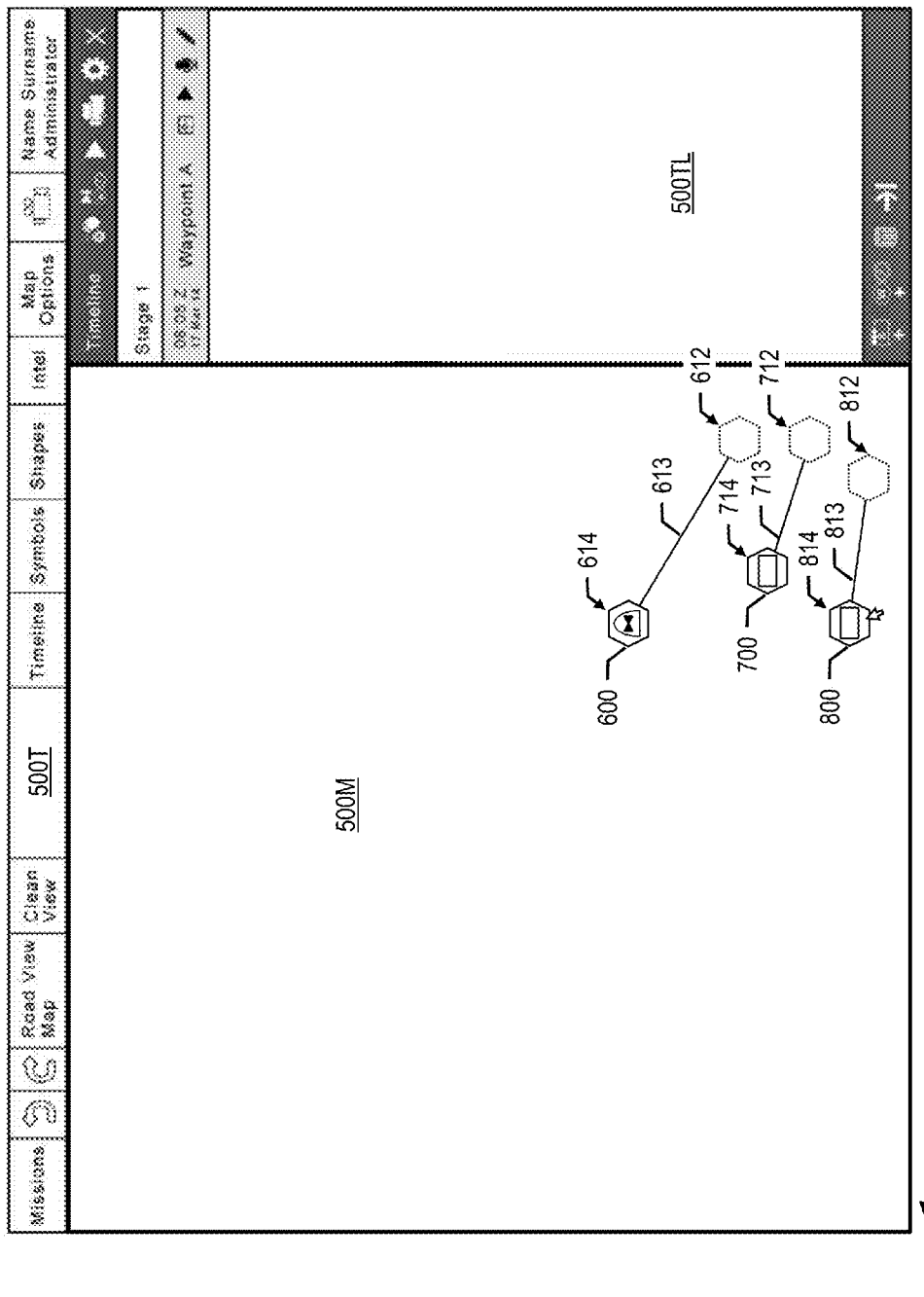

FIG. 6F depicts the movement of symbol 600 in Waypoint A. The user selects symbol 600 at start location 612, drags symbol 600 along path 613, and drops symbol 600 at end location 614. FIG. 6G depicts the movement of symbol 700 in Waypoint A. The user selects symbol 700 at start location 712, drags symbol 700 along path 713, and drops symbol 700 at end location 714. FIG. 6H depicts the movement of symbol 800 in Waypoint A. The user selects symbol 800 at start location 812, drags symbol 800 along path 813, and drops symbol 800 at end location 814. The start locations 612, 712 and 812 are indicated by displaying semi-transparent, faded, etc., symbols at these locations, as indicated by the dotted outlines in FIG. 6H, and are connected to the end locations 614, 714 and 814 by paths 613, 713 and 813. In one embodiment, the mission planner module 230 stores symbol movement information in the appropriate waypoint object; in another embodiment, the mission planner module 230 stores symbol movement information in the respective symbol object.

Figure 7:
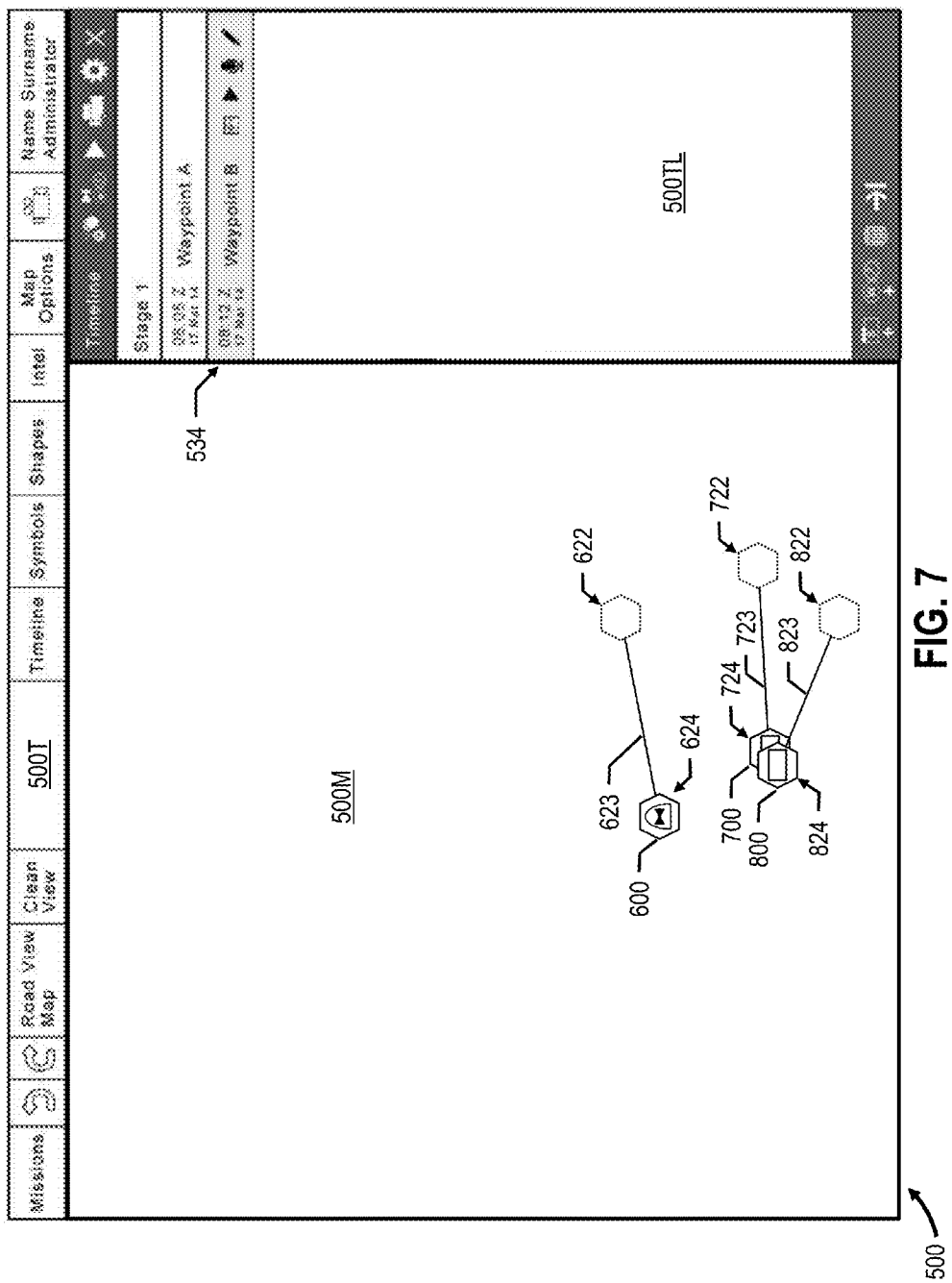

When movement has been completed for all of the symbols in Waypoint A, new Waypoint B can be created by selecting the add waypoint command 522. In one embodiment, the mission planner module 230 instantiates a new waypoint object, and links the waypoint object to the respective stage and symbol objects. FIG. 7 depicts the movement of symbols 600, 700 and 800 in Waypoint B. The user selects symbol 600 at start location 622, drags symbol 600 along path 623, and drops symbol 600 at end location 624. The user selects symbol 700 at start location 722, drags symbol 700 along path 723, and drops symbol 700 at end location 724. The user selects symbol 800 at start location 822, drags symbol 800 along path 823, and drops symbol 800 at end location 824. The start locations 622, 722 and 822 are indicated by displaying semi-transparent, faded, etc., symbols at these locations, as indicated by the dotted outlines in FIG. 7, and are connected to the end locations 624, 724 and 824 by paths 623, 723 and 823.

Figure 8:
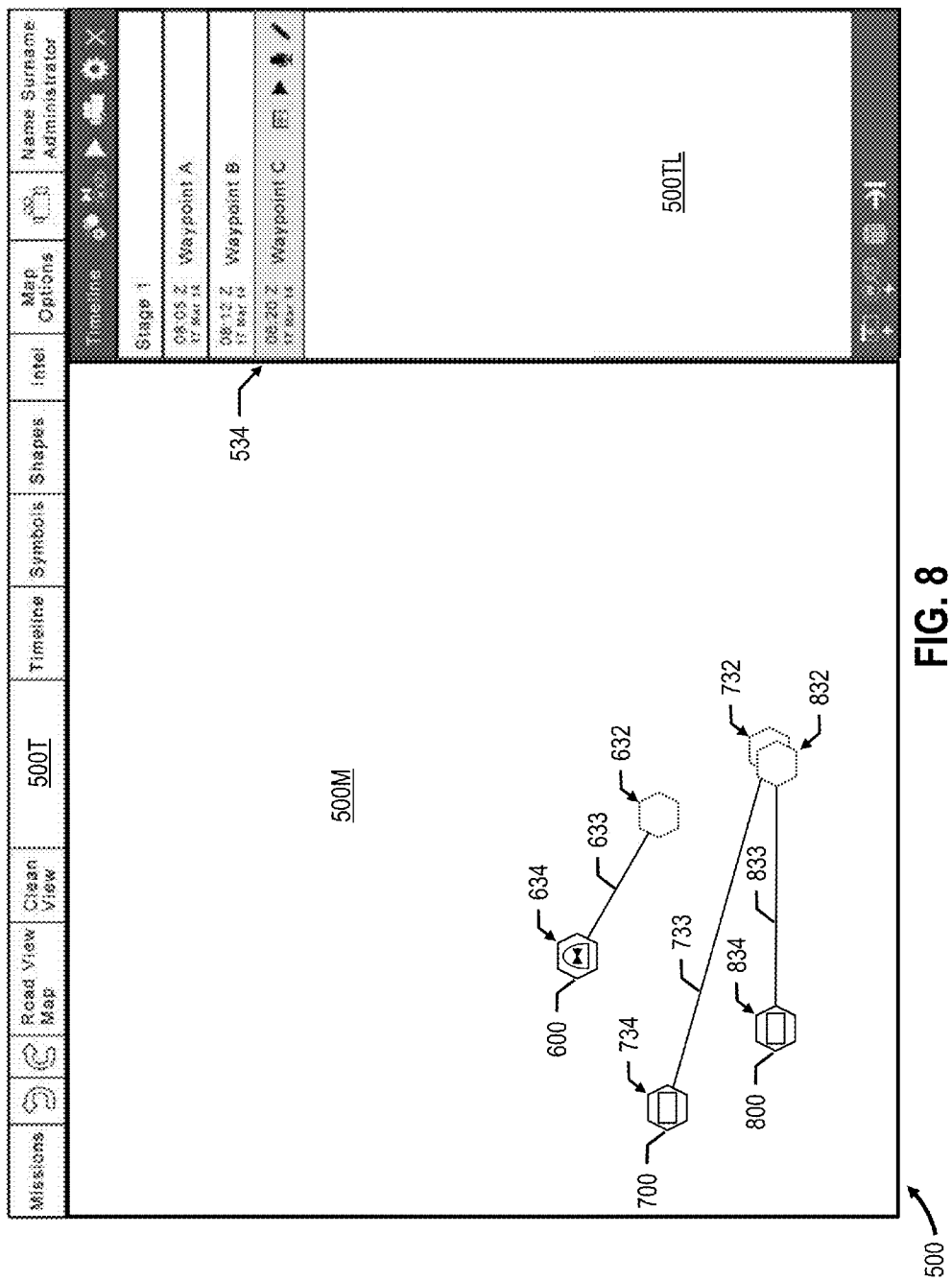

When movement has been completed for all of the symbols in Waypoint B, a new Waypoint C can be created by selecting the add waypoint command 522. In one embodiment, the mission planner module 230 instantiates a new waypoint object, and links the waypoint object to the respective stage and symbol objects. FIG. 8 depicts the movement of symbols 600, 700 and 800 in Waypoint C. The user selects symbol 600 at start location 632, drags symbol 600 along path 633, and drops symbol 600 at end location 634. The user selects symbol 700 at start location 732, drags symbol 700 along path 733, and drops symbol 700 at end location 734. The user selects symbol 800 at start location 832, drags symbol 800 along path 833, and drops symbol 800 at end location 834. The start locations 632, 732 and 832 are indicated by displaying semi-transparent, faded, etc., symbols at these locations, as indicated by the dotted outlines in FIG. 8, and are connected to the end locations 634, 734 and 834 by paths 633, 733 and 833.

Figure 9:
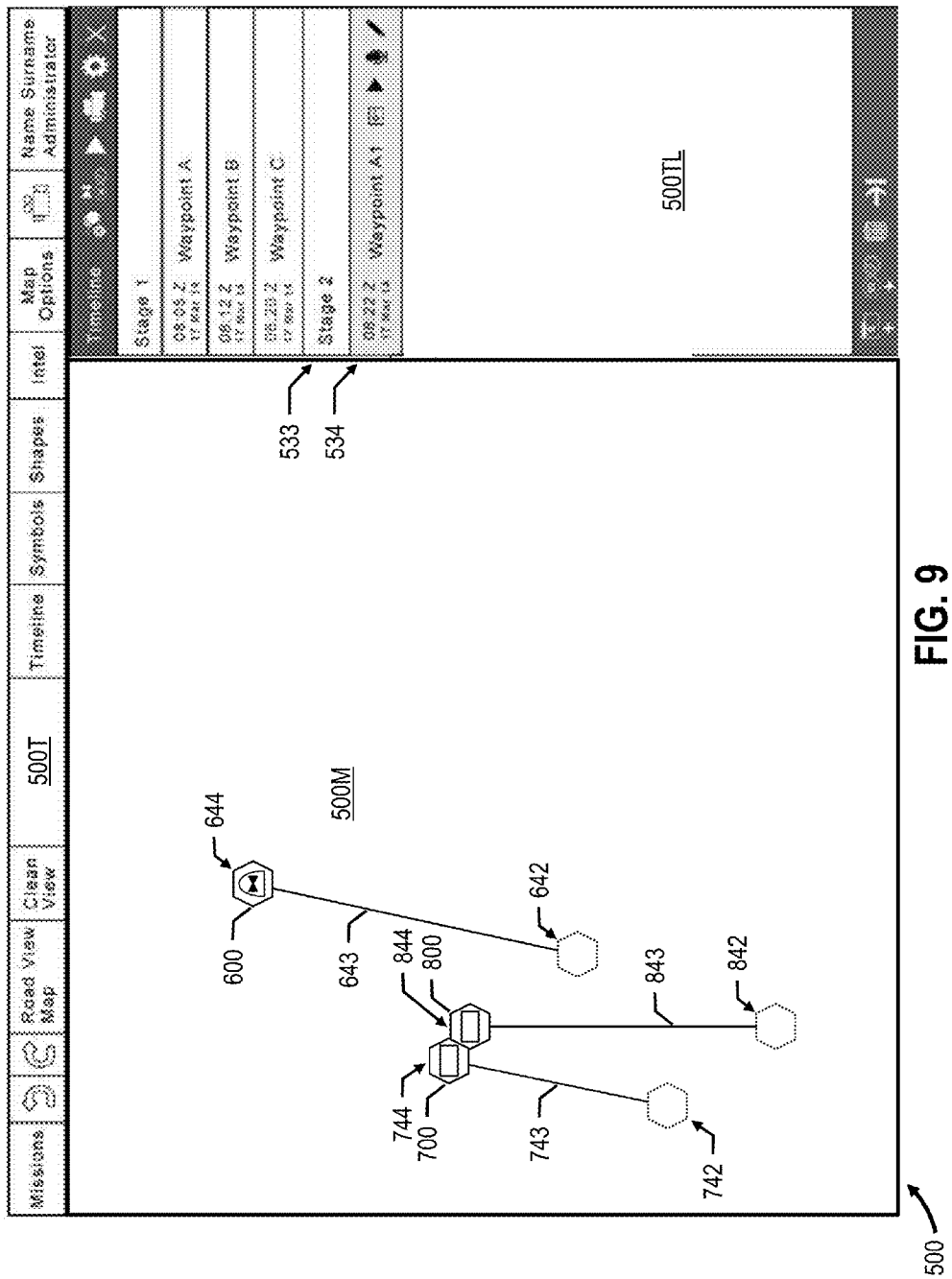

When movement has been completed for all of the symbols in Waypoint C, the user may decide to create a new stage by selecting the add stage command 521, and the mission planner module 230 creates a new Stage 2 and a new Waypoint A1. In one embodiment, the mission planner module 230 instantiates the new stage and waypoint objects, and links the new stage and waypoint objects to the preceding stage, waypoint and symbol objects, as needed. FIG. 9 depicts the movement of symbols 600, 700 and 800 in Waypoint A1. The user selects symbol 600 at start location 642, drags symbol 600 along path 643, and drops symbol 600 at end location 644. The user selects symbol 700 at start location 742, drags symbol 700 along path 743, and drops symbol 700 at end location 744. The user selects symbol 800 at start location 842, drags symbol 800 along path 843, and drops symbol 800 at end location 844. The start locations 642, 742 and 842 are indicated by displaying semi-transparent, faded, etc., symbols at these locations, as indicated by the dotted outlines in FIG. 9, and are connected to the end locations 644, 744 and 844 by paths 643, 743 and 843.

Figure 10:
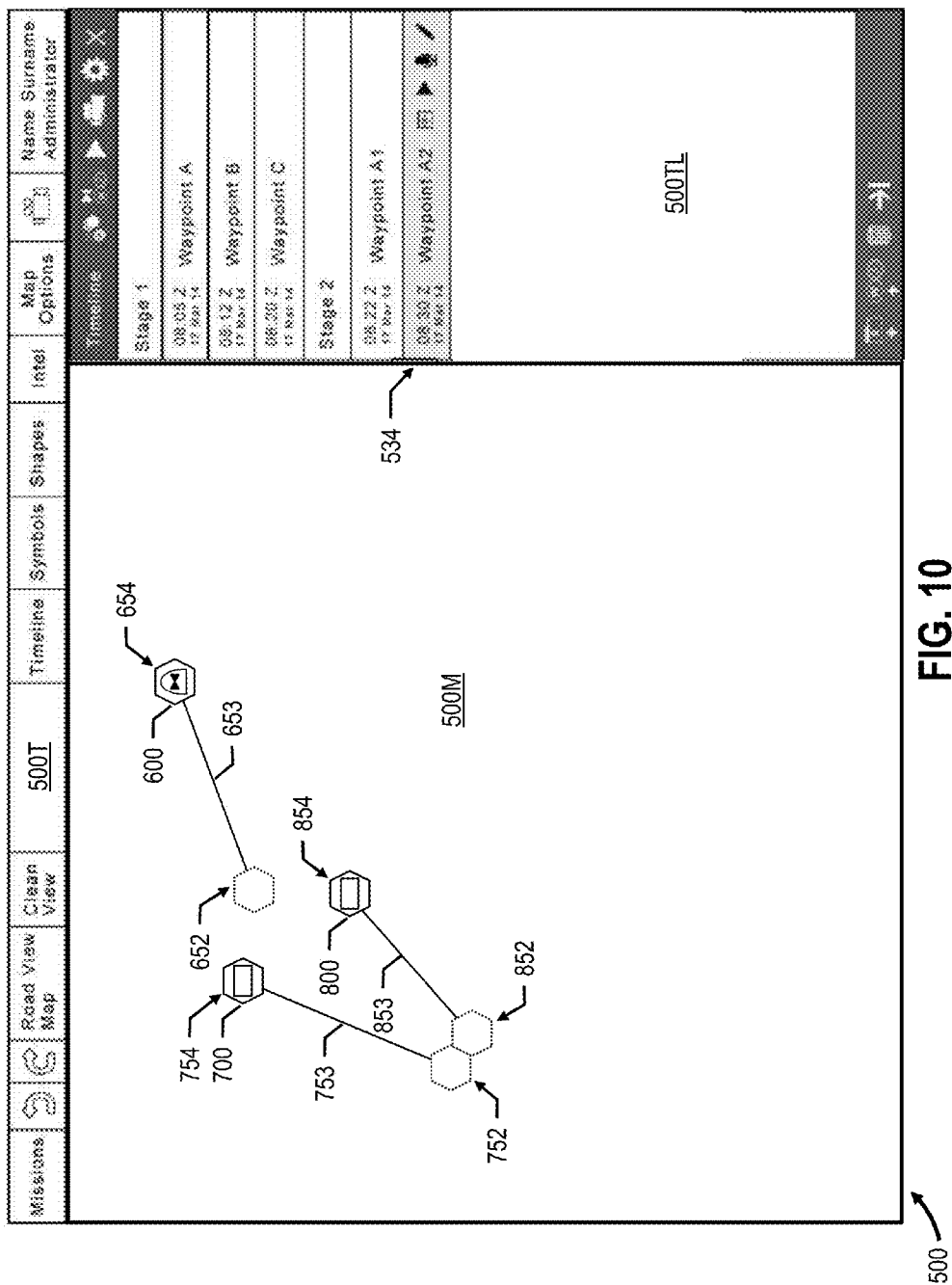

When movement has been completed for all of the symbols in Waypoint A1, new Waypoint A2 can be created by selecting the add waypoint command 522. In one embodiment, the mission planner module 230 instantiates a new waypoint object, and links the waypoint object to the respective stage and symbol objects. FIG. 10 depicts the movement of symbols 600, 700 and 800 in Waypoint A2. The user selects symbol 600 at start location 652, drags symbol 600 along path 653, and drops symbol 600 at end location 654. The user selects symbol 700 at start location 752, drags symbol 700 along path 753, and drops symbol 700 at end location 754. The user selects symbol 800 at start location 852, drags symbol 800 along path 853, and drops symbol 800 at end location 854. The start locations 652, 752 and 852 are indicated by displaying semi-transparent, faded, etc., symbols at these locations, as indicated by the dotted outlines in FIG. 10, and are connected to the end locations 654, 754 and 854 by paths 653, 753 and 853.

Figure 11:
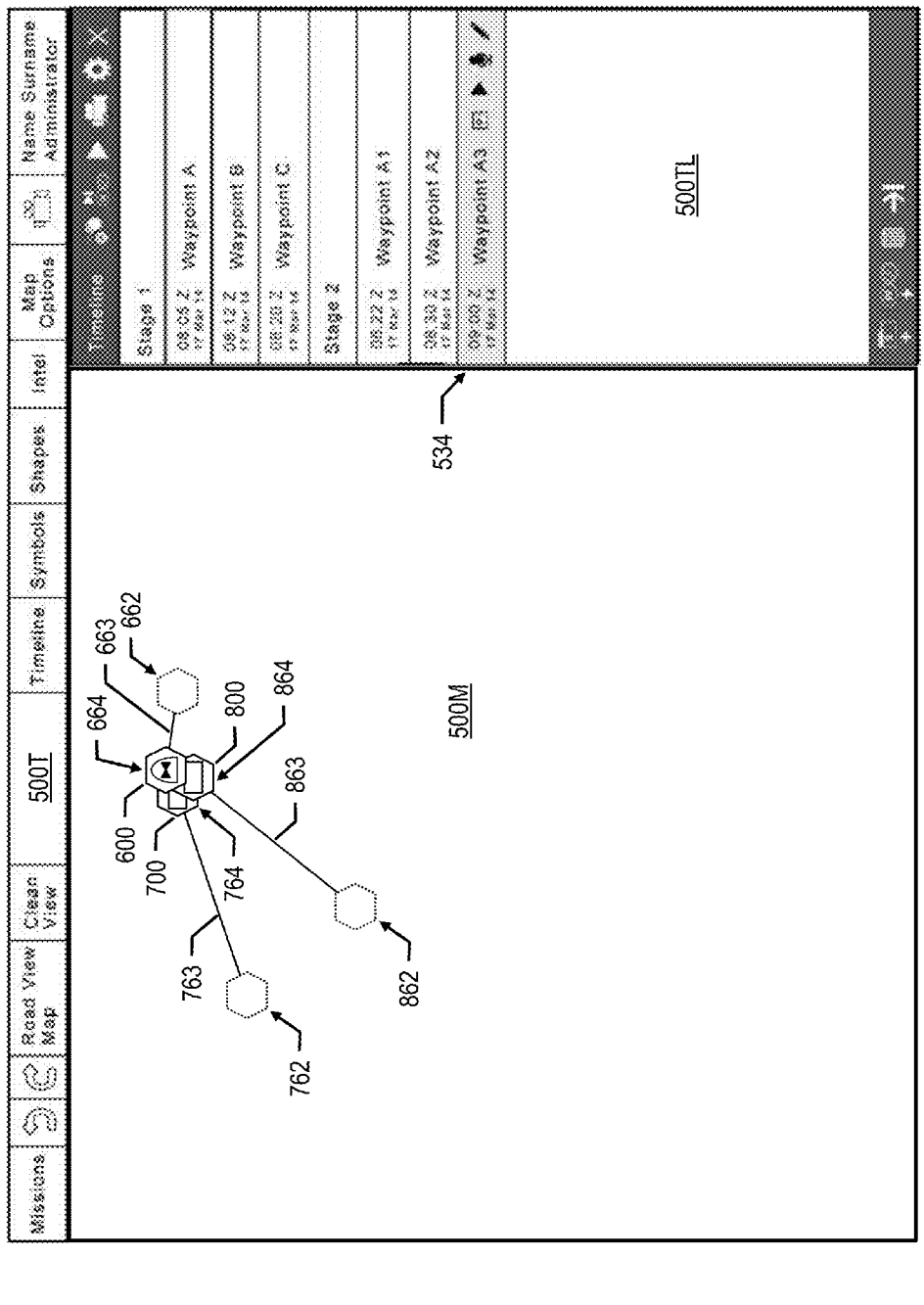

When movement has been completed for all of the symbols in Waypoint A2, a new Waypoint A3 can be created by selecting the add waypoint command 522. In one embodiment, the mission planner module 230 instantiates a new waypoint object, and then links the waypoint object to the respective stage and symbol objects. FIG. 11 depicts the movement of symbols 600, 700 and 800 in Waypoint A3. The user selects symbol 600 at start location 662, drags symbol 600 along path 663, and drops symbol 600 at end location 664. The user selects symbol 700 at start location 762, drags symbol 700 along path 763, and drops symbol 700 at end location 764. The user selects symbol 800 at start location 862, drags symbol 800 along path 863, and drops symbol 800 at end location 864. The start locations 662, 762 and 862 are indicated by displaying semi-transparent, faded, etc., symbols at these locations, as indicated by the dotted outlines in FIG. 11, and are connected to the end locations 664, 764 and 864 by paths 663, 763 and 863.

When a user desires to change the movement path for a symbol in a particular waypoint, the mission planner module 230 advantageously allows the user to adjust the movement of the symbols without the need to delete every stage and waypoint that succeeds that particular waypoint, and then recreate those deleted stages and waypoints after the symbols' movement paths have been changed. Instead, the mission planner module 230 propagates a new end location for a symbol by changing the start location associated with the symbol in either the subsequent waypoint of the stage or the first waypoint of the subsequent stage to the new end location. Similarly, the mission planner module 230 propagates a new start location for a symbol by changing the end location associated with the symbol in either the preceding waypoint of the stage or the last waypoint of the preceding stage.

Figure 12:
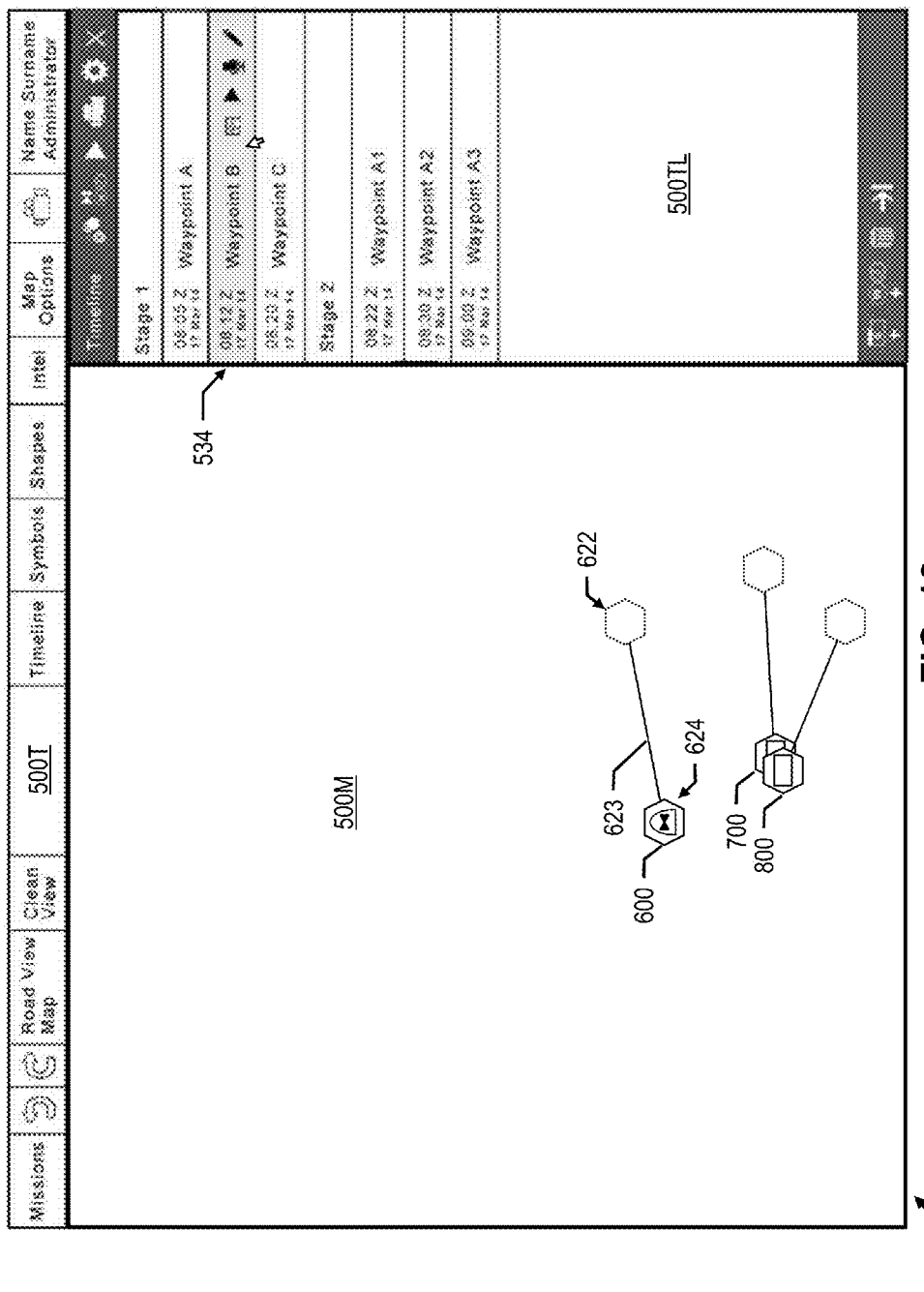
FIGS. 12-20 present a series of plan edit screens depicting movements of a symbol's end location, in accordance with an embodiment of the present invention.
Figure 13:
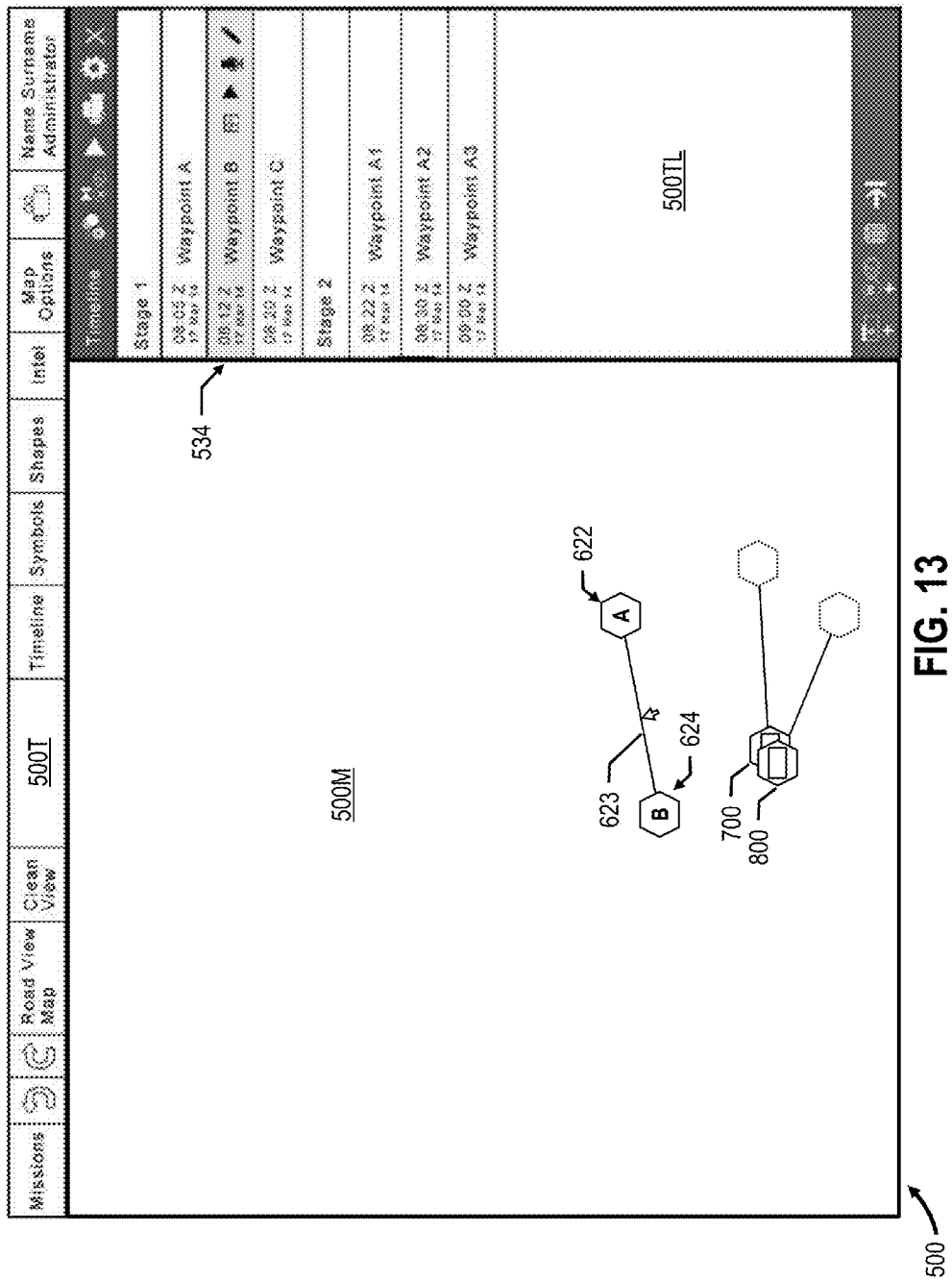
Figure 14:
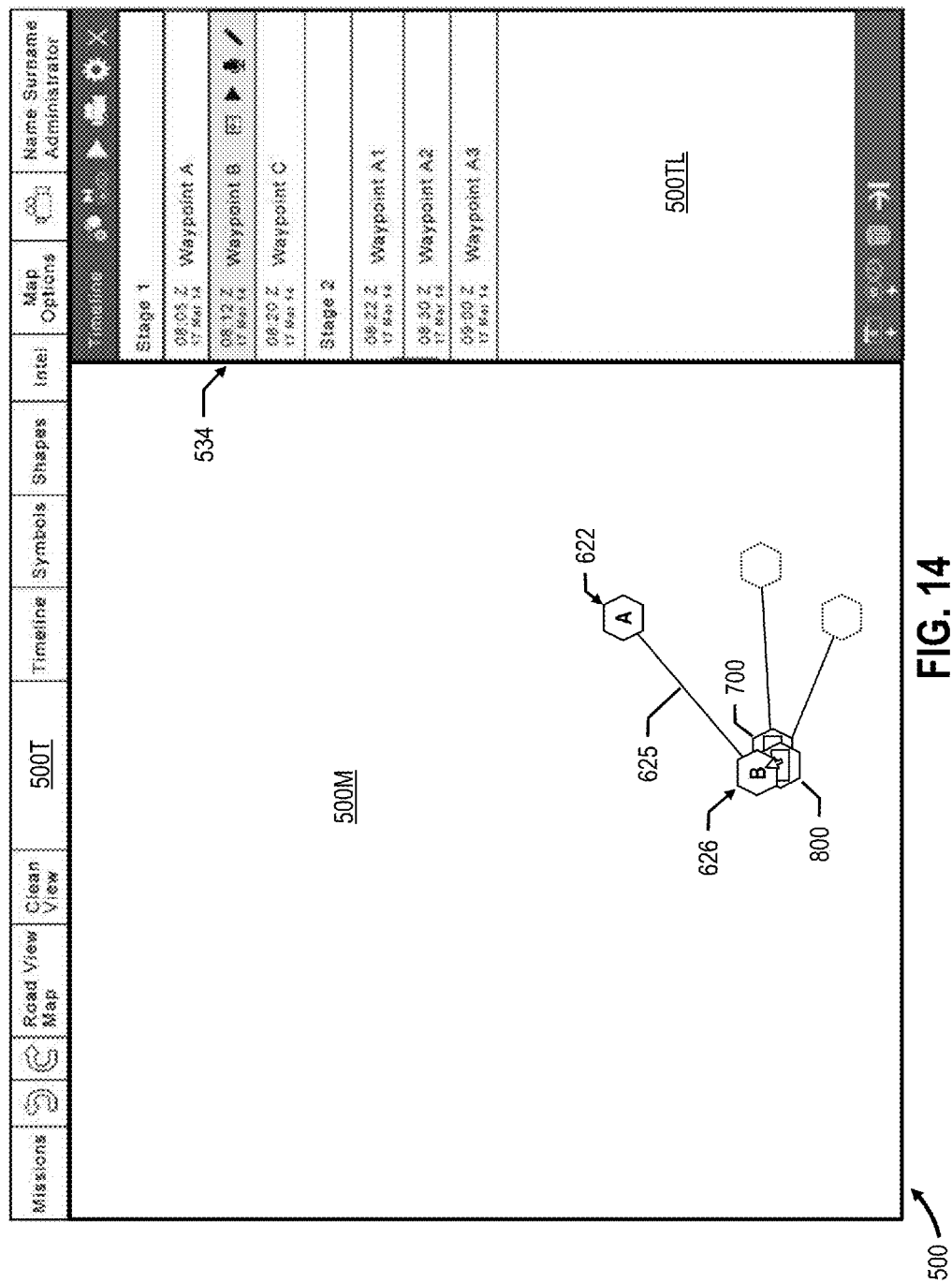
Figure 15:
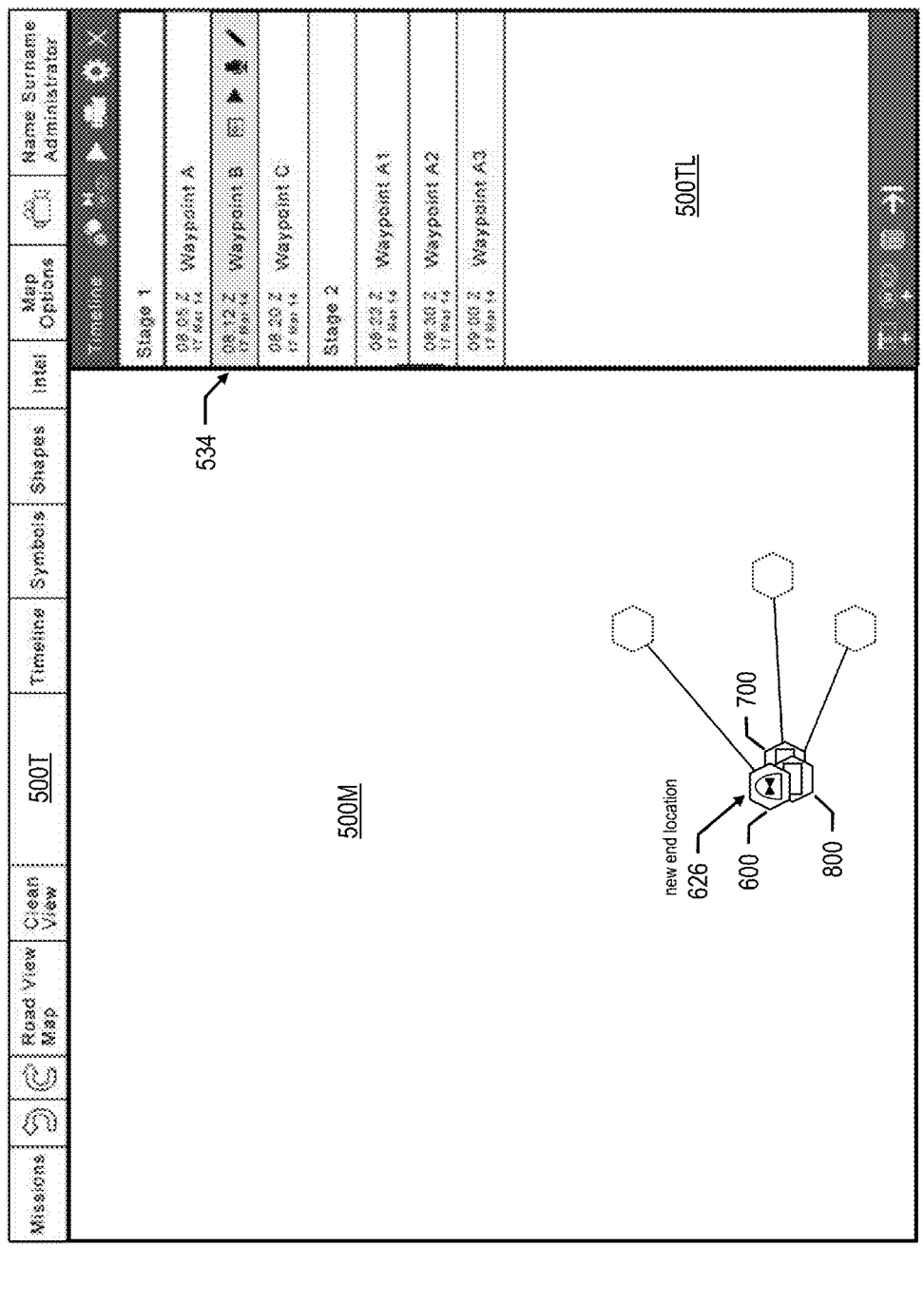
Figure 16:
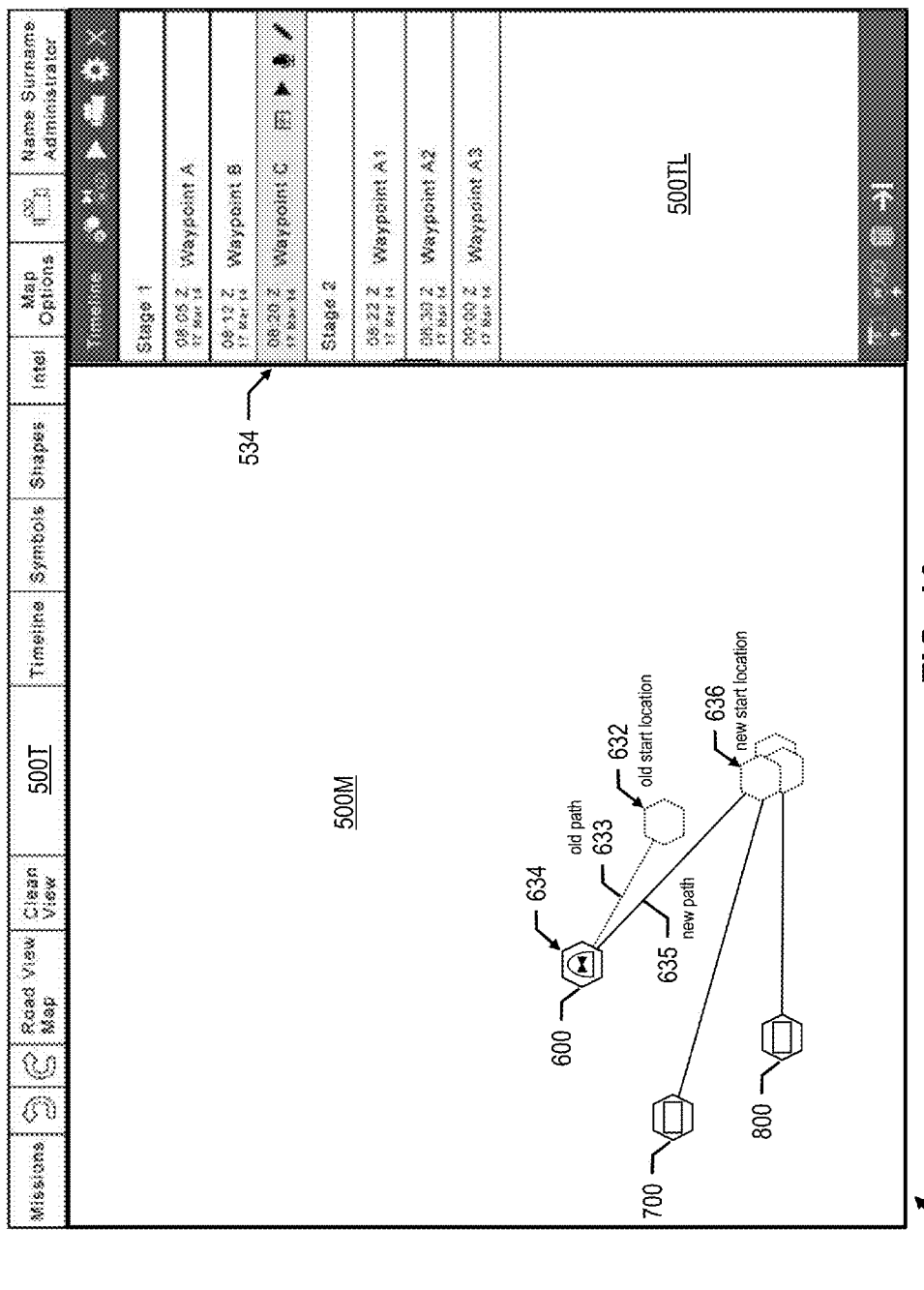

The user first selects the particular waypoint in the timeline panel 500TL, which is then highlighted by the waypoint bar 534. For example, the user may select Waypoint B of Stage 1, as depicted in FIG. 12. In order to move the end location for symbol 600, the user first selects the path 623, which changes the start location to an "A" symbol and the end location to a "B" symbol, as depicted in FIG. 13. The user may then change the start location 622 and/or the end location 624. For example, if the user desires to change the end location 624, the user selects, drags and drops the symbol B from the old end location 624 to the new end location 626, which creates a new path 625, as depicted in FIG. 14. After the changes are saved, the regular display of symbol 600 is restored, as depicted in FIG. 15. Importantly, the start location and path for symbol 600 in the succeeding Waypoint C is changed to reflect the new end location in Waypoint B. As depicted in FIG. 16, the old start location 632 is changed to the new start location 636, which is the new end location 626, and the old path 633 is changed to the new path 635. While this movement change has been effected within a single stage, i.e., Stage 1, movement changes can also be effected across stages.

Figure 17:
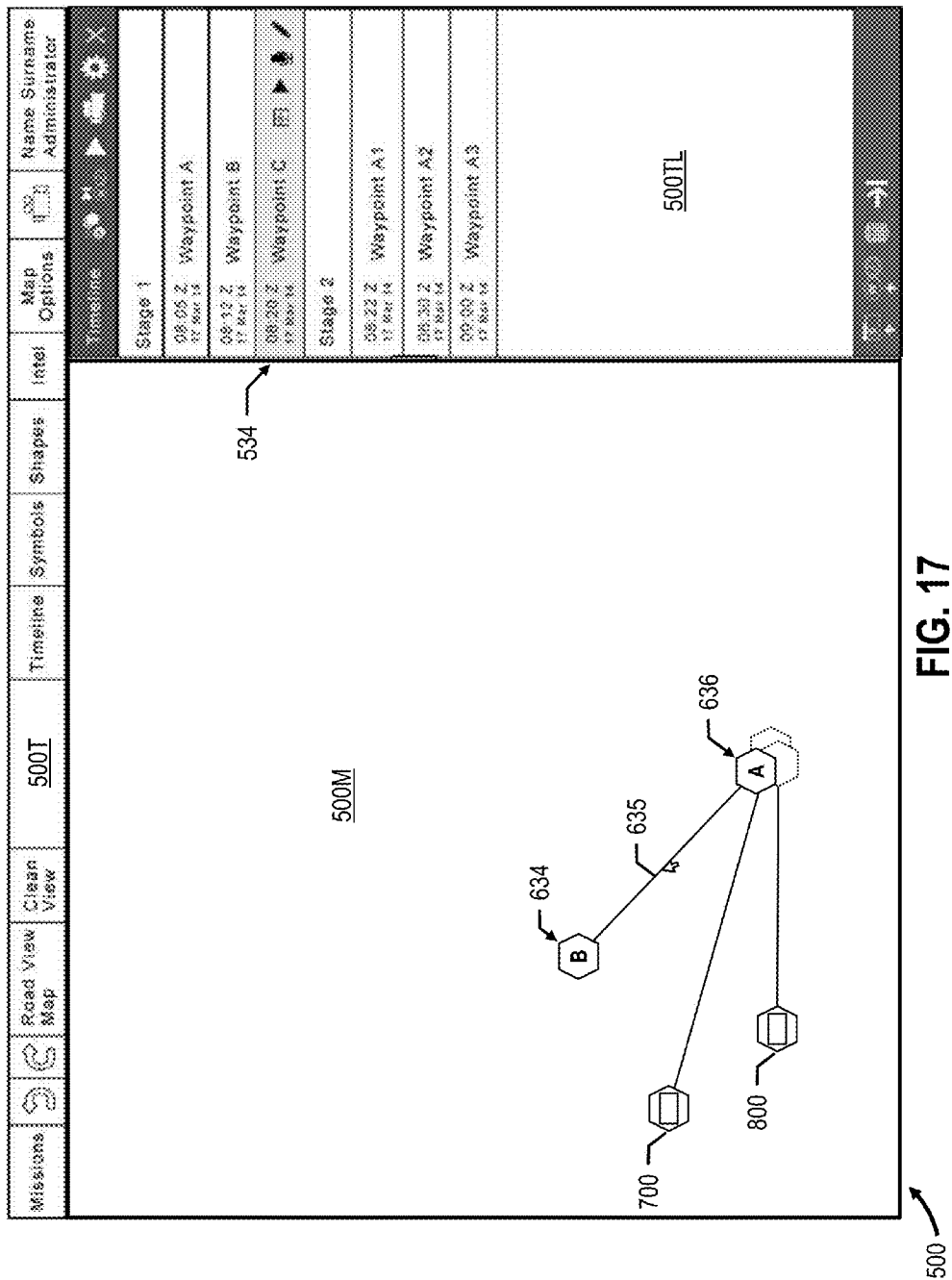
Figure 18:
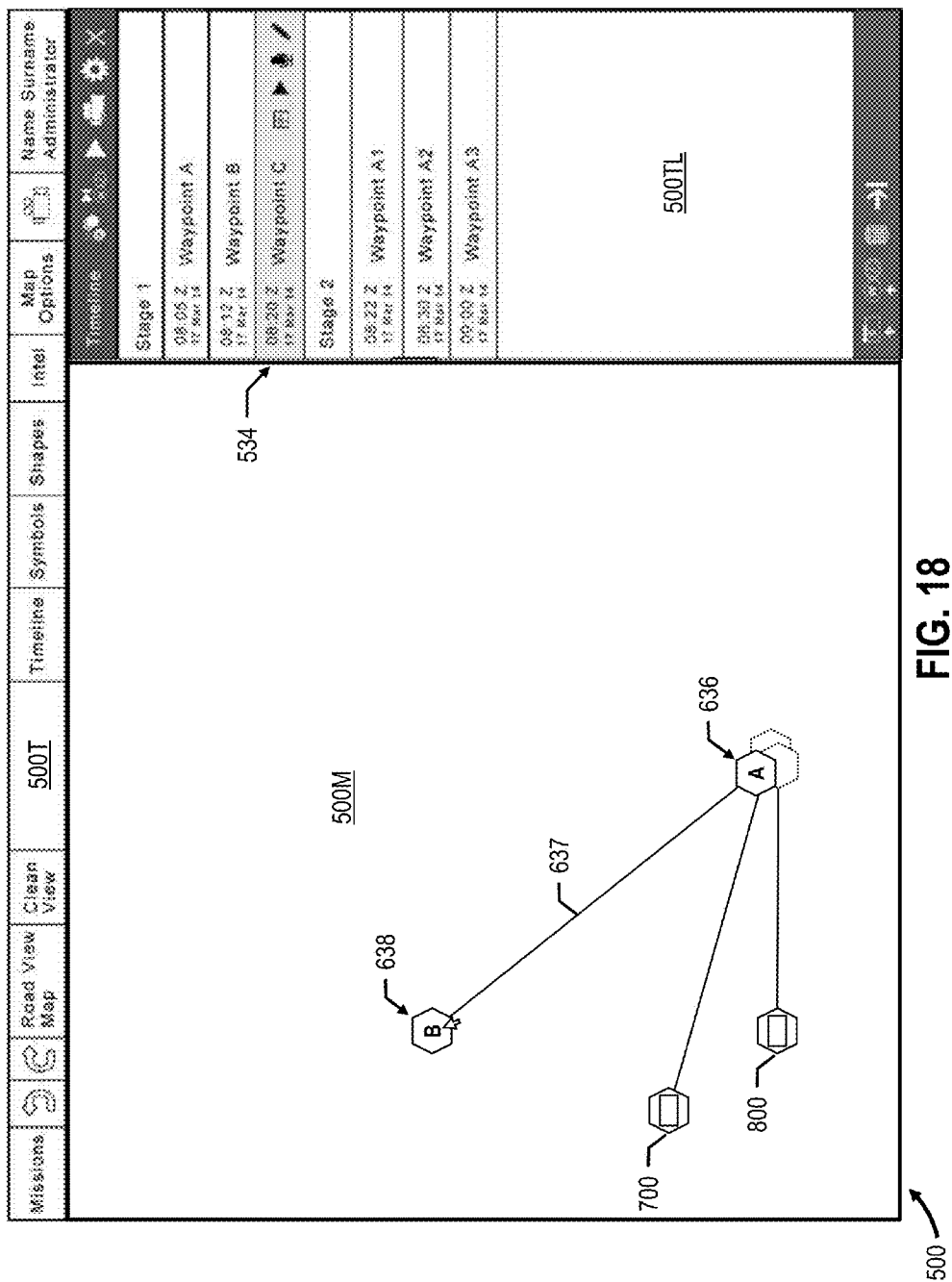
Figure 19:
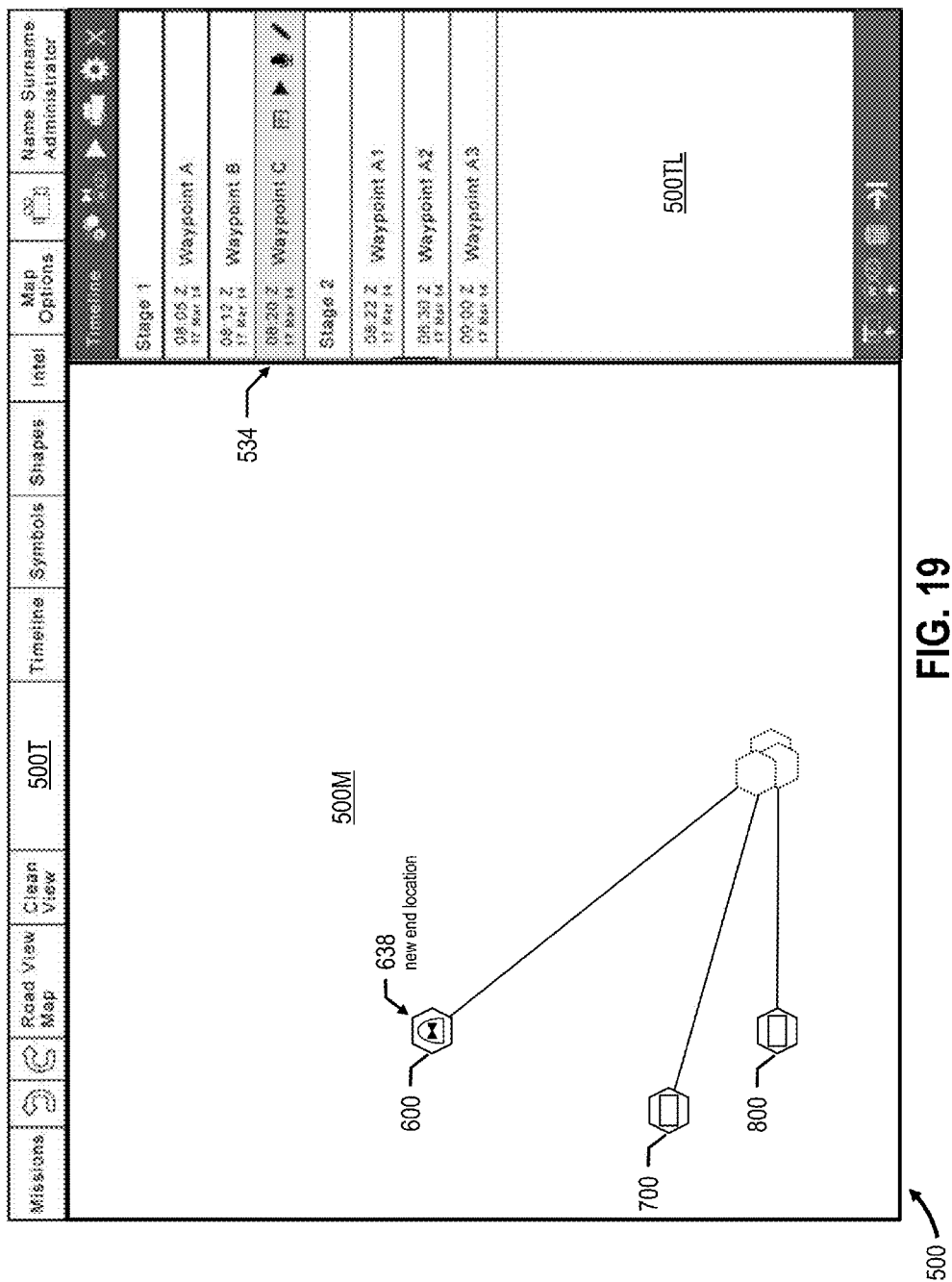
Figure 20:
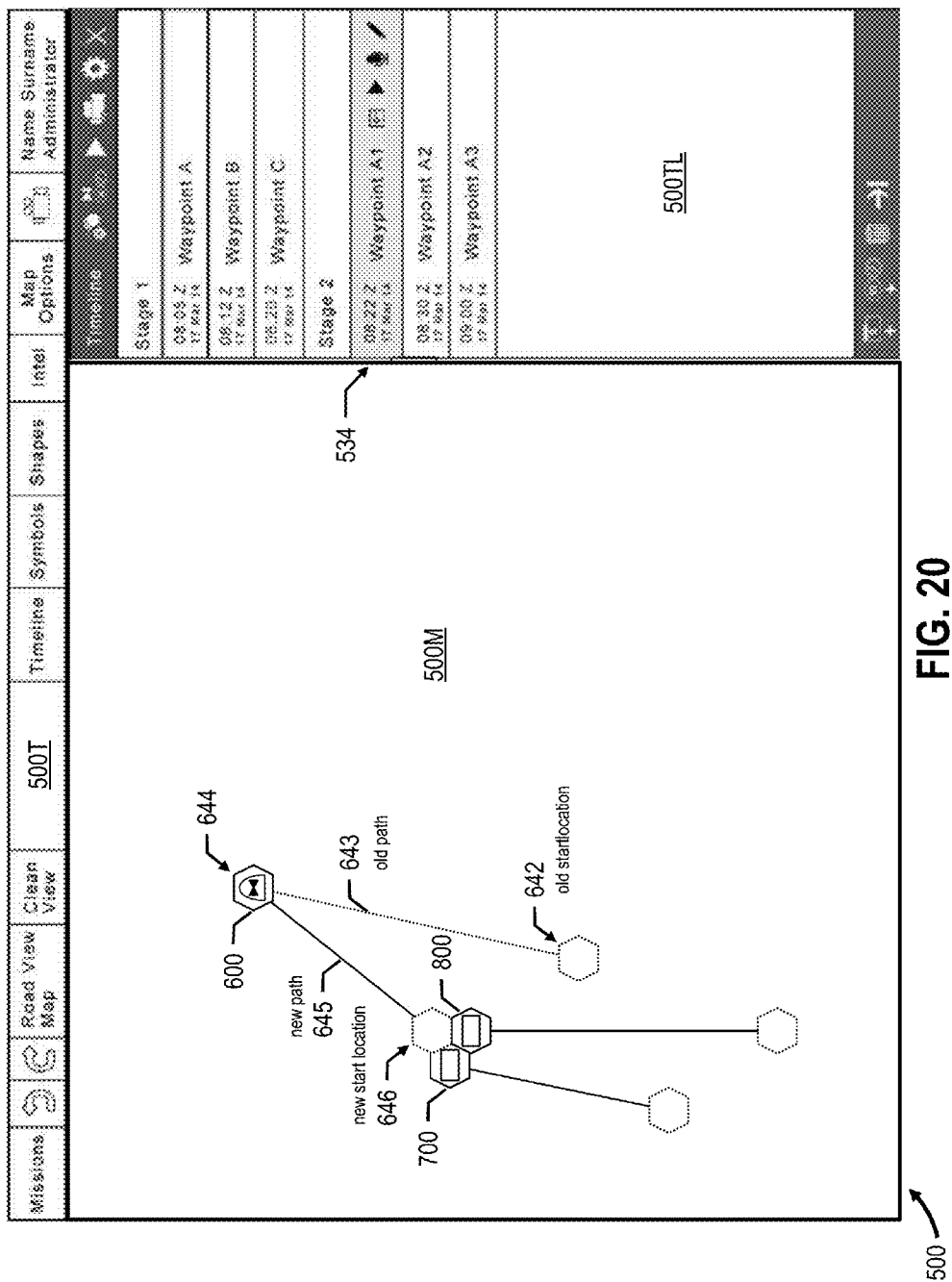

In order to move the end location for symbol 600 in Waypoint C, the user first selects the path 635, which changes the start location to an "A" symbol and the end location to a "B" symbol, as depicted in FIG. 17. The user may then change the start location 636 and/or the end location 634. For example, if the user desires to change the end location 634, the user selects, drags and drops the symbol B from the old end location 634 to the new end location 638, which creates a new path 637, as depicted in FIG. 18. After the changes are saved, the regular display of symbol 600 is restored, as depicted in FIG. 19. Importantly, the start location and path for symbol 600 in the succeeding Waypoint A1 of the succeeding Stage 2 is changed to reflect the new end location in Waypoint C. As depicted in FIG. 20, the old start location 642 is changed to the new start location 646, which is the new end location 638, and the old path 643 is changed to the new path 645.

Figure 21:
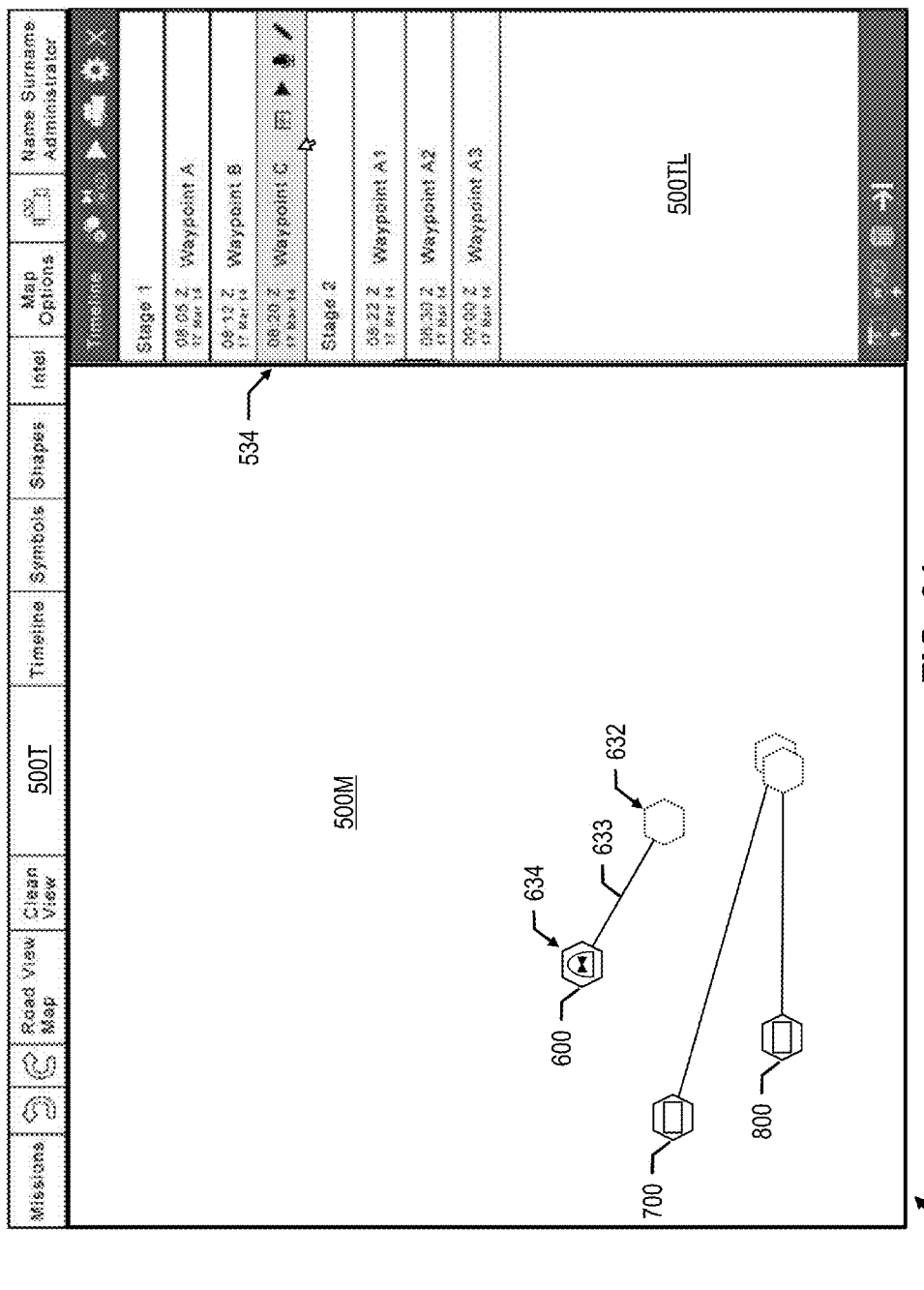
FIGS. 21-30 present a series of plan edit screens depicting movements of a symbol's start location, in accordance with an embodiment of the present invention.
Figure 22:
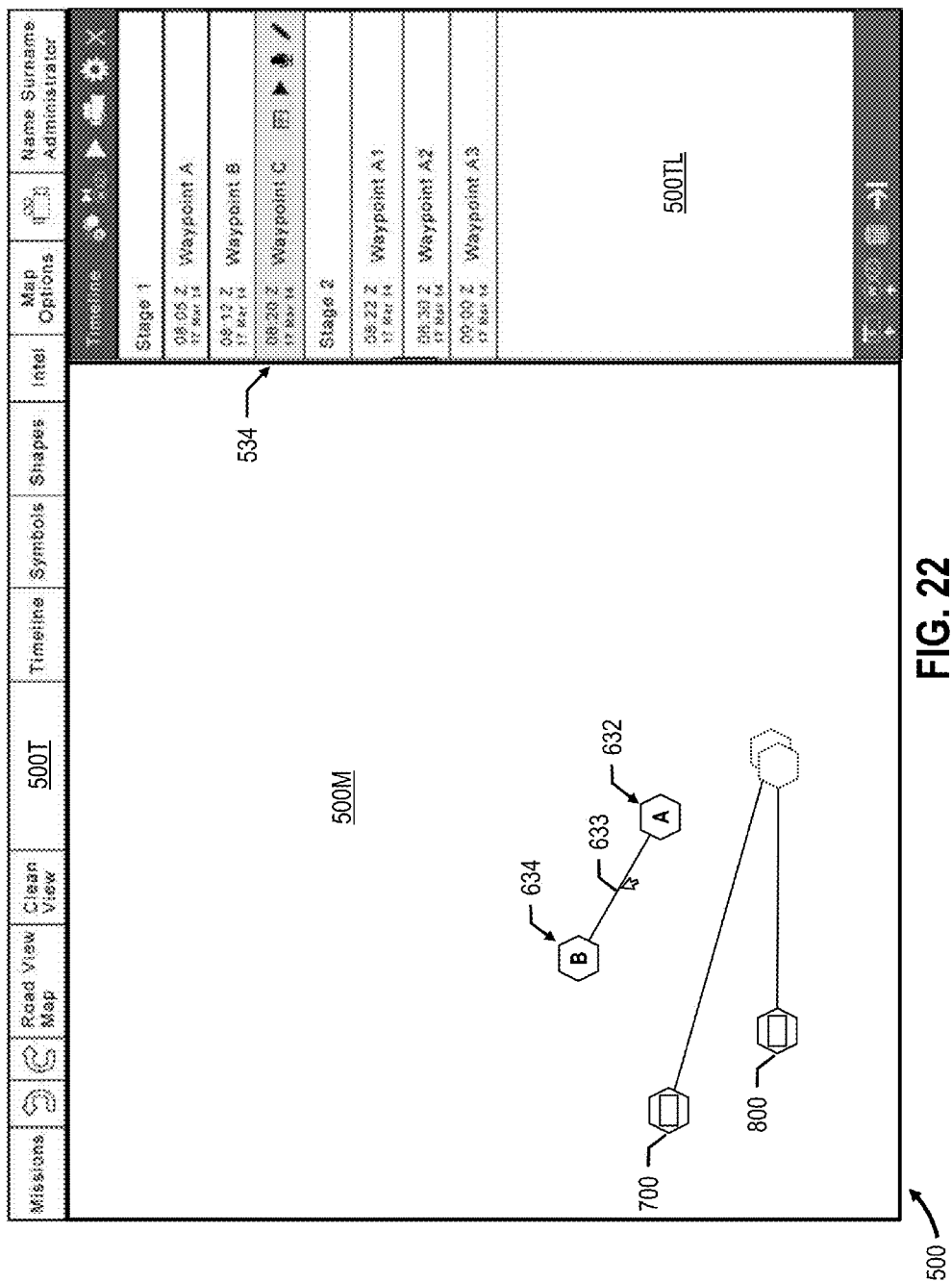
Figure 23:
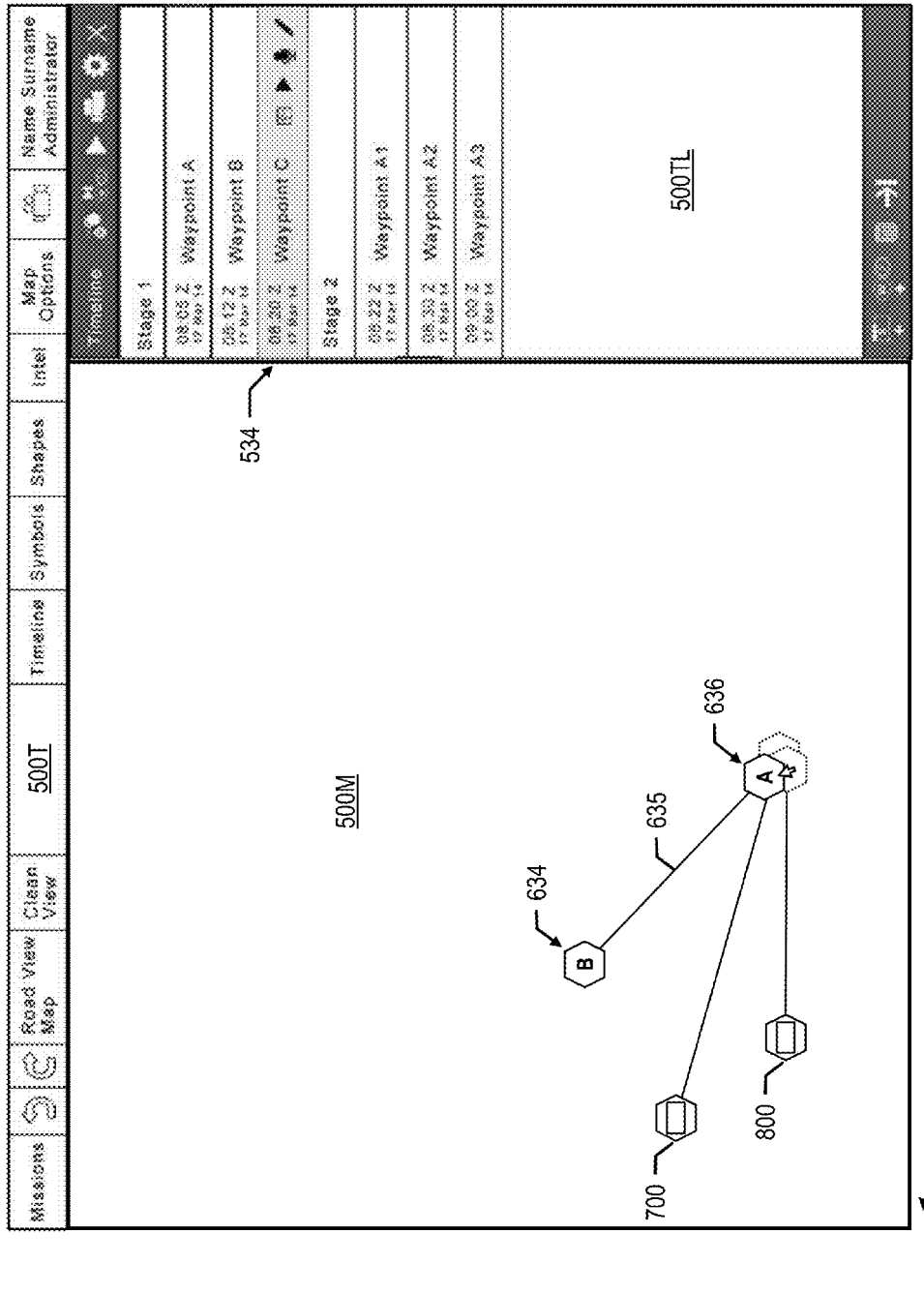
Figure 24:
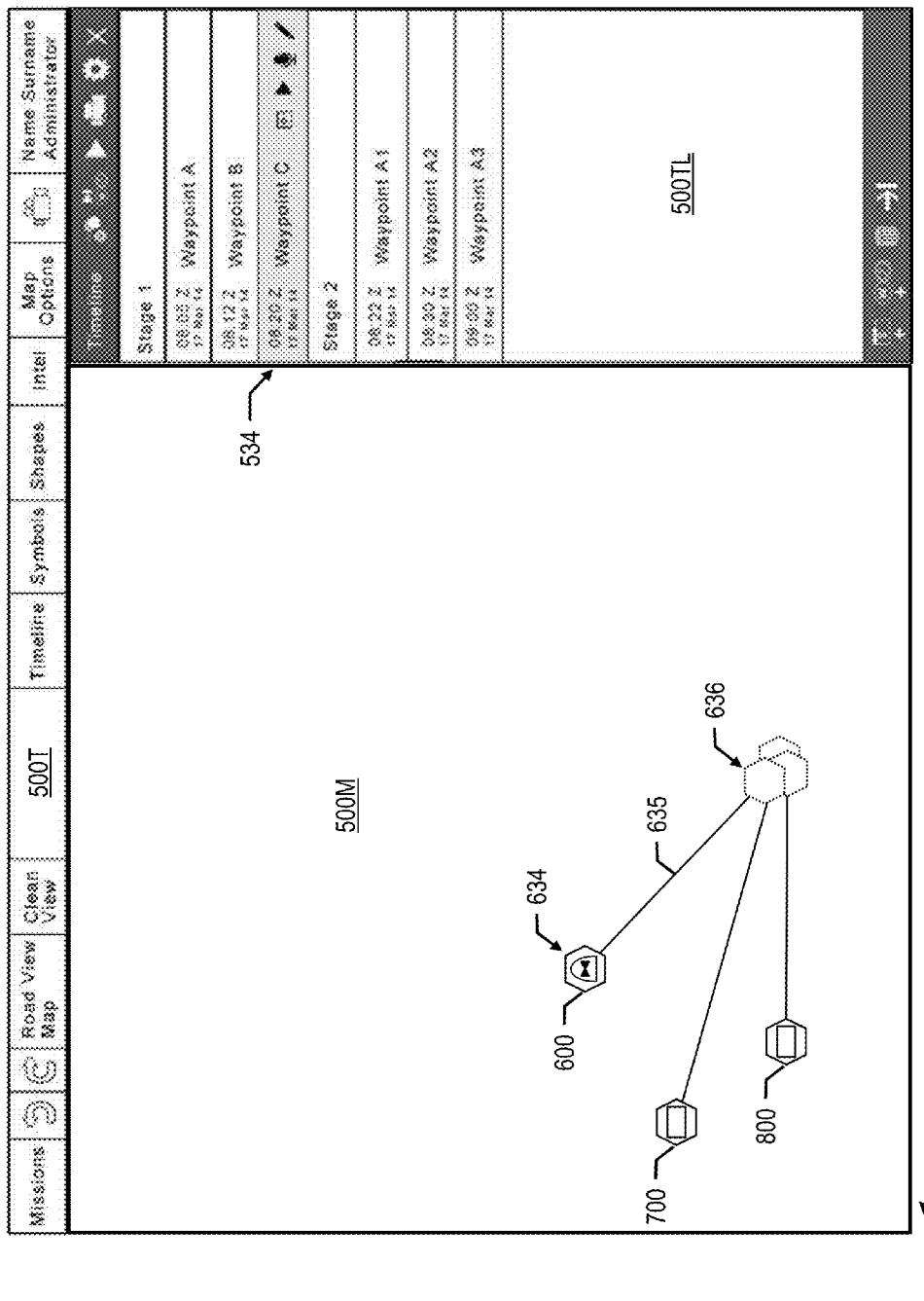
Figure 25:
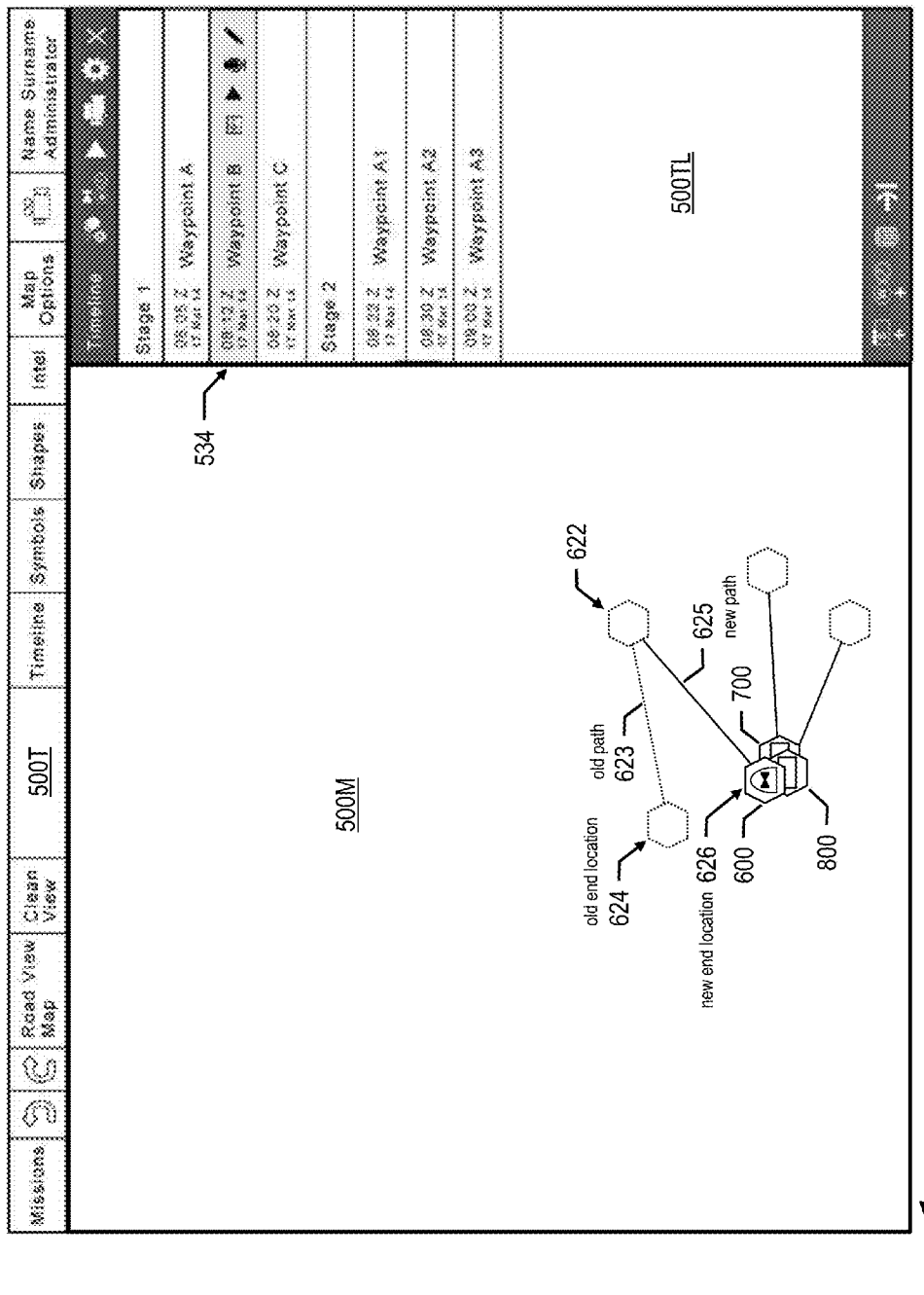

In another example, the user first selects the particular waypoint in the timeline panel 500TL, which is then highlighted by the waypoint bar 534. For example, the user may select Waypoint C of Stage 1, as depicted in FIG. 21. In order to move the start location for symbol 600 in Waypoint C, the user first selects the path 633, which changes the start location to an "A" symbol and the end location to a "B" symbol, as depicted in FIG. 22. The user may then change the start location 632 by selecting, dragging and dropping the symbol A from the old start location 632 to the new start location 636, which creates a new path 635, as depicted in FIG. 23. After the changes are saved, the regular display of symbol 600 is restored, as depicted in FIG. 24. Importantly, the end location and path for symbol 600 in the preceding Waypoint B is changed to reflect the new start location for symbol 600 in Waypoint C. As depicted in FIG. 25, the old end location 624 is changed to the new end location 626, which is the new start location 636, and the old path 623 is changed to the new path 625. While this movement change has been effected within a single stage, i.e., Stage 1, movement changes can also be effected across stages.

Figure 26:
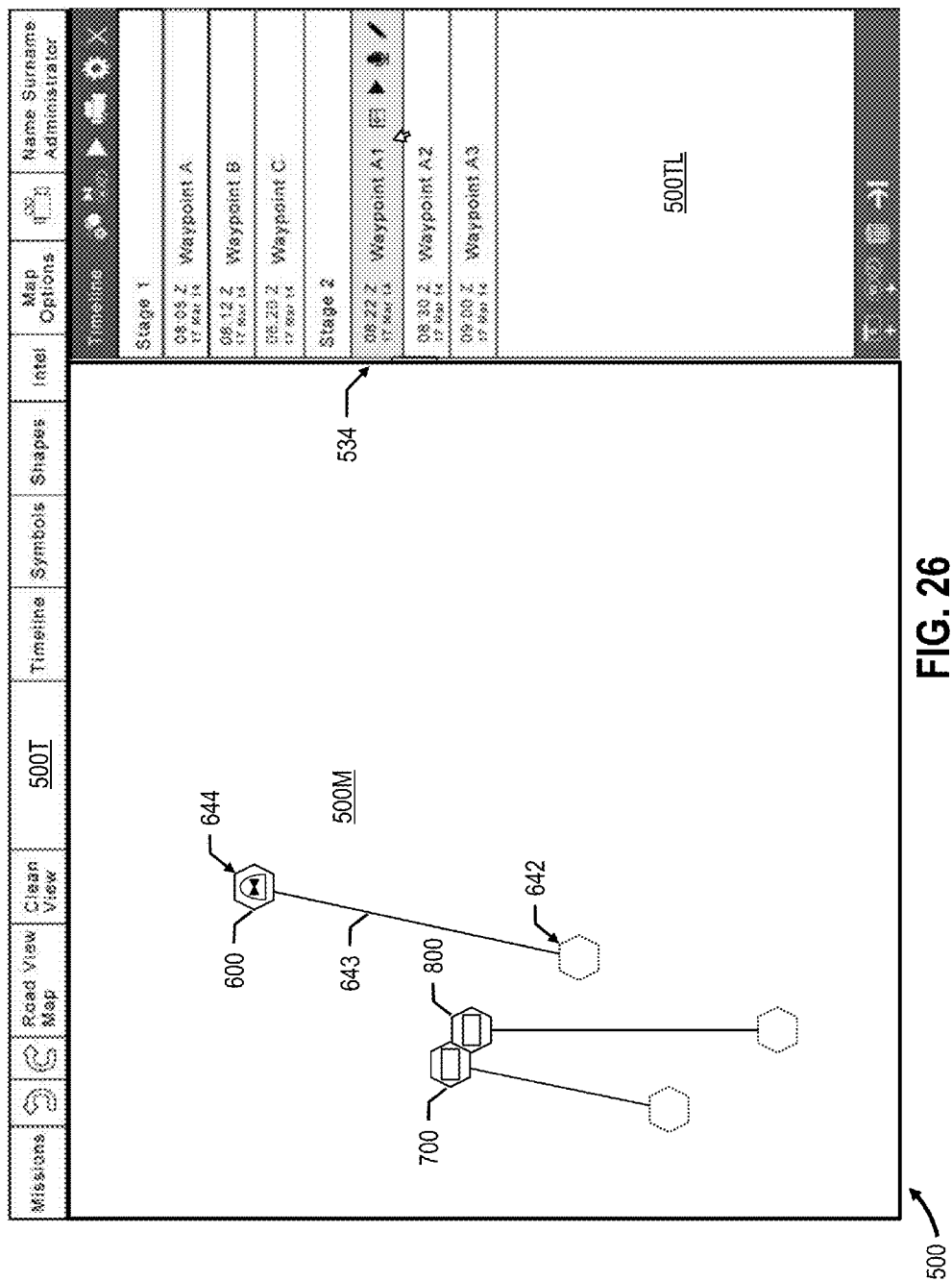
Figure 27:
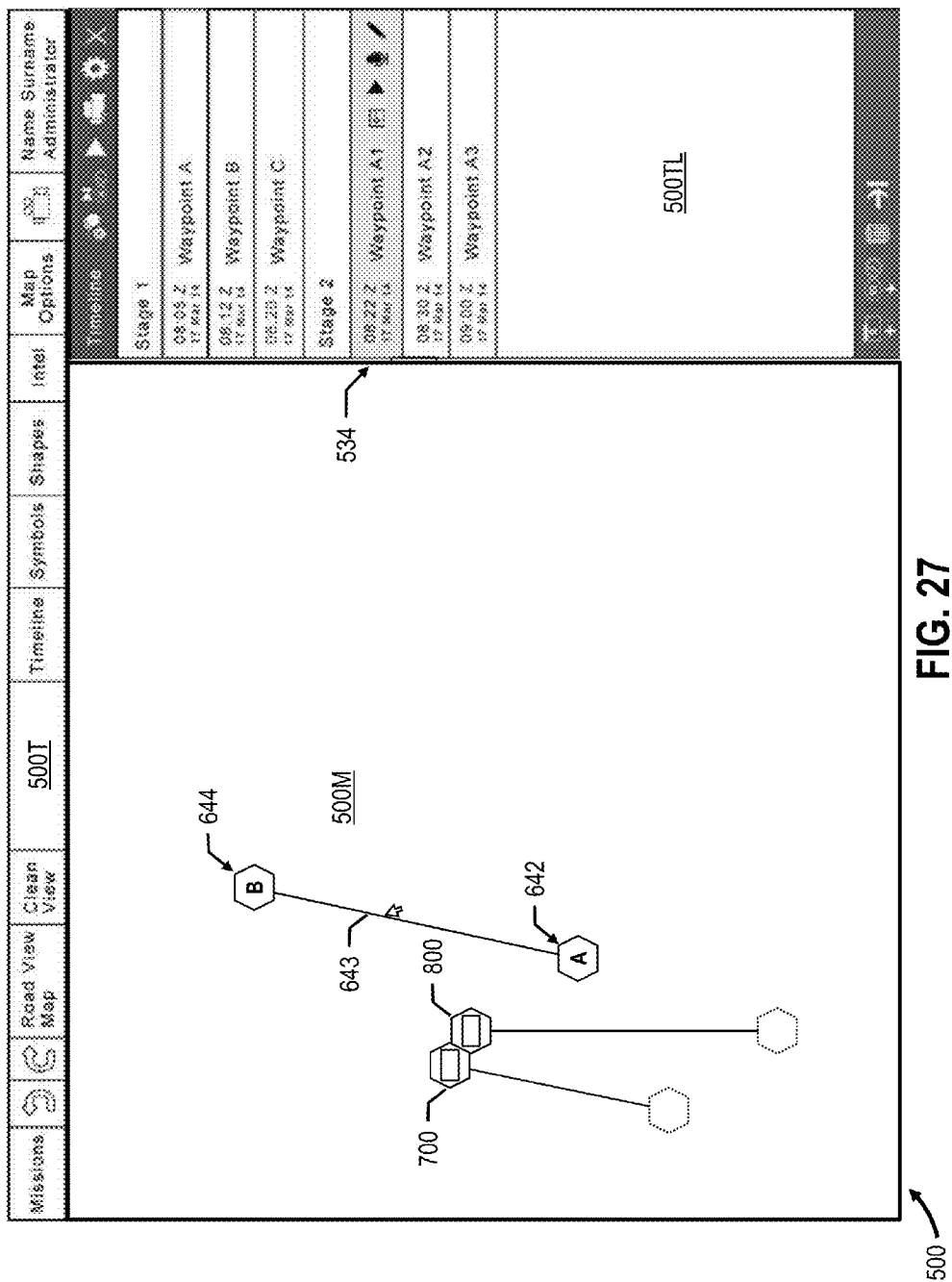
Figure 28:
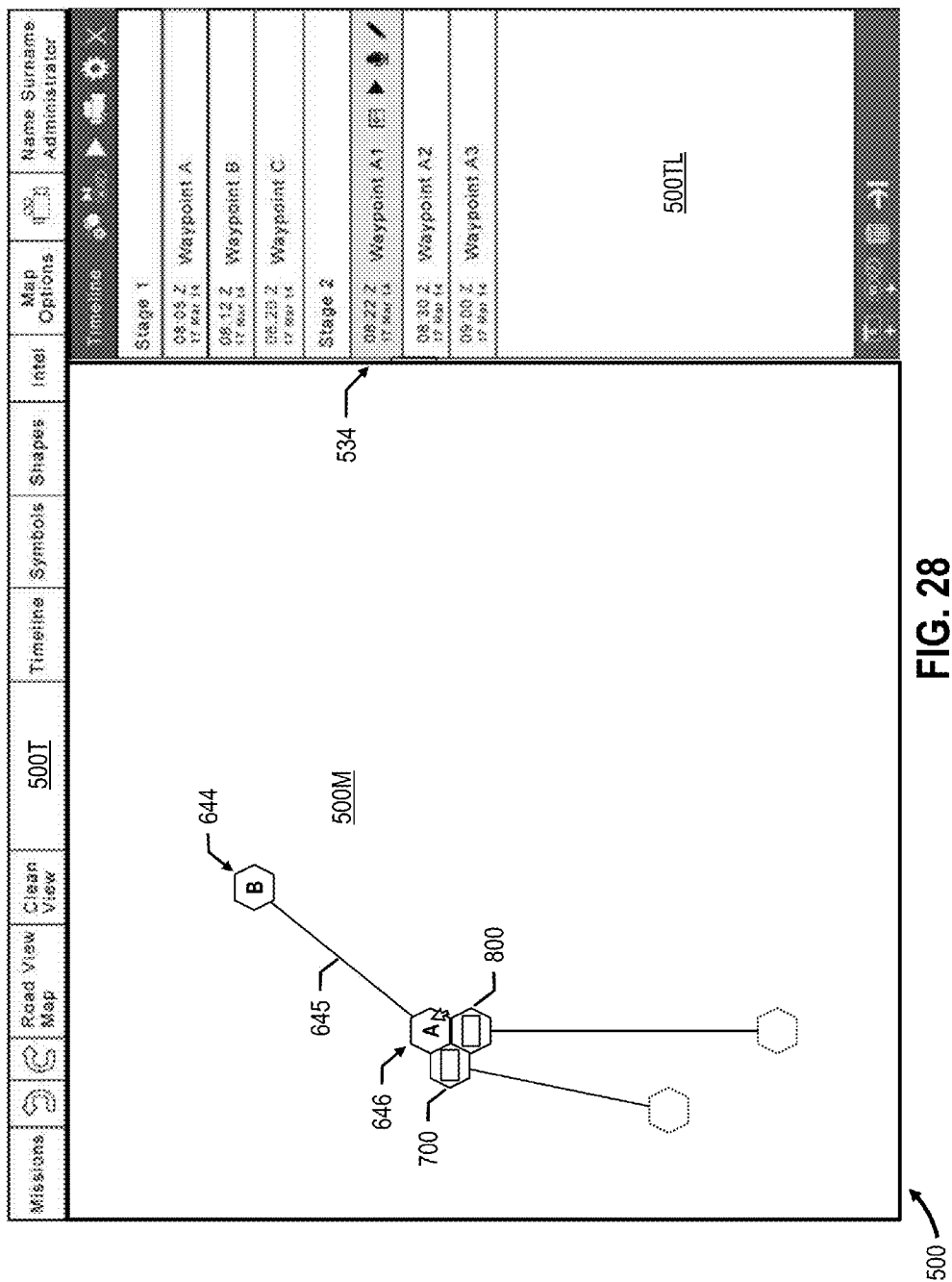
Figure 29:
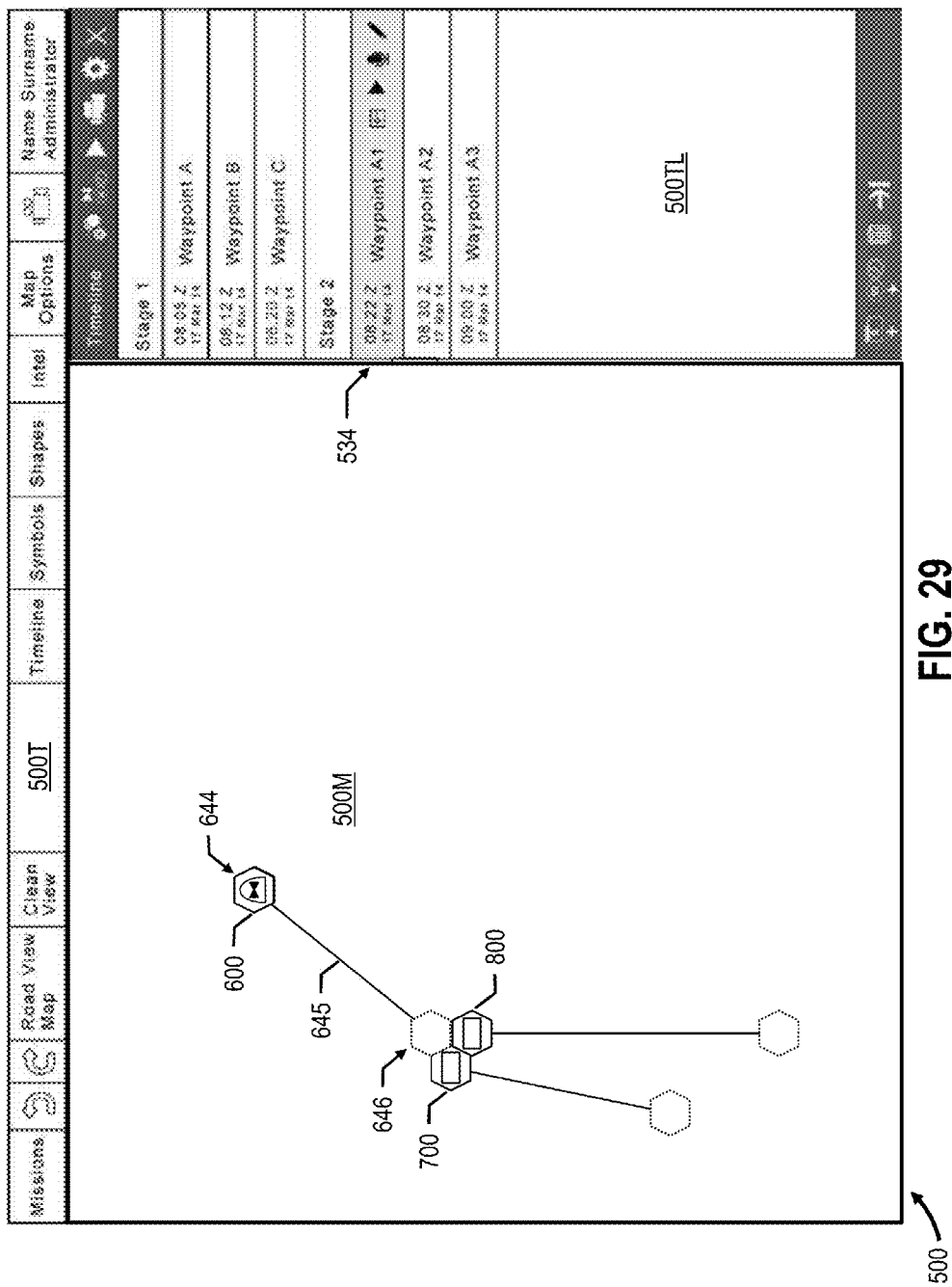
Figure 30:
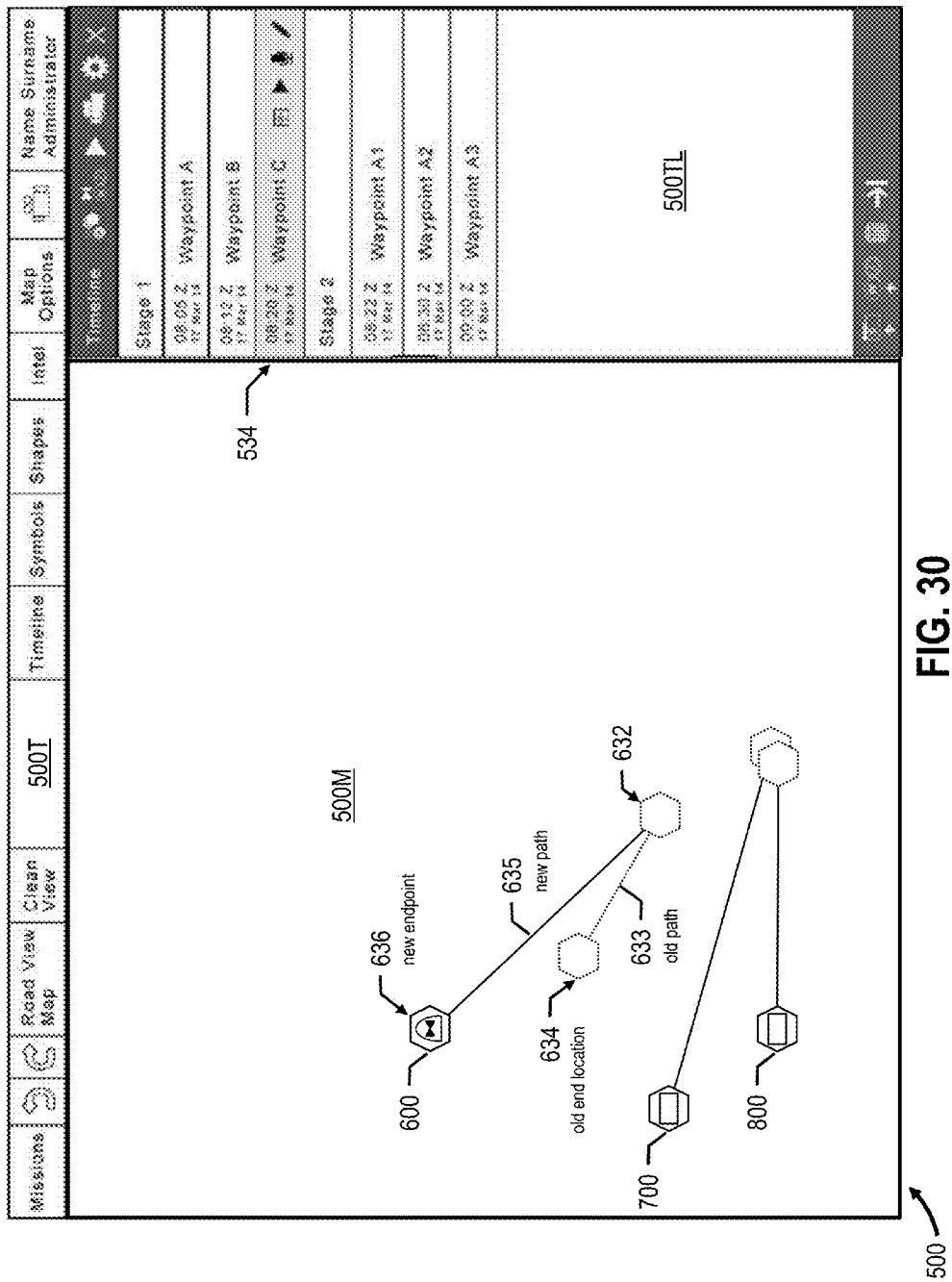

In a further example, the user first selects the particular waypoint in the timeline panel 500TL, which is then highlighted by the waypoint bar 534. For example, the user may select Waypoint A1 of Stage 2, as depicted in FIG. 26. In order to move the start location for symbol 600 in Waypoint A1, the user first selects the path 643, which changes the start location to an "A" symbol and the end location to a "B" symbol, as depicted in FIG. 27. The user may then change the start location 642 by selecting, dragging and dropping the symbol A from the old start location 642 to the new start location 646, which creates a new path 645, as depicted in FIG. 28. After the changes are saved, the regular display of symbol 600 is restored, as depicted in FIG. 29. Importantly, the end location and path for symbol 600 in the preceding Waypoint C of Stage 1 is changed to reflect the new start location for symbol 600 in Waypoint A1 of Stage 2. As depicted in FIG. 30, the old end location 634 is changed to the new end location 636, which is the new start location 646, and the old path 633 is changed to the new path 635.

When a user desires to add a symbol to a particular waypoint, the mission planner module 230 advantageously allows the user to add the symbol without the need to delete every stage and waypoint that succeeds that particular waypoint, and then recreate those deleted stages and waypoints after the symbol has been added. Instead, the mission planner module 230 adds the new symbol, to the waypoint, accepts any movements of the symbol by the user, and adds the symbol to each successive waypoint of the stage, as well as to each waypoint of each successive stage.

Figure 31:
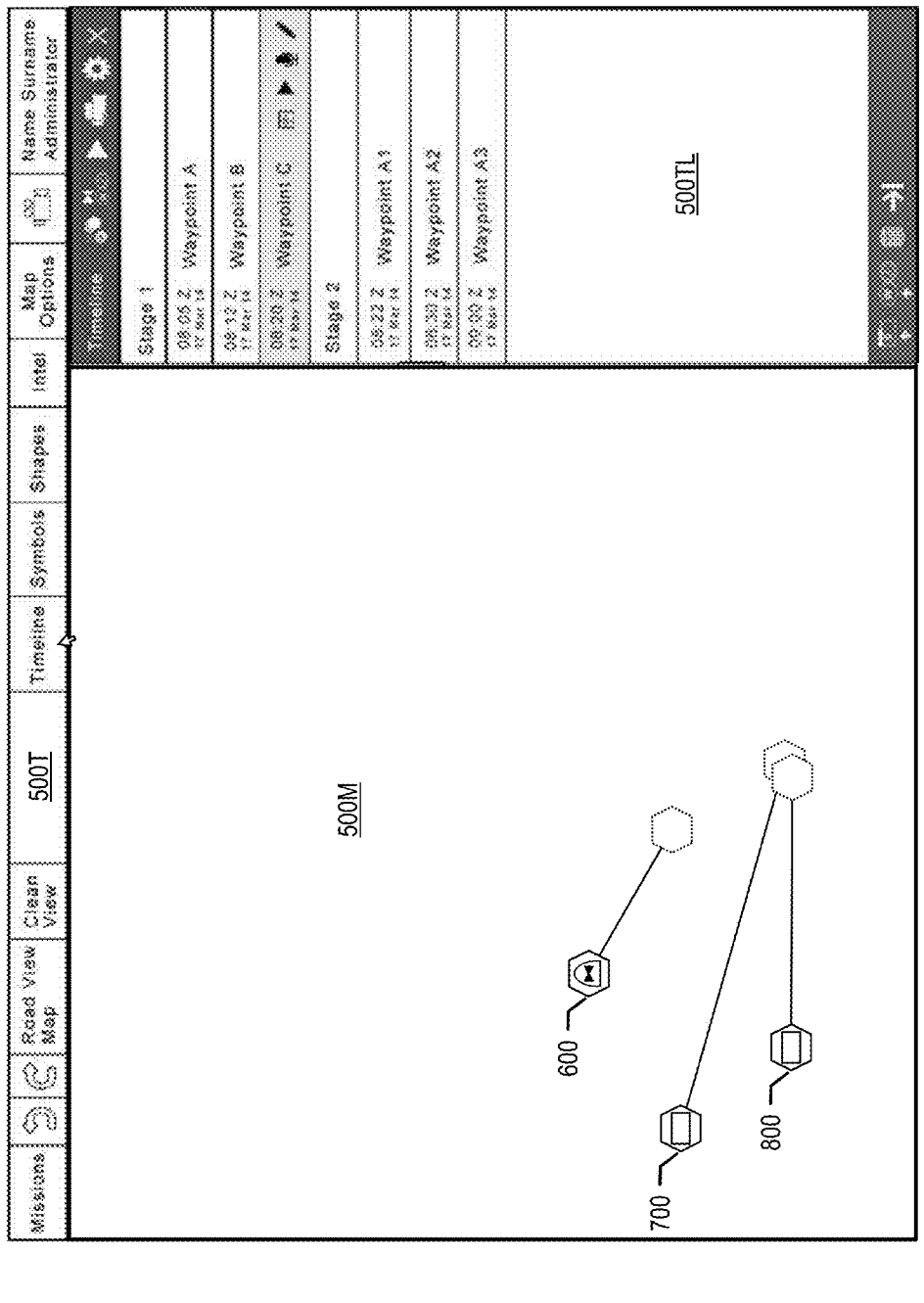
FIGS. 31-38 present a series of plan edit screens depicting the addition of a symbol in a waypoint, in accordance with an embodiment of the present invention.
Figure 32:
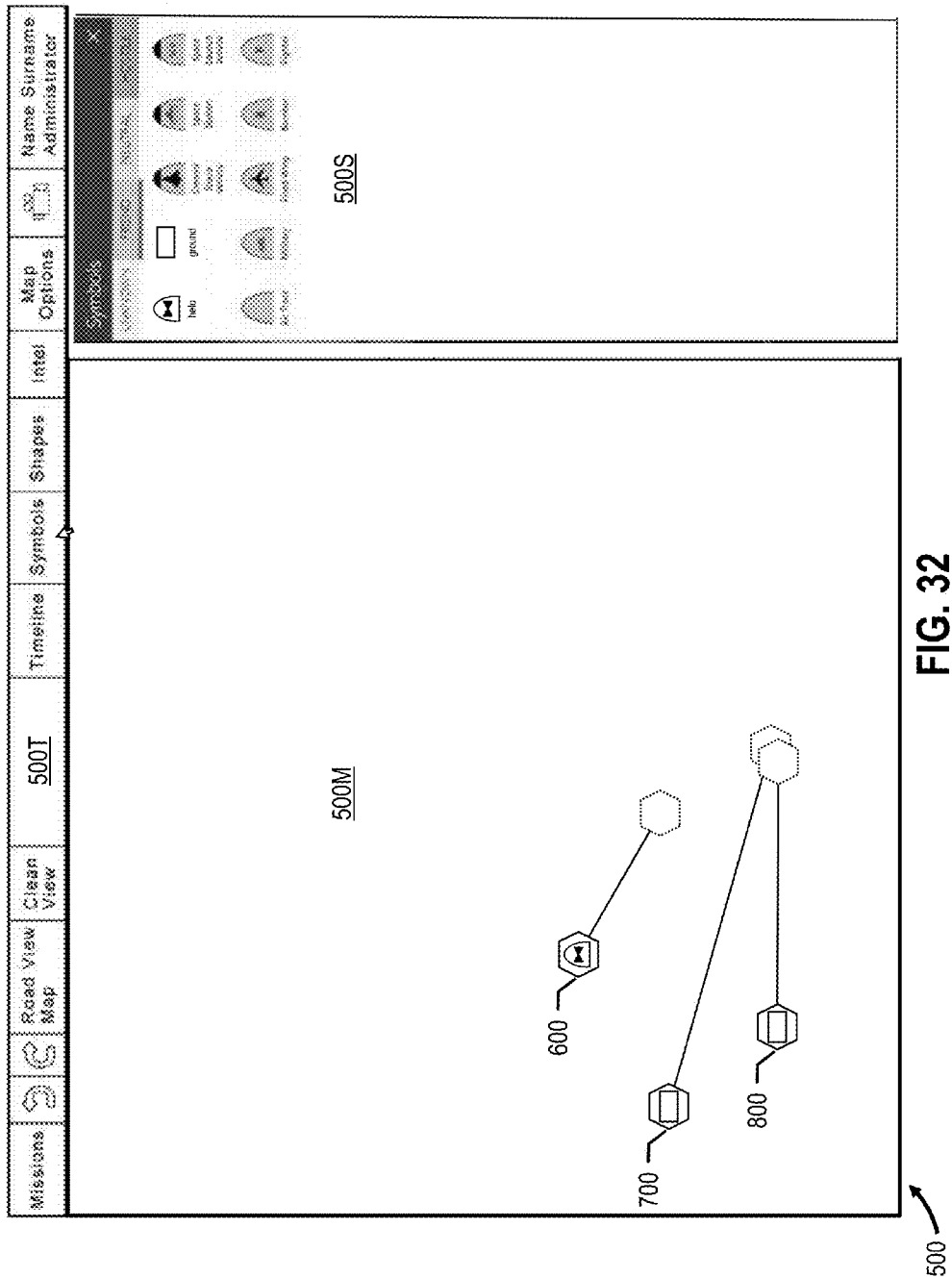
Figure 33:
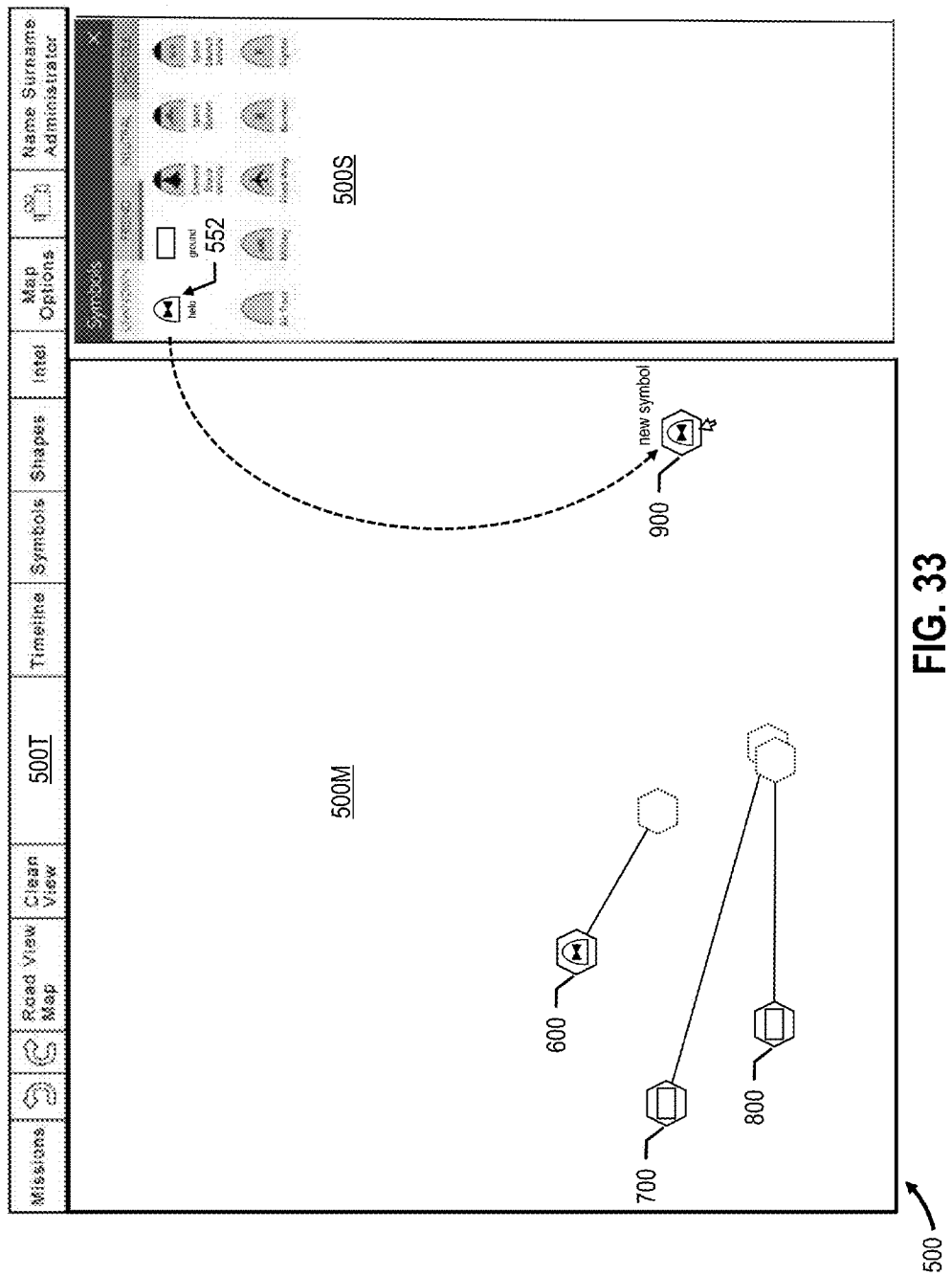
Figure 34:
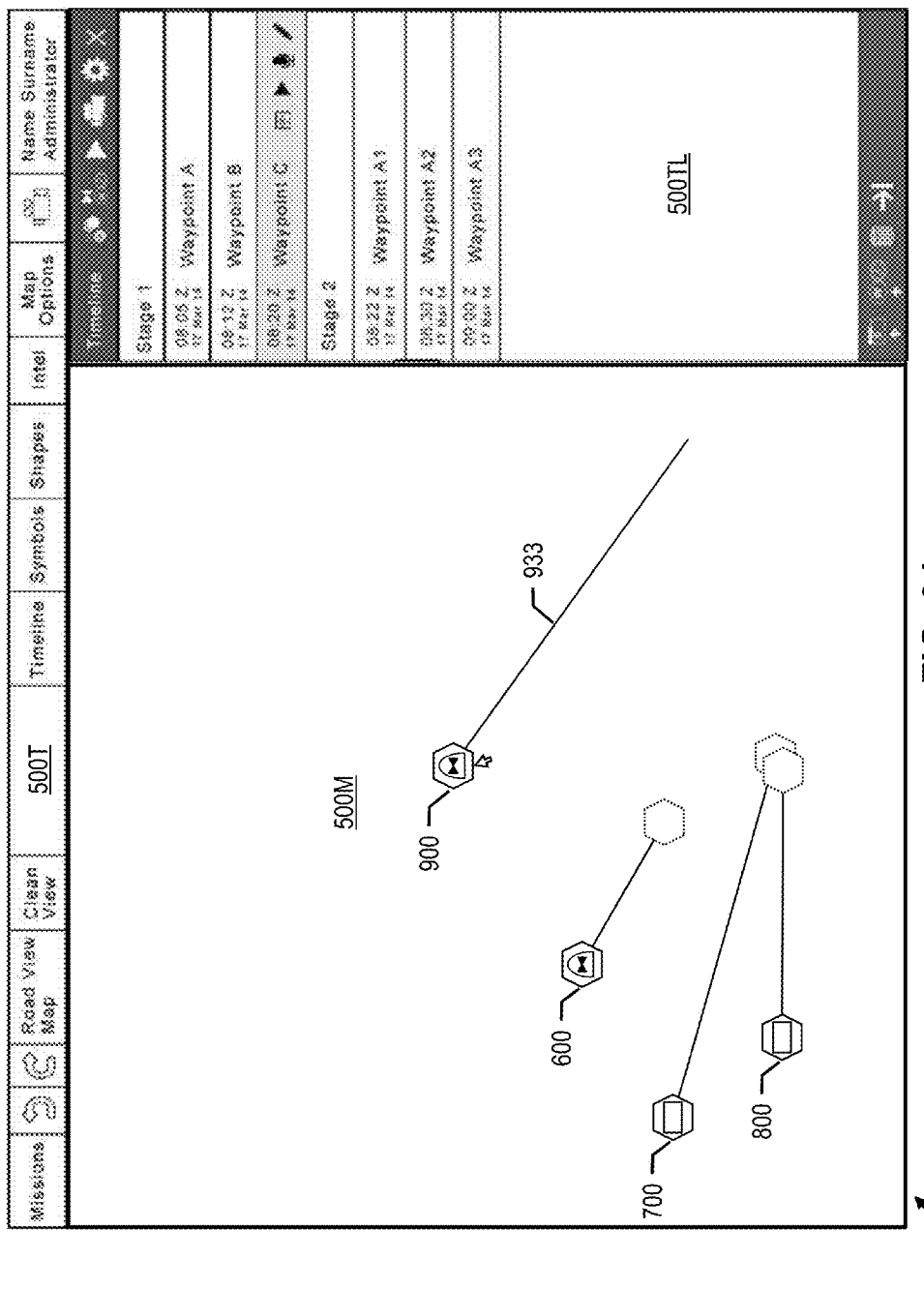
Figure 35:
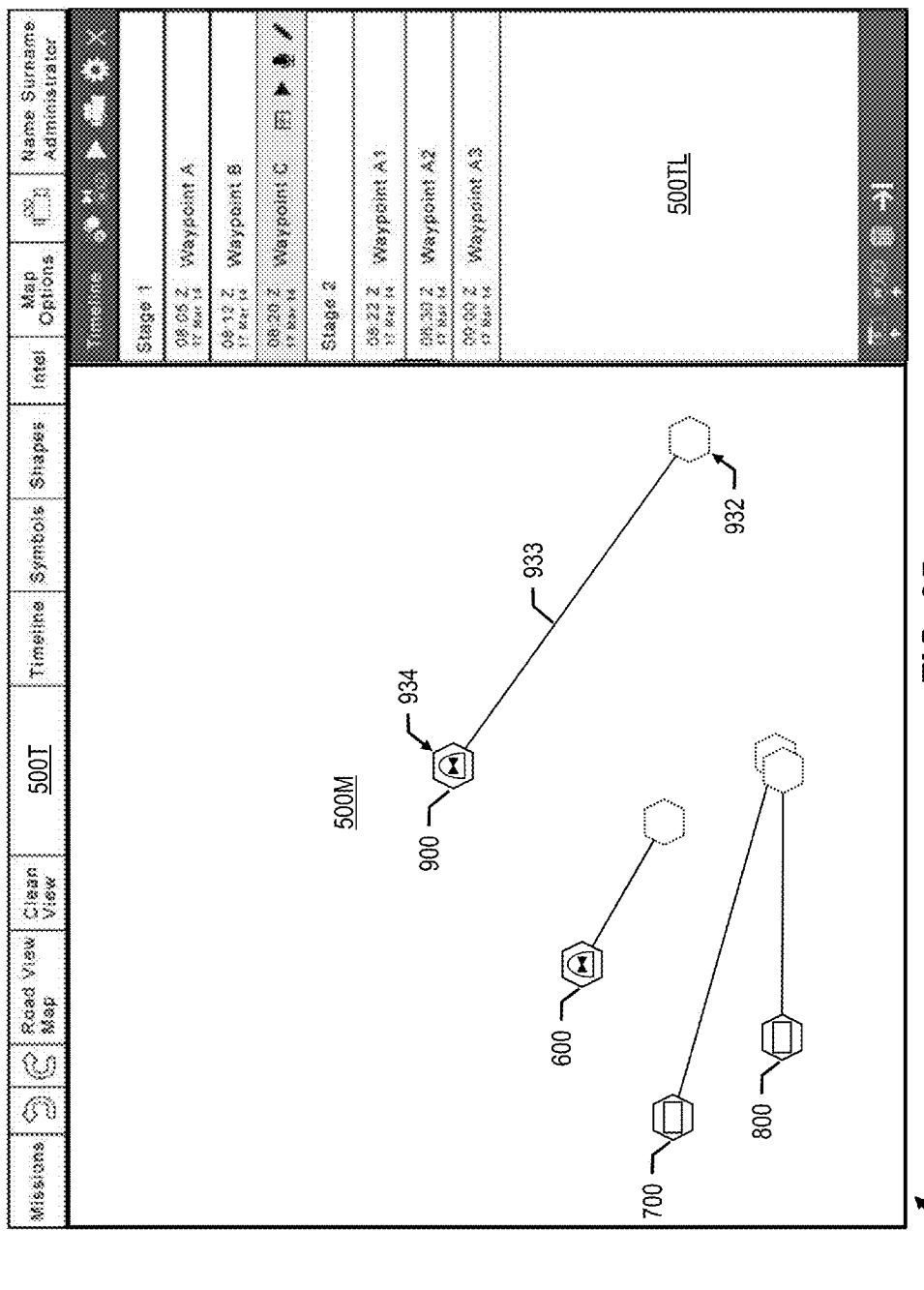
Figure 36:
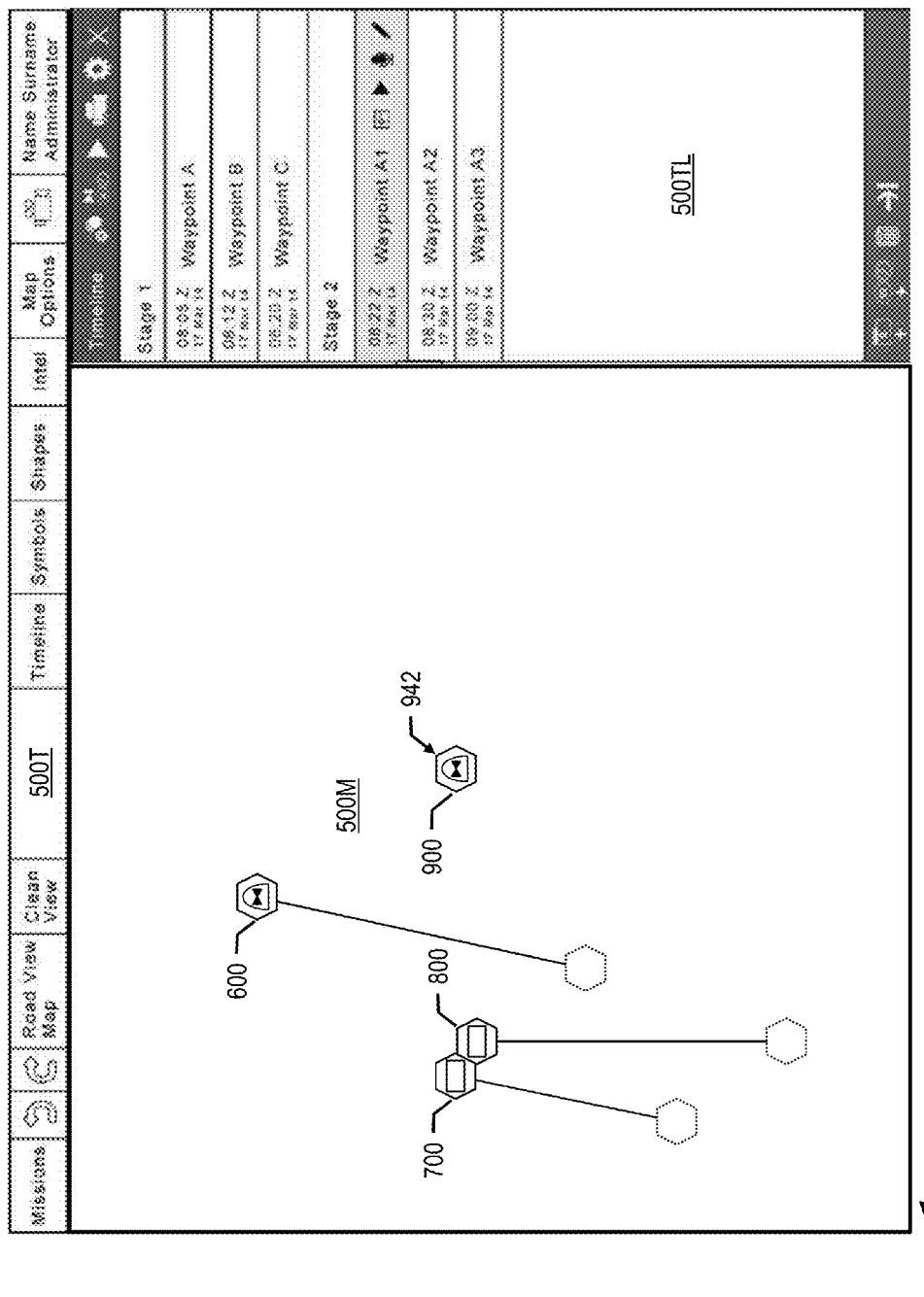
Figure 37:
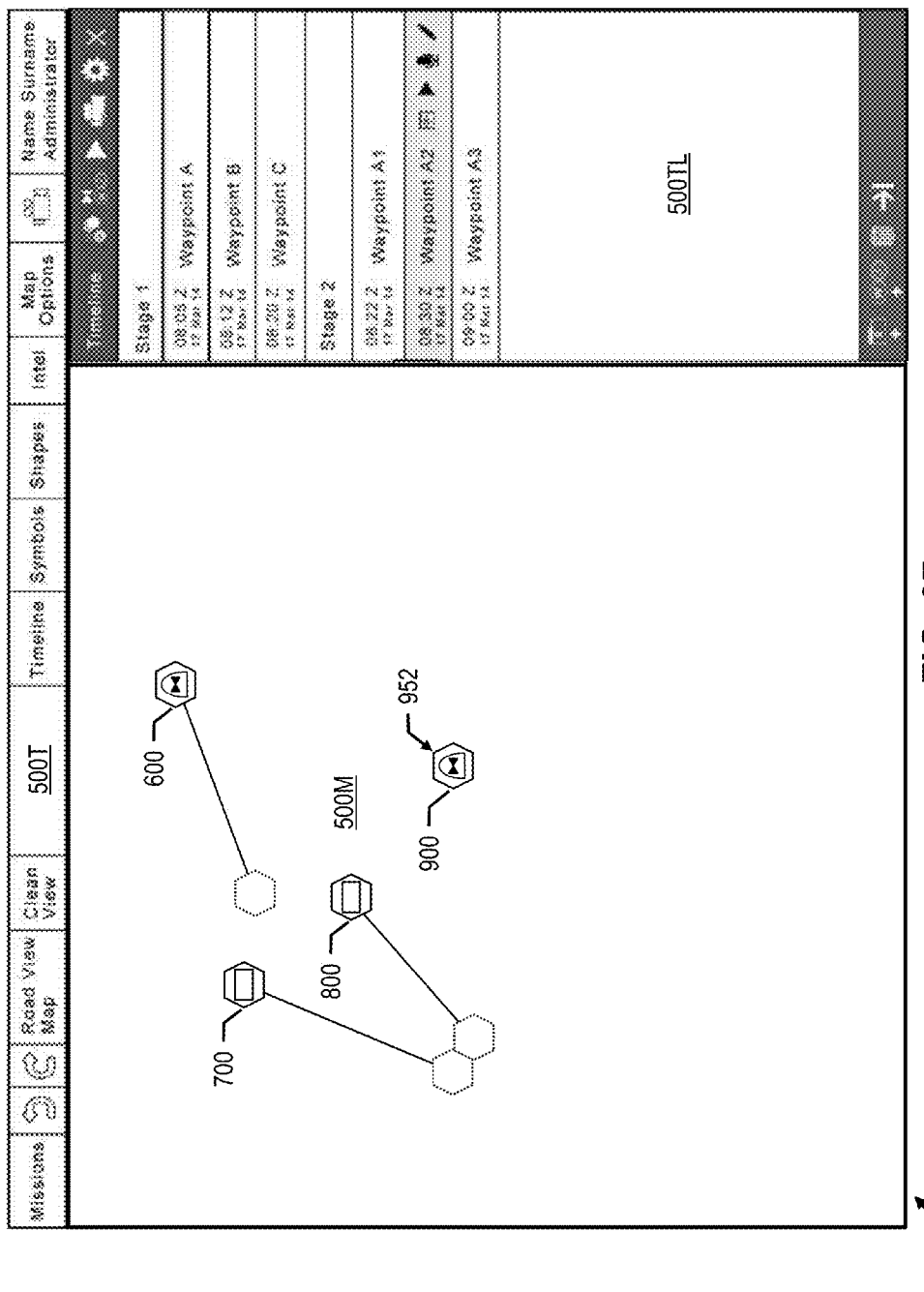
Figure 38:
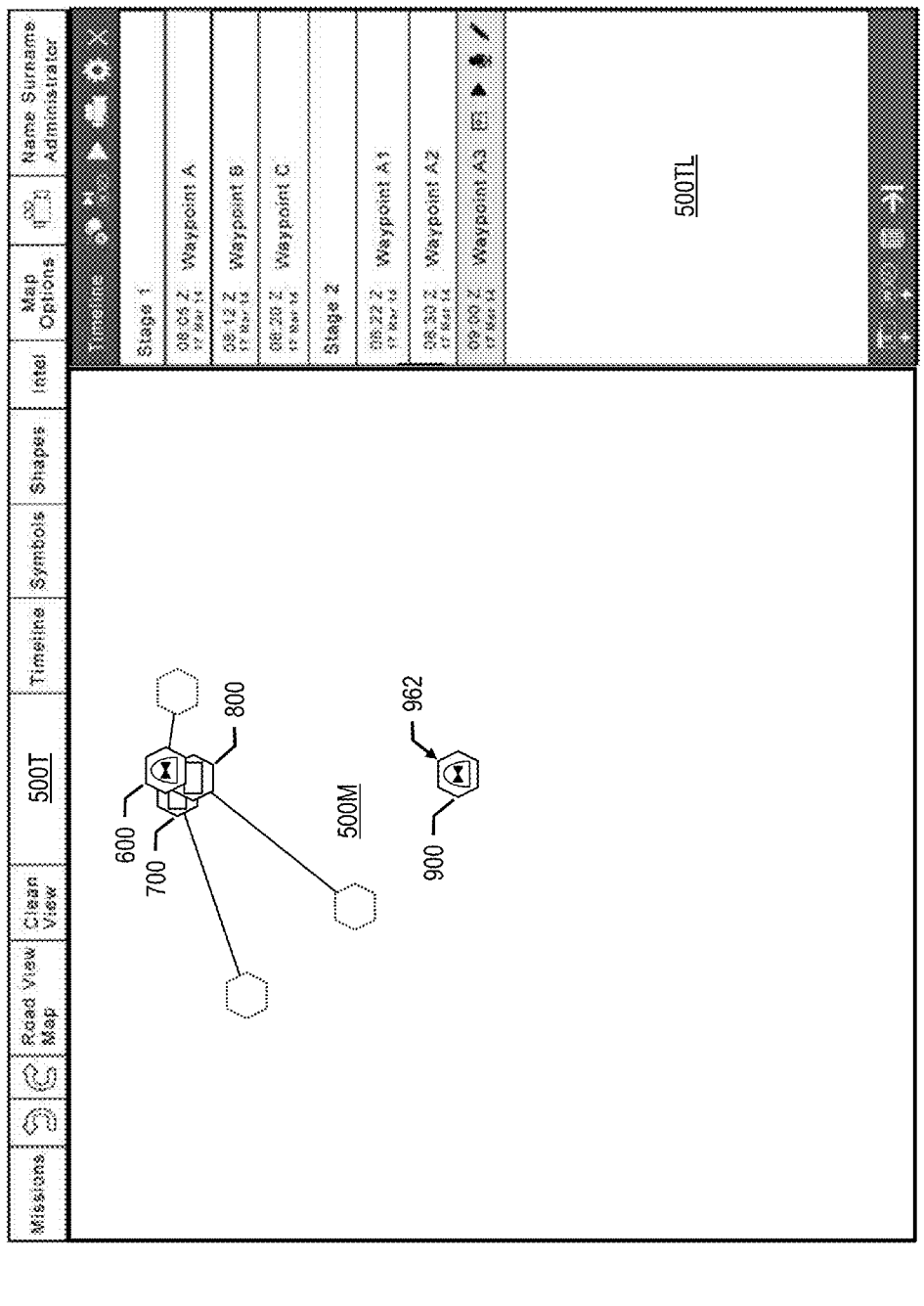

The user first selects the particular waypoint in the timeline panel 500TL, which is then highlighted by the waypoint bar 534. For example, the user may select Waypoint C of Stage 1, as depicted in FIG. 31, and then selects the symbol panel 500S, as depicted in FIG. 32. The user then selects, drags and drops the helo symbol 552 from the symbols panel 500S onto the mission panel 500M at a particular location on the map. The helo symbol 552 is converted to symbol 900, as depicted in FIG. 33, and the user may then access and enter data into the symbol context menu 515. The user may then move the symbol 900 as desired, as depicted in FIG. 34, and the start location 932, end location 934 and path 933 are depicted in the mission panel 500M, as depicted in FIG. 35. The mission planner module 230 then adds the symbol 900, and its end location 934, to each successive waypoint. The end location 934 becomes the start location 942 in Waypoint A1 of Stage 2, the start location 952 in Waypoint A2 and the start location 962 in Waypoint A3 of Stage 2, as depicted in FIGS. 36, 37 and 38, respectively.

When a user desires to hierarchically nest symbols in a particular waypoint based on symbol type, the mission planner module 230 advantageously allows the user to nest the symbols without the need to delete every stage and waypoint that succeeds that particular waypoint, and then recreate those deleted stages and waypoints after the symbols have been nested. Instead, the mission planner module 230 nests the symbols in that particular waypoint, adds the nested symbols to each subsequent waypoint of the stage, and adds the nested symbols to each waypoint of each subsequent stage. In one embodiment, the movement of the parent symbol, into which the other symbols are nested, is not affected in the subsequent waypoints and stages.

In one embodiment, hierarchically nesting the symbols includes arranging the nested symbols according to a hierarchical rule set, as defined by business rules within the system, and preventing the nesting of a particular symbol if a rule is violated. For example, the system will not allow a jet to be nested within a soldier, notifying the user that the nesting cannot occur.

Figure 39:
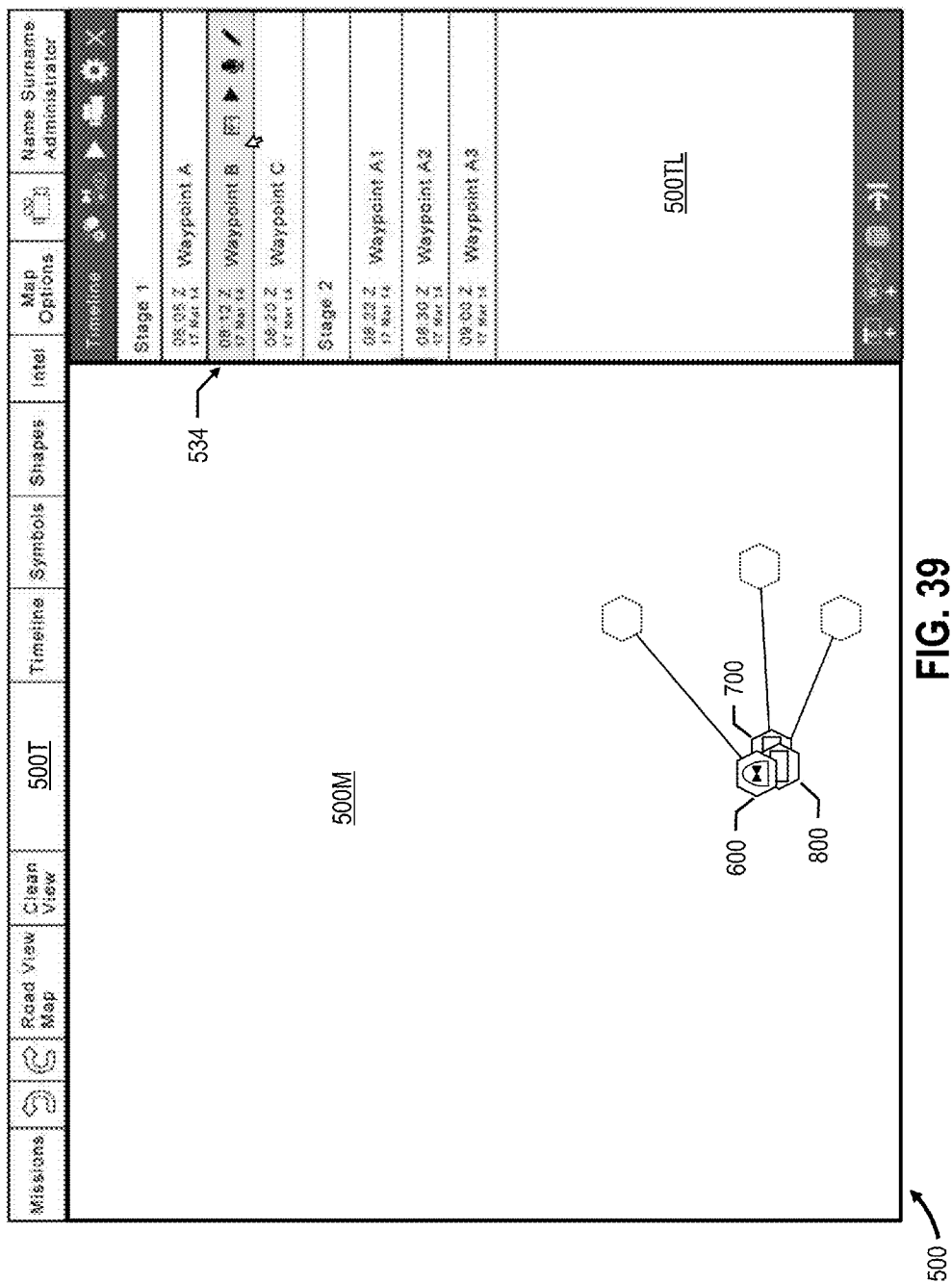
FIGS. 39-54 present a series of plan edit screens depicting the nesting of several symbols, in accordance with an embodiment of the present invention.
Figure 40:
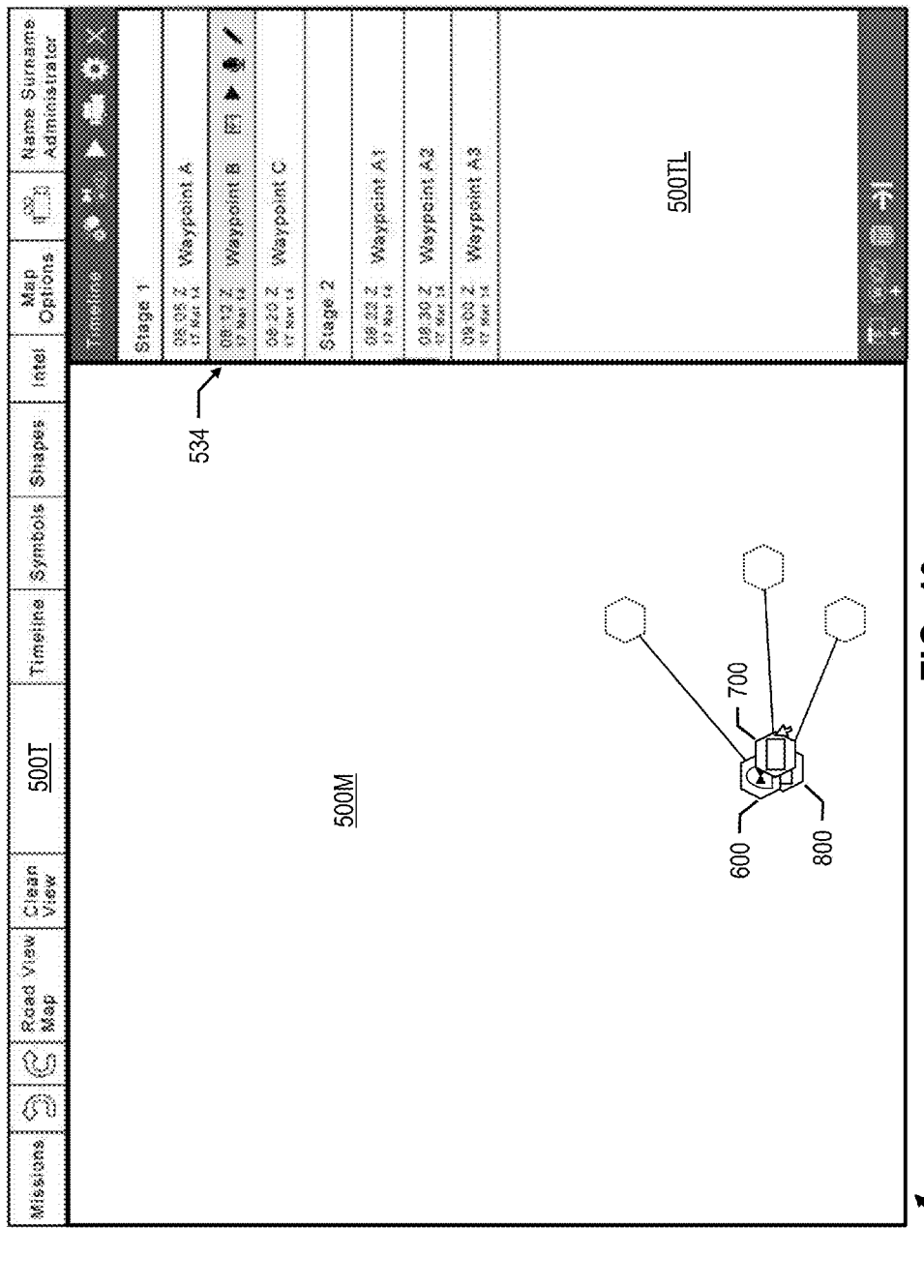
Figure 41:
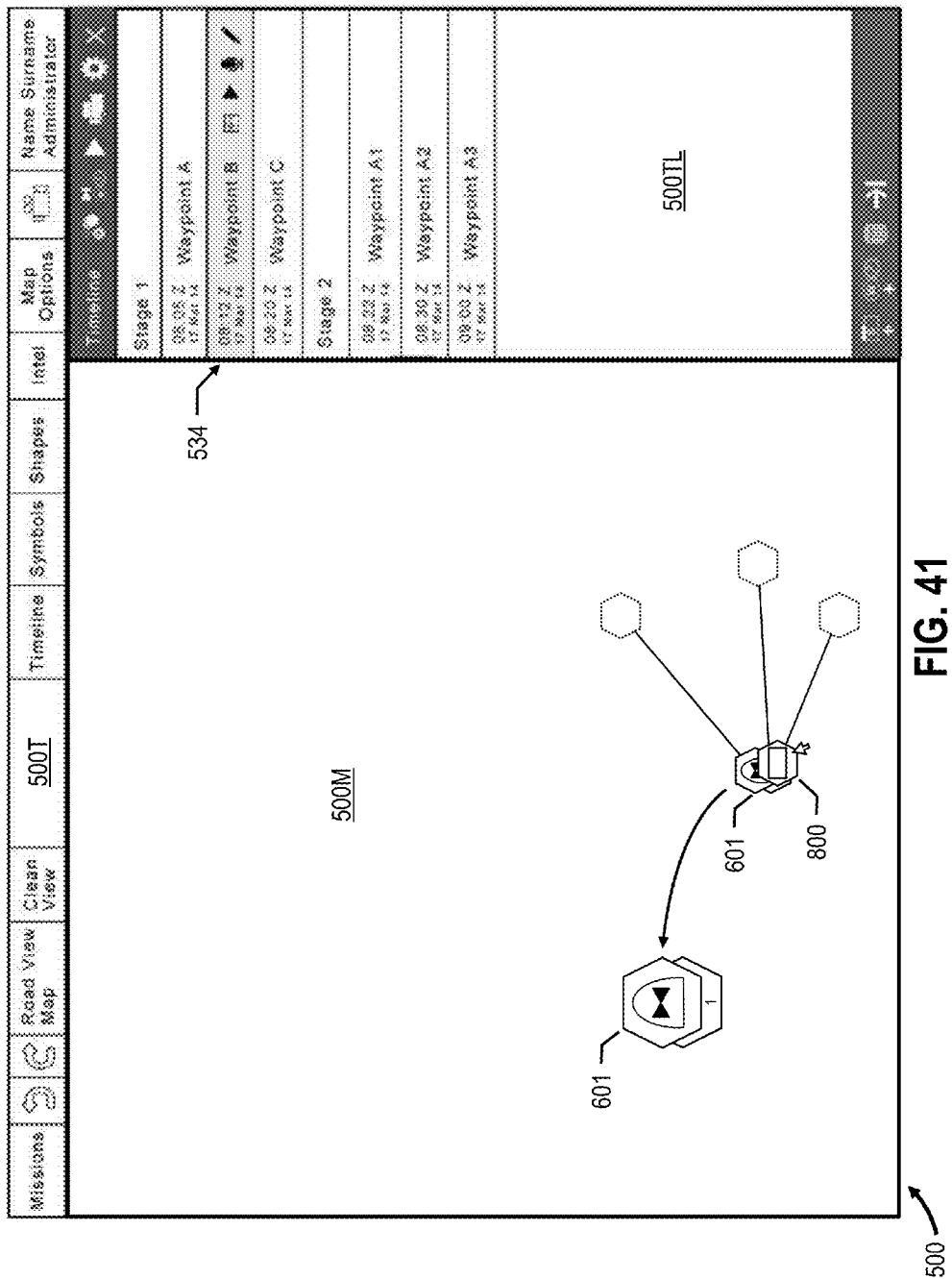
Figure 42:
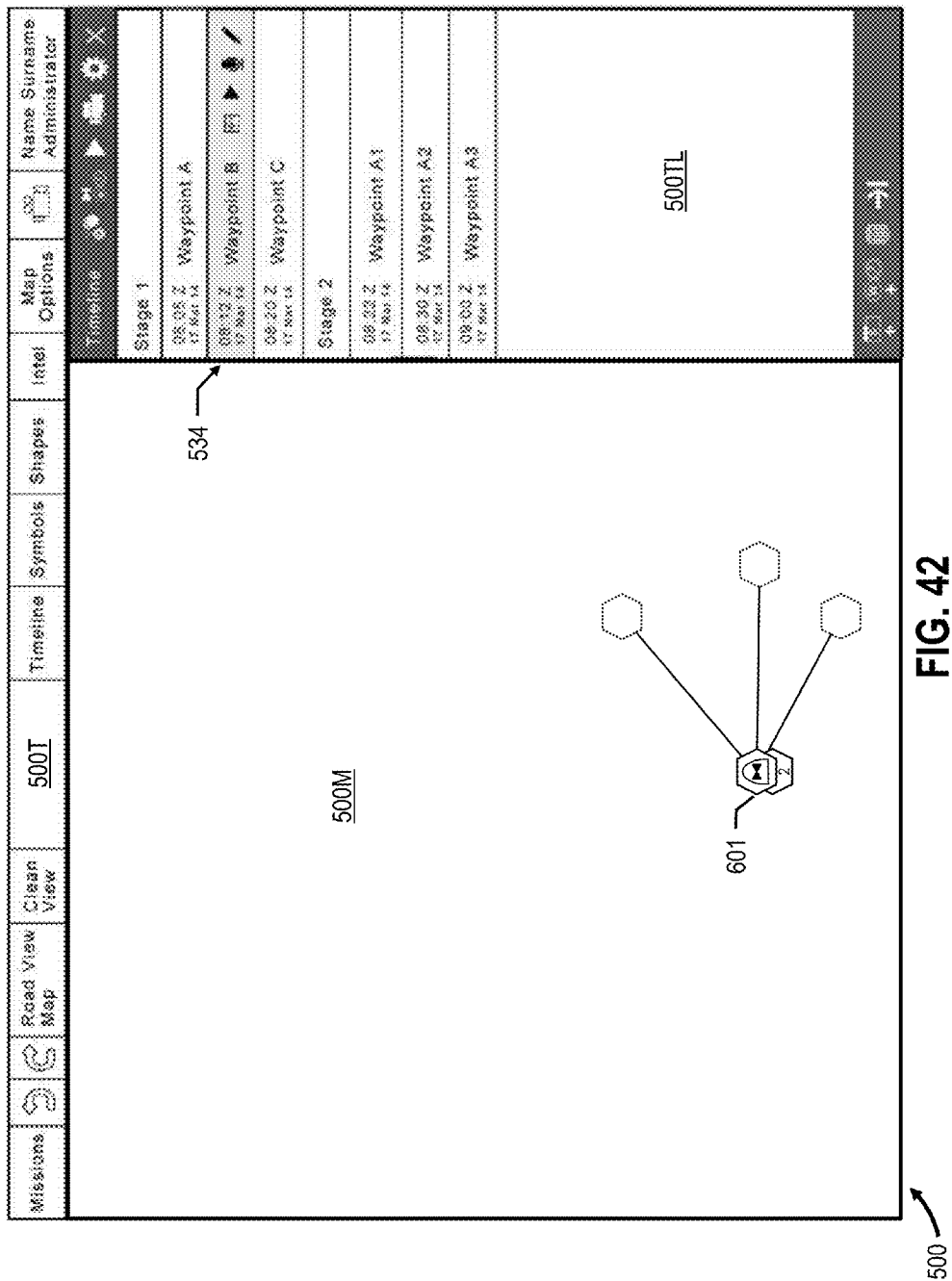
Figure 43:
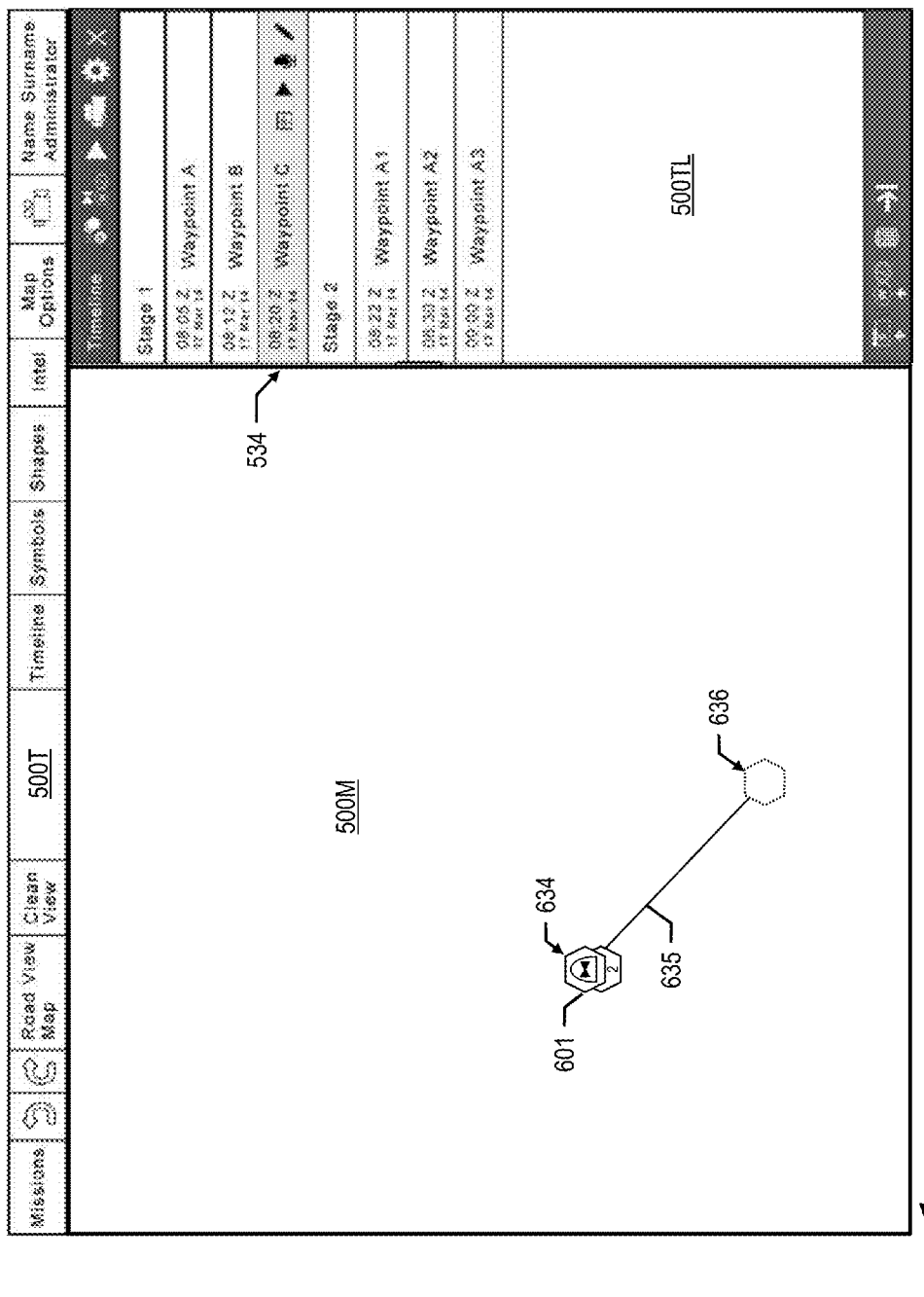
Figure 44:
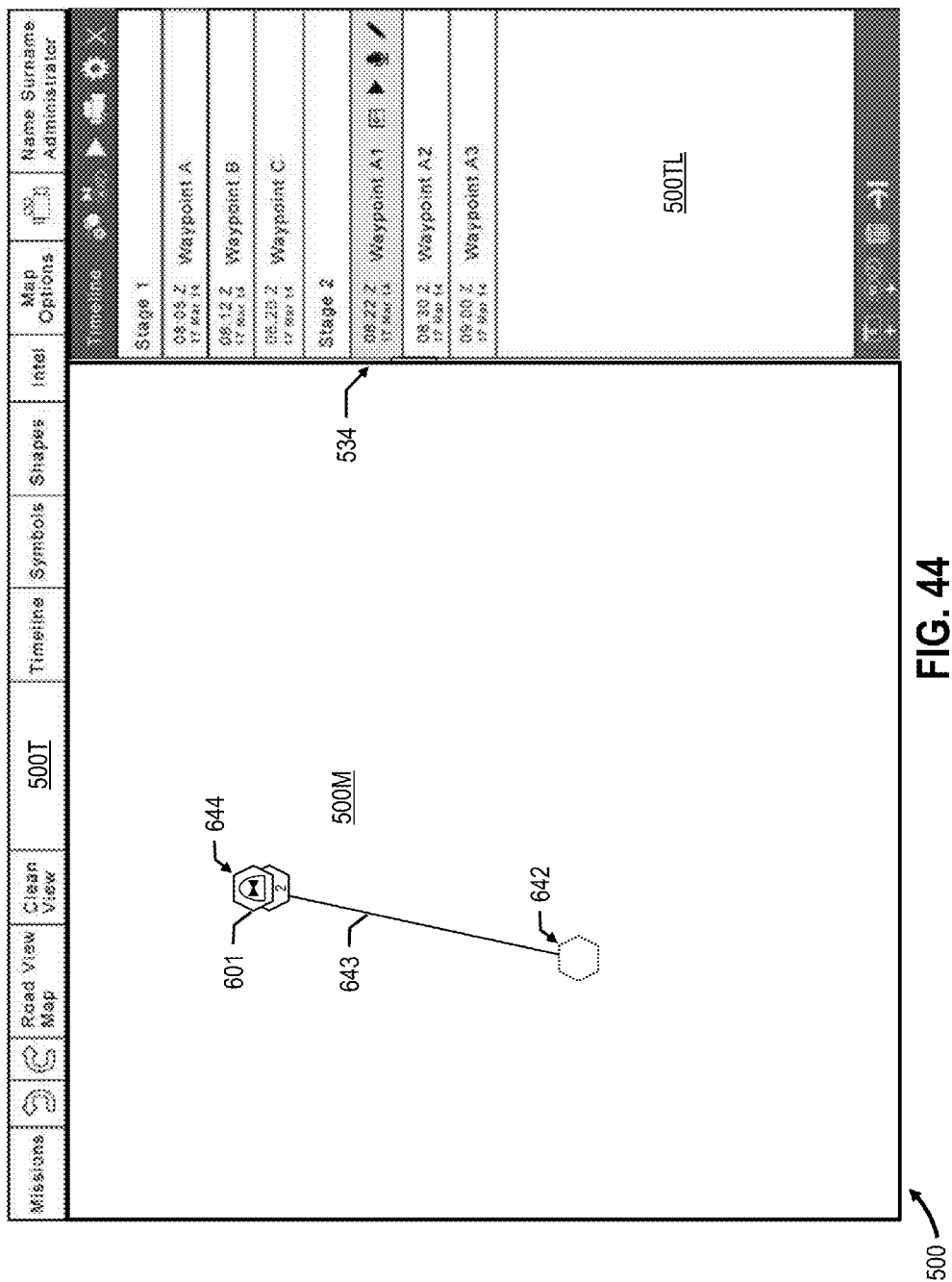
Figure 45:
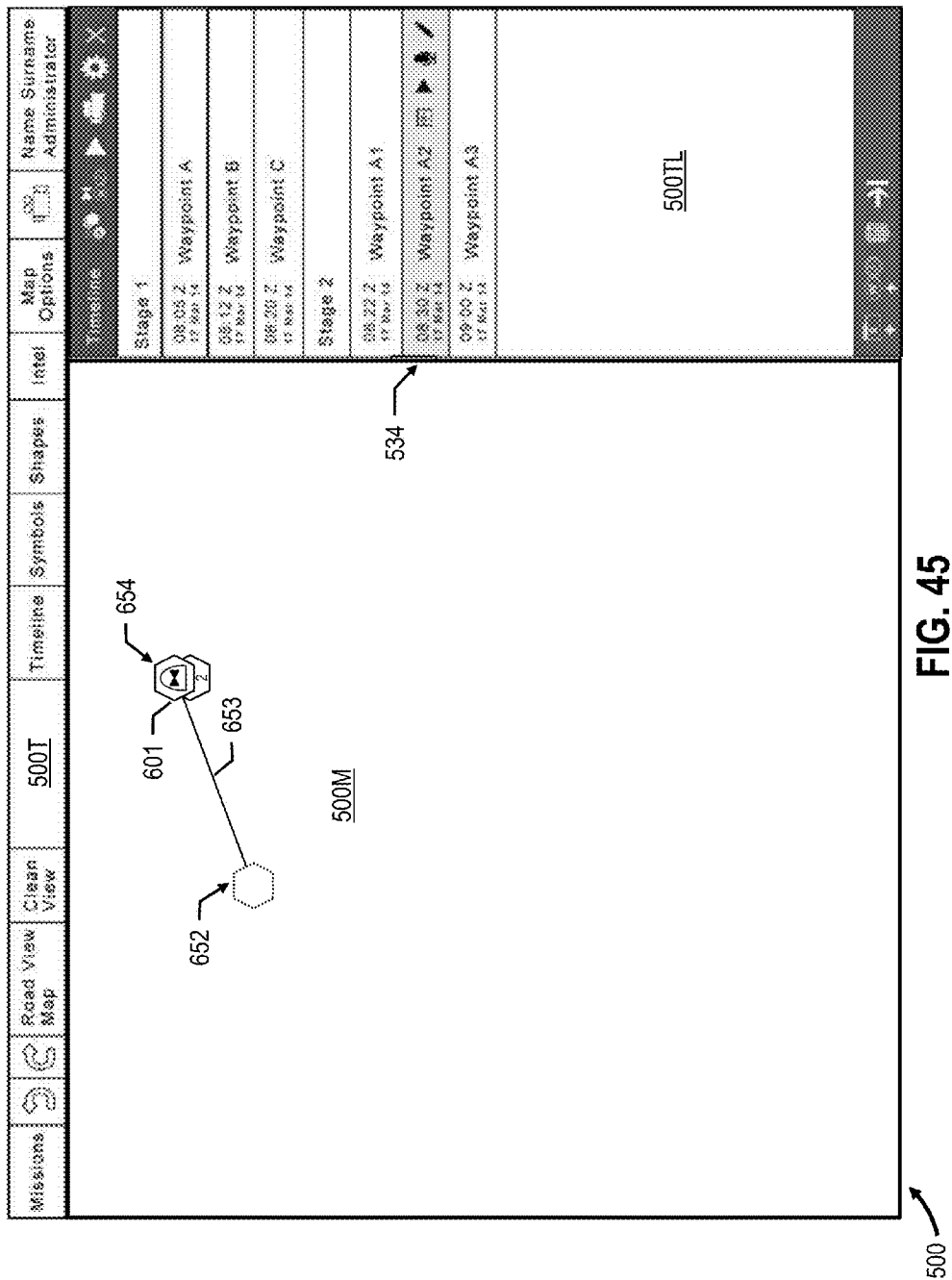
Figure 46:
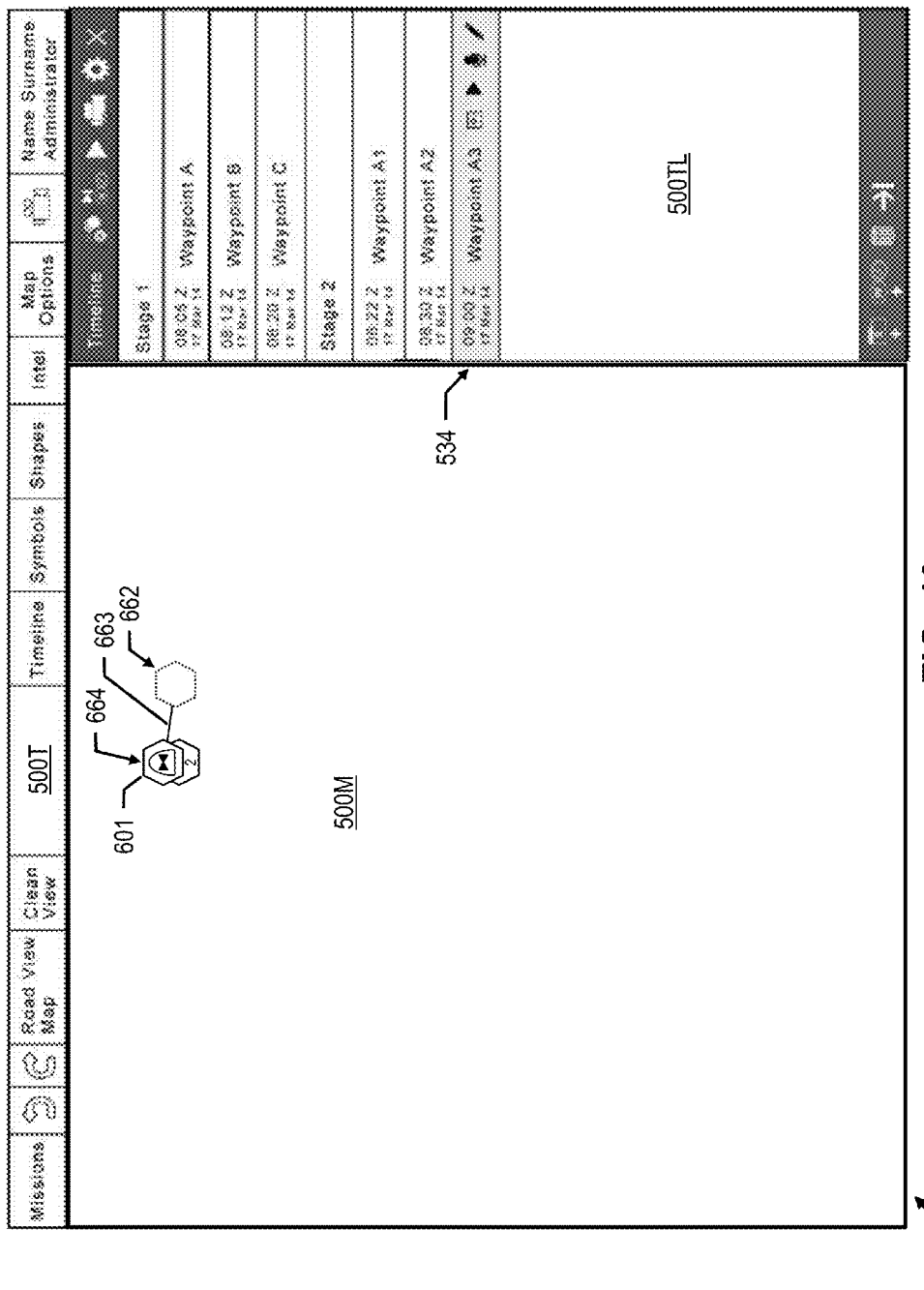

The user first selects the particular waypoint in the timeline panel 500TL, which is then highlighted by the waypoint bar 534. For example, the user may select Waypoint B of Stage 1, as depicted in FIG. 39. The use then selects symbol 700, as depicted in FIG. 40, and moves the symbol 700 over the symbol 600 to nest the ground symbol 700 into the helo symbol 600. The symbol 600 changes into the nested symbol 601, which indicates that one symbol is nested within, as depicted in FIG. 41. Similarly, the user can selects symbol 800, as depicted in FIG. 41, and moves the symbol 800 over the nested symbol 601 to nest the ground symbol 800 into the helo symbol 601. The nested symbol 601 indicates that two symbols are nested therein, as depicted in FIG. 42. The movement of symbol 601 remains the same in Waypoint C of Stage 1, and Waypoints A1, A2 and A3 of Stage 2, as depicted in FIGS. 43, 44, 45 and 46.

When a user desires to change the movement path for a nested symbol in a particular waypoint, the mission planner module 230 advantageously allows the user to adjust the movement of the nested symbol without the need to delete every stage and waypoint that succeeds that particular waypoint, and then recreate those deleted stages and waypoints after the nested symbol's movement path has been changed. Instead, the mission planner module 230 propagates a new end location for a nested symbol by changing the start location associated with the nested symbol in either the subsequent waypoint of the stage or the first waypoint of the subsequent stage to the new end location. Similarly, the mission planner module 230 propagates a new start location for a nested symbol by changing the end location associated with the nested symbol in either the preceding waypoint of the stage or the last waypoint of the preceding stage.

Figure 47:
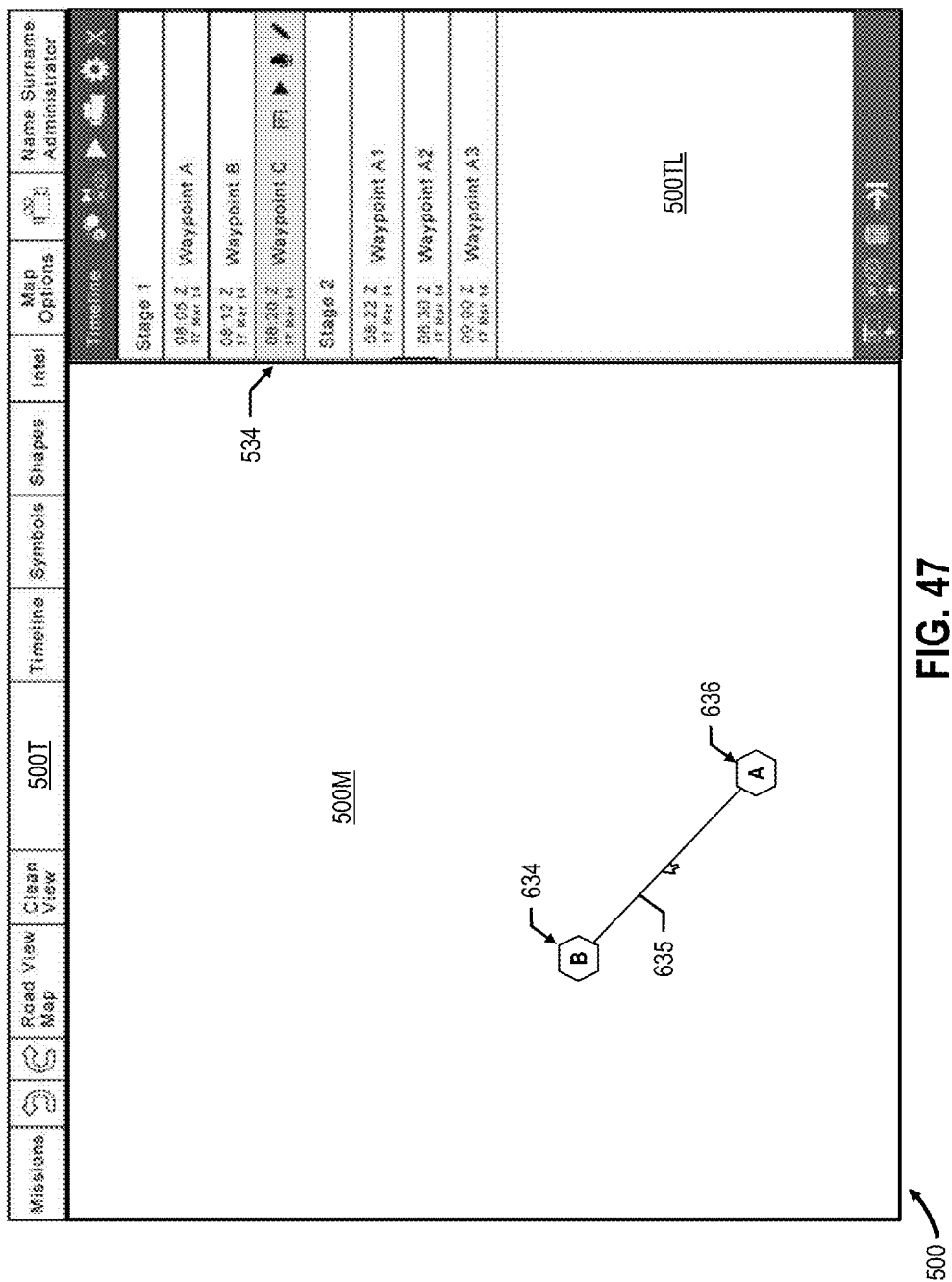
Figure 48:
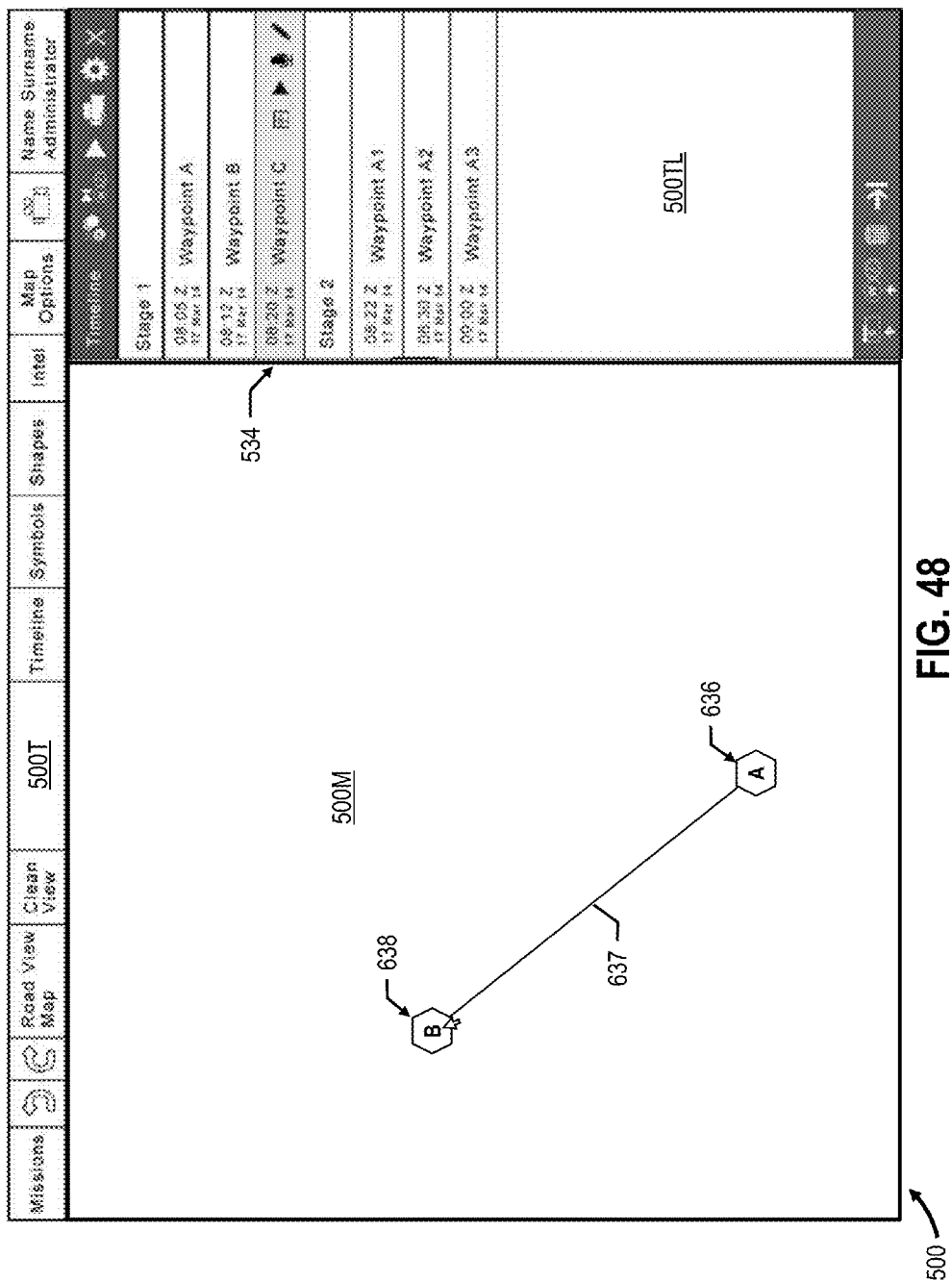
Figure 49:
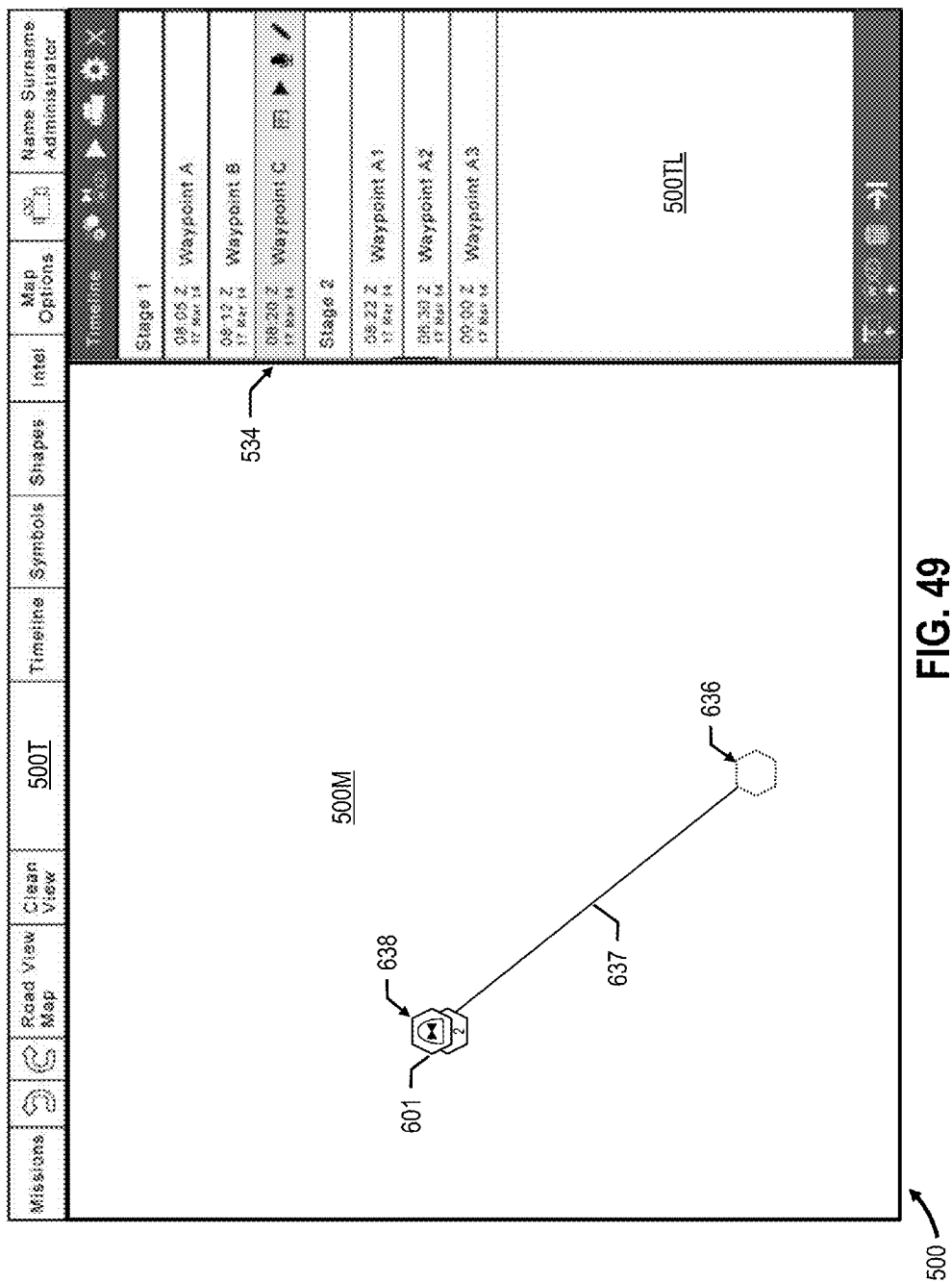
Figure 50:
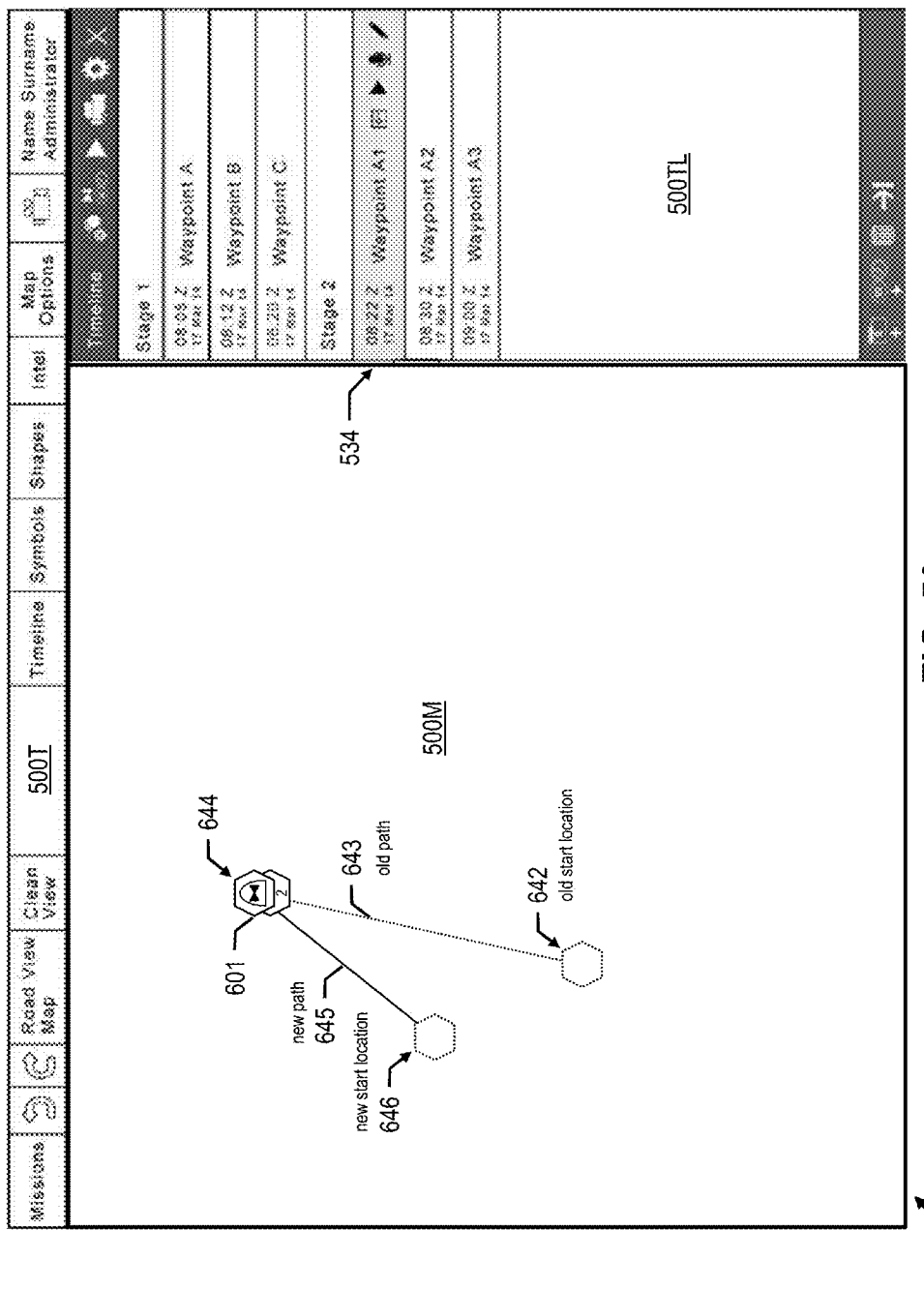

The user first selects the particular waypoint in the timeline panel 500TL, which is then highlighted by the waypoint bar 534. For example, the user may select Waypoint C of Stage 1. In order to move the end location for nested symbol 601 in Waypoint C, the user first selects the path 635, which changes the start location to an "A" symbol and the end location to a "B" symbol, as depicted in FIG. 47. The user may then change the start location 636 and/or the end location 634. For example, if the user desires to change the end location 634, the user selects, drags and drops the symbol B from the old end location 634 to the new end location 638, which creates a new path 637, as depicted in FIG. 48. After the changes are saved, the regular display of nested symbol 601 is restored, as depicted in FIG. 49. Importantly, the start location and path for symbol 601 in the succeeding Waypoint A1 of the succeeding Stage 2 is changed to reflect the new end location in Waypoint C. As depicted in FIG. 50, the old start location 642 is changed to the new start location 646, which is the new end location 638, and the old path 643 is changed to the new path 645.

Figure 51:
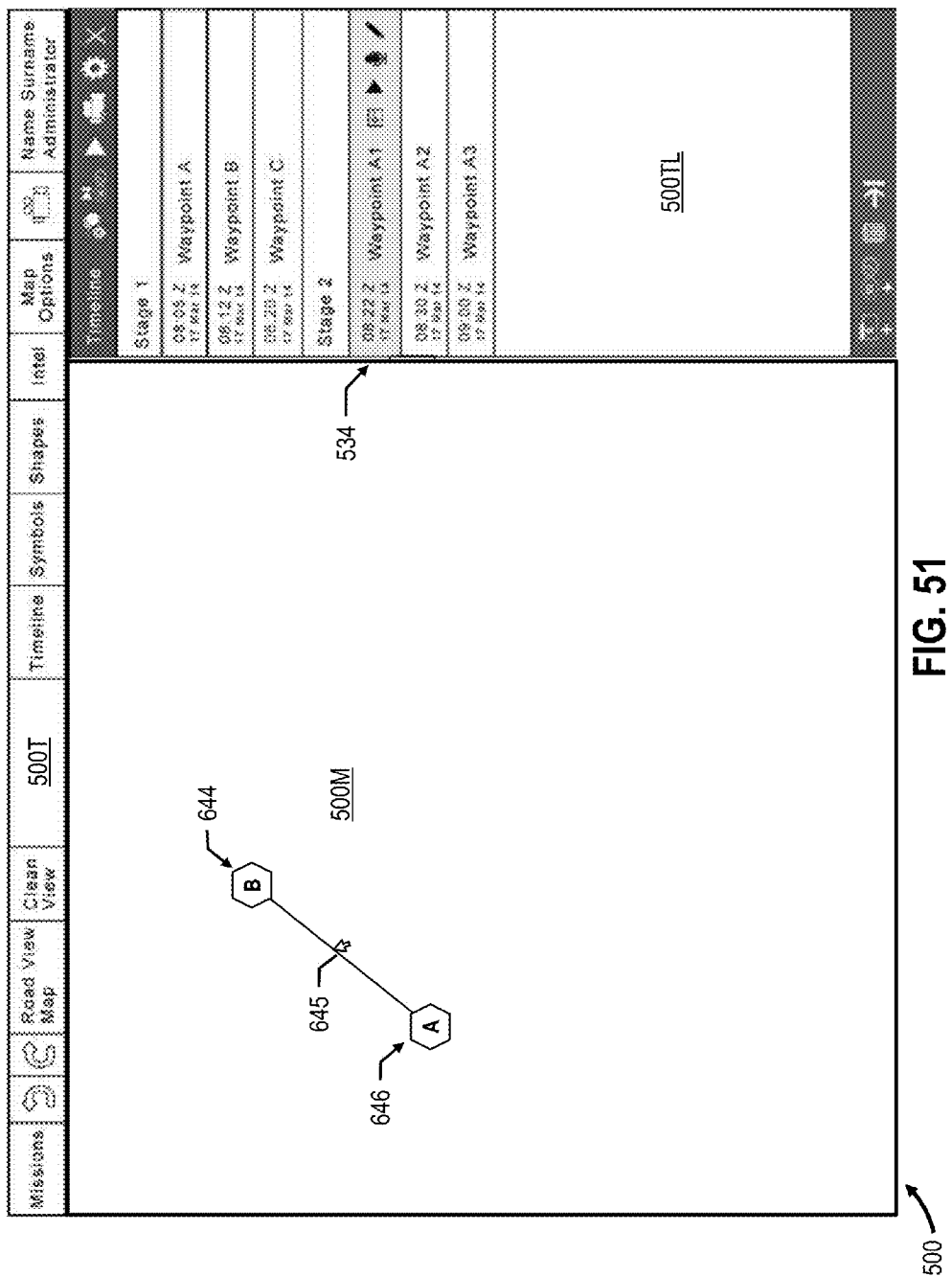
Figure 52:
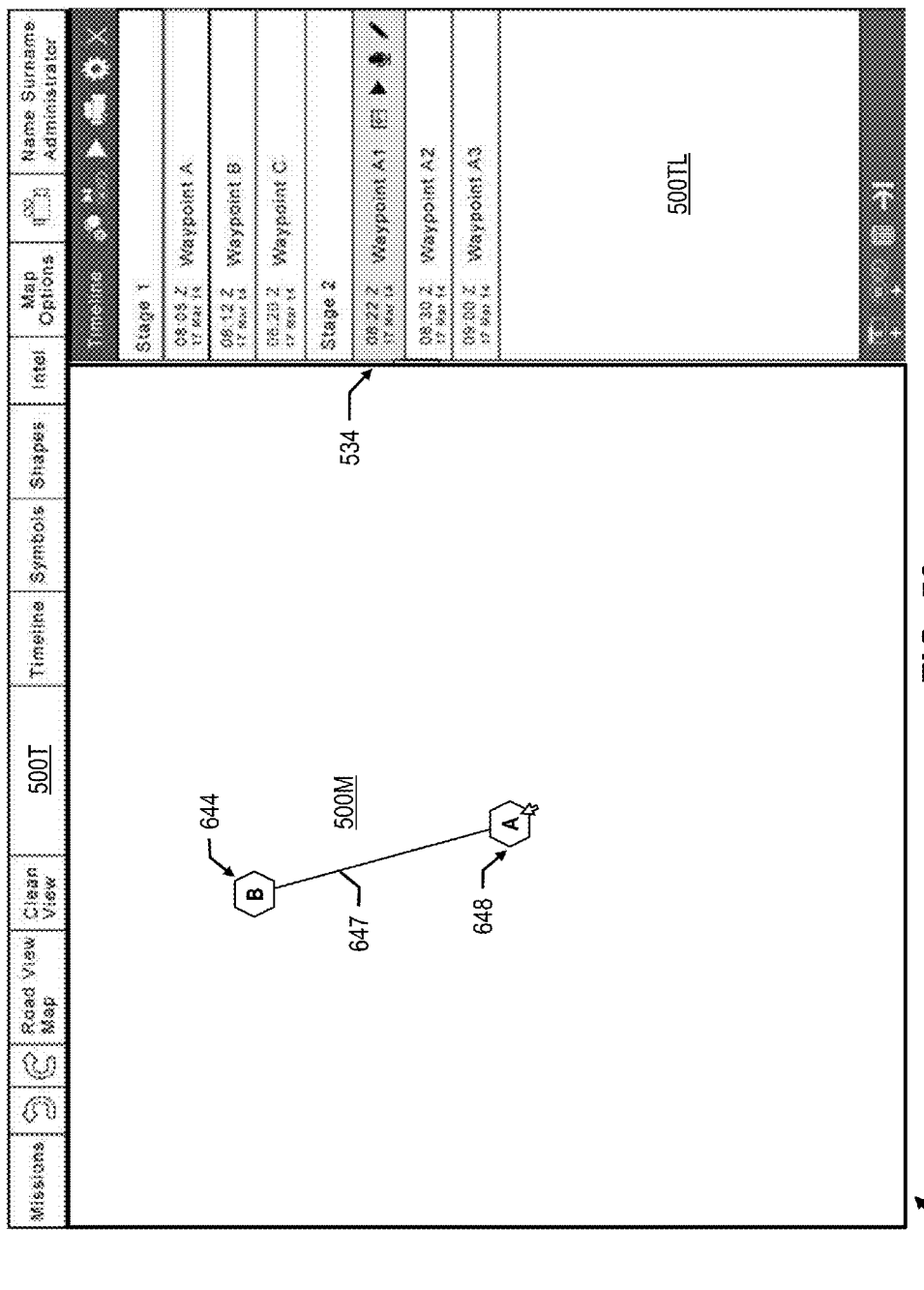
Figure 53:
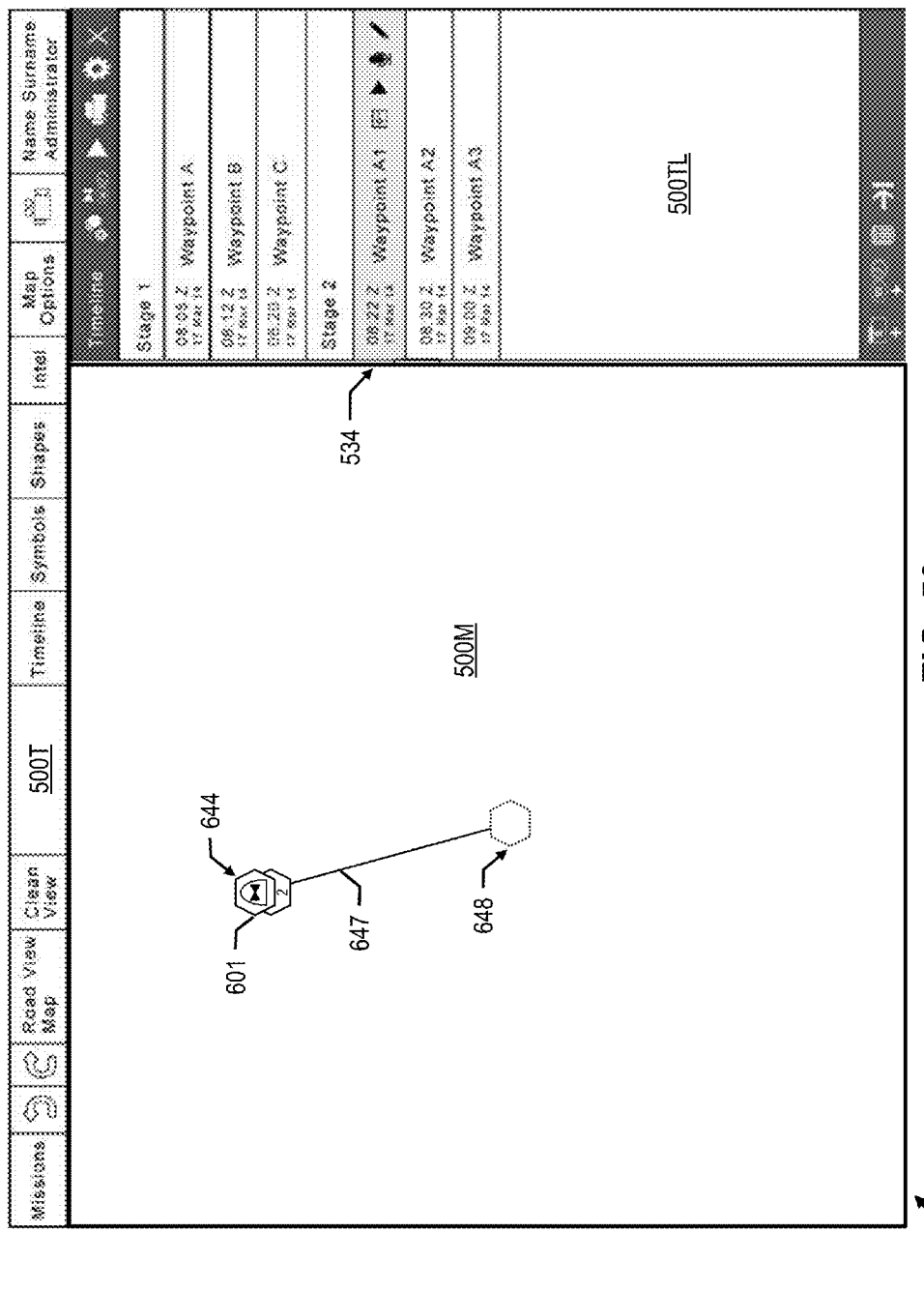
Figure 54:
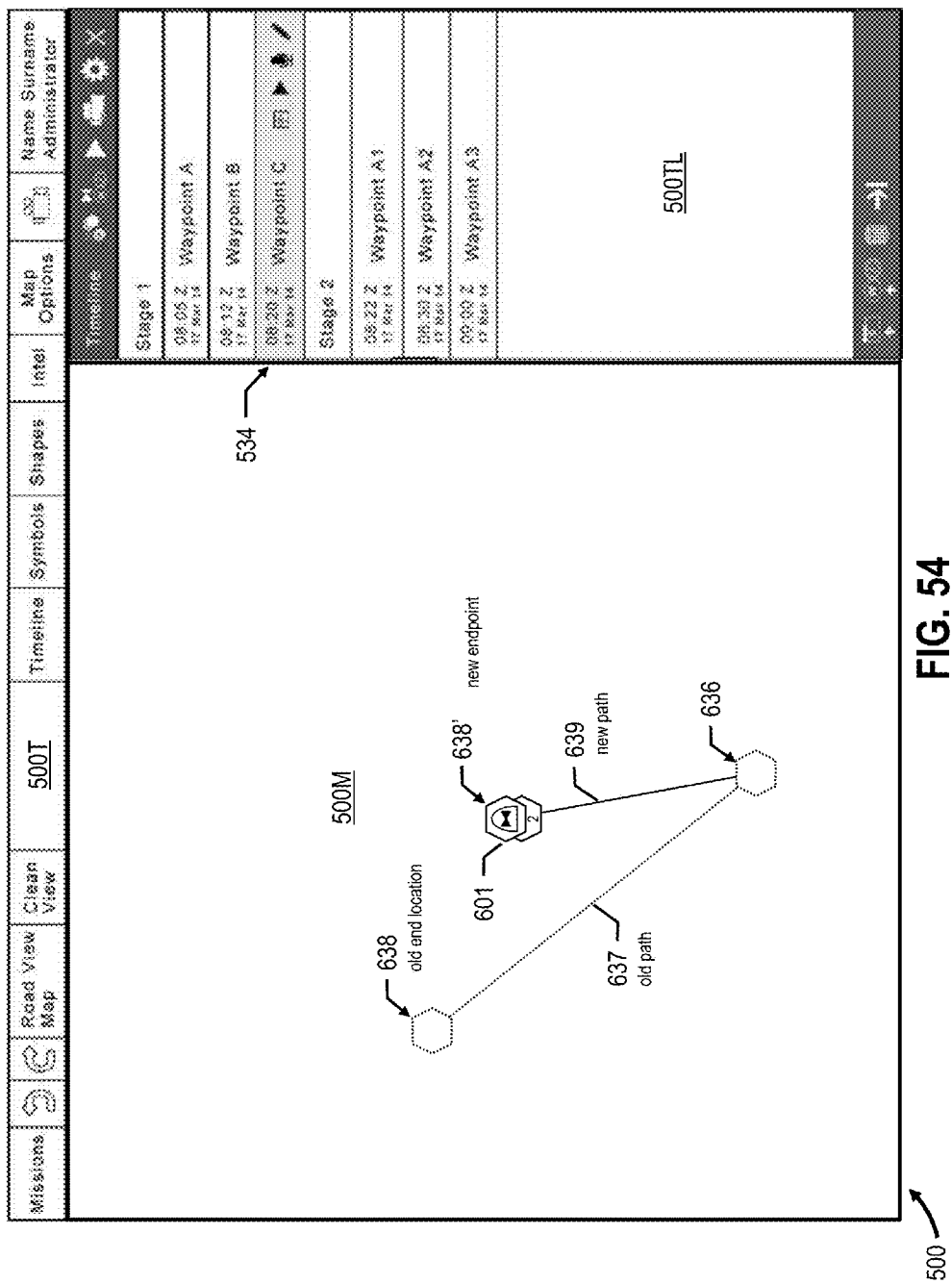

In a further example, the user first selects the particular waypoint in the timeline panel 500TL, which is then highlighted by the waypoint bar 534. For example, the user may select Waypoint A1 of Stage 2. In order to move the start location for nested symbol 601 in Waypoint A1, the user first selects the path 645, which changes the start location to an "A" symbol and the end location to a "B" symbol, as depicted in FIG. 51. The user may then change the start location 646 by selecting, dragging and dropping the symbol A from the old start location 646 to the new start location 648, which creates a new path 647, as depicted in FIG. 52. After the changes are saved, the regular display of nested symbol 601 is restored, as depicted in FIG. 53. Importantly, the end location and path for nested symbol 601 in the preceding Waypoint C of Stage 1 is changed to reflect the new start location for nested symbol 601 in Waypoint A1 of Stage 2. As depicted in FIG. 54, the old end location 638 is changed to the new end location 638', which is the new start location 648, and the old path 637 is changed to the new path 639.

When a user desires to un-nest a nested symbol in a particular waypoint, the mission planner module 230 advantageously allows the user to un-nest the nested symbol without the need to delete every stage and waypoint that succeeds that particular waypoint, and then recreate those deleted stages and waypoints after the nested symbol has been un-nested. Instead, the mission planner module 230 un-nests the symbols, and adds the un-nested symbols to the subsequent waypoints of the stage, and to each waypoint of each subsequent stage.

Figure 55:
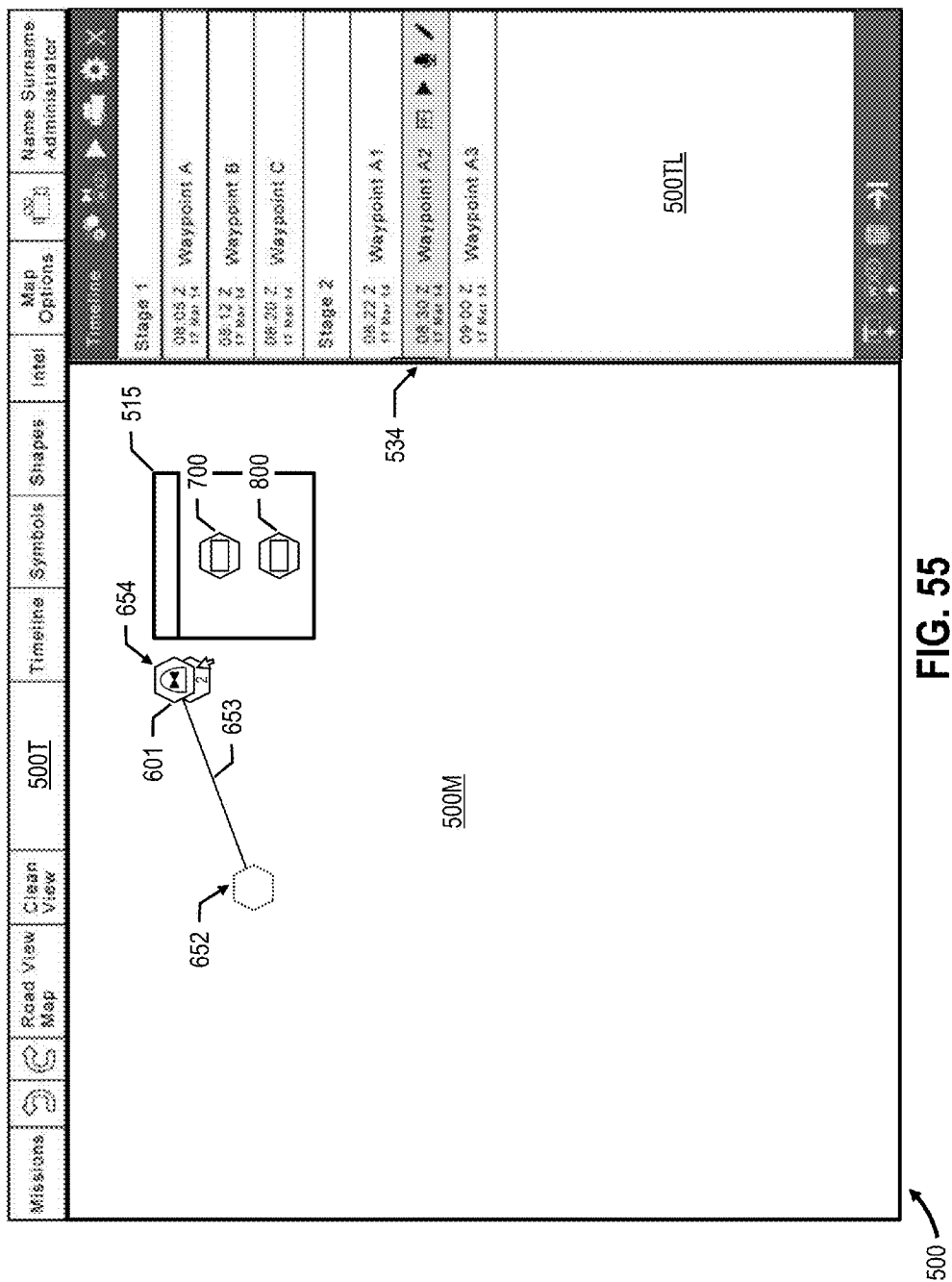
FIGS. 55-60 present a series of plan edit screens depicting the un-nesting of several symbols, in accordance with an embodiment of the present invention.
Figure 56:
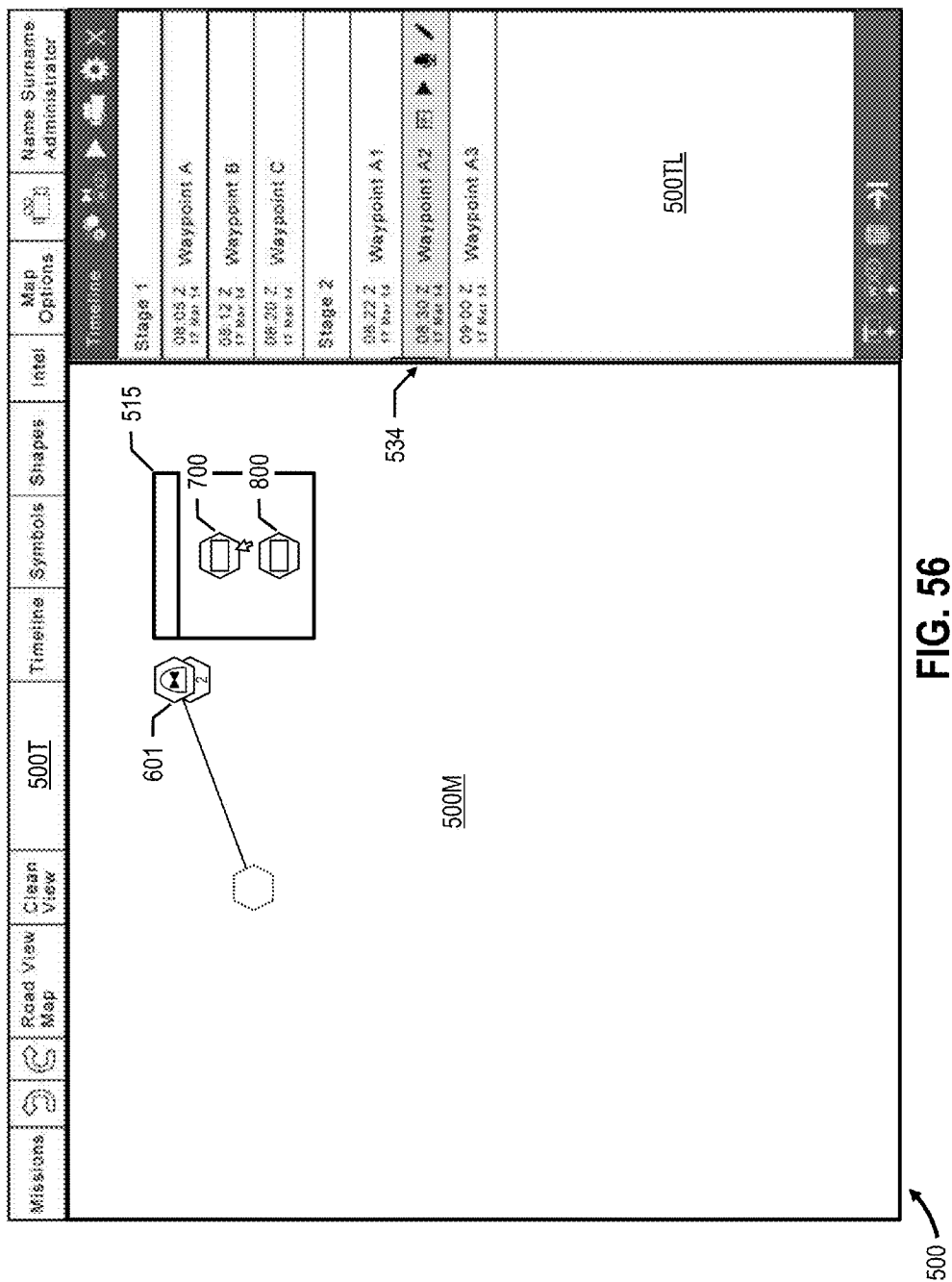
Figure 57:
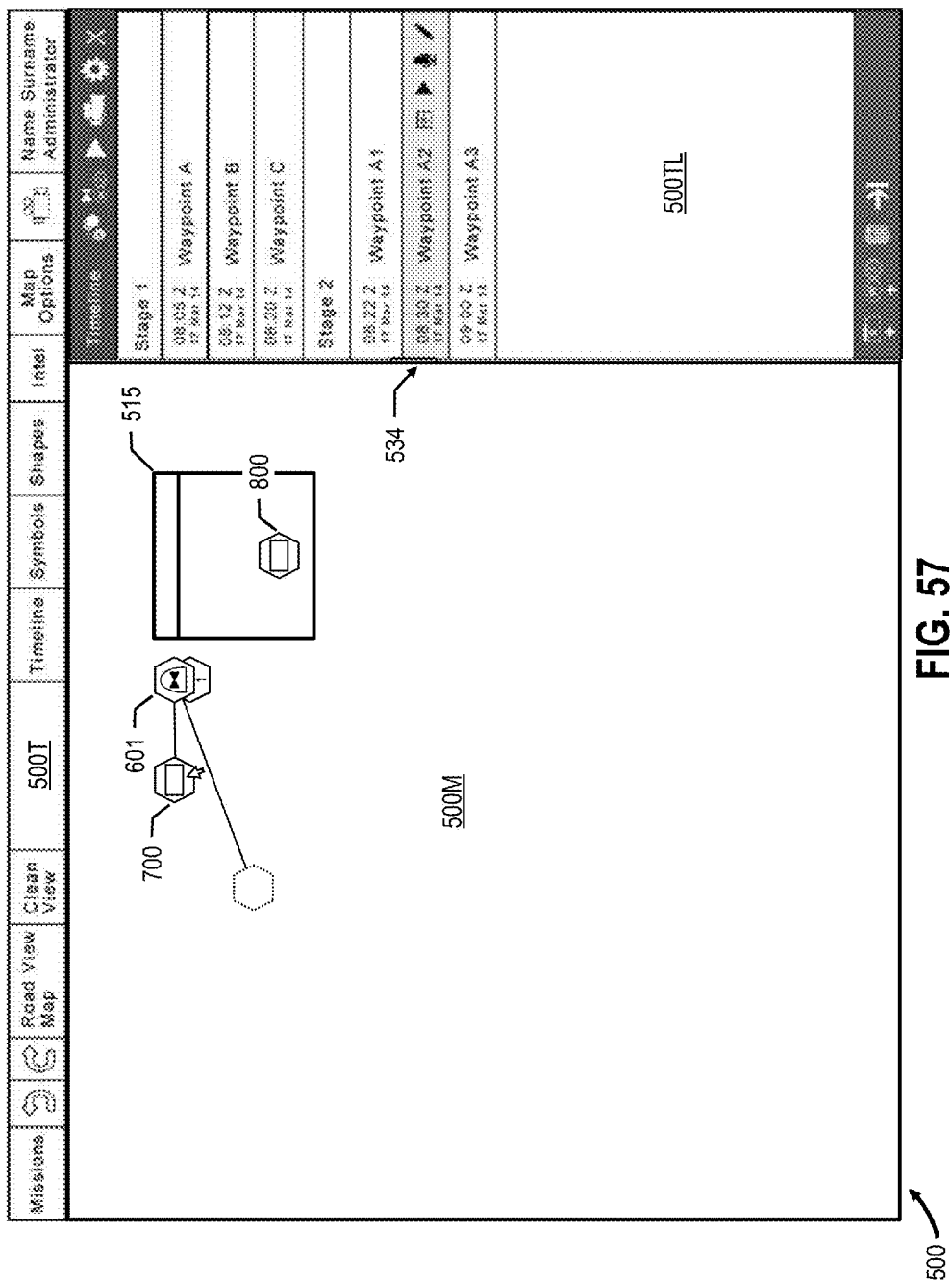
Figure 58:
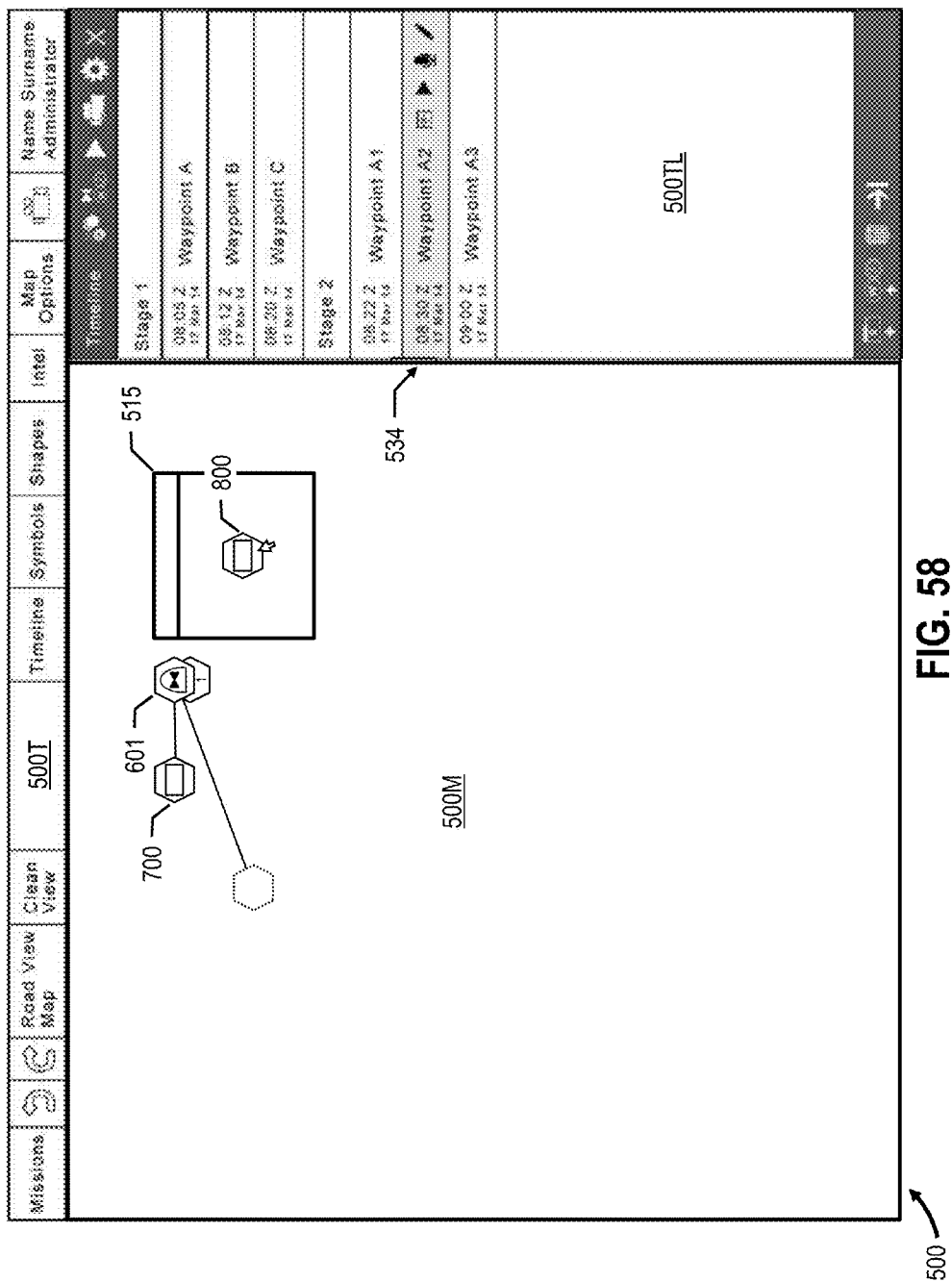
Figure 59:
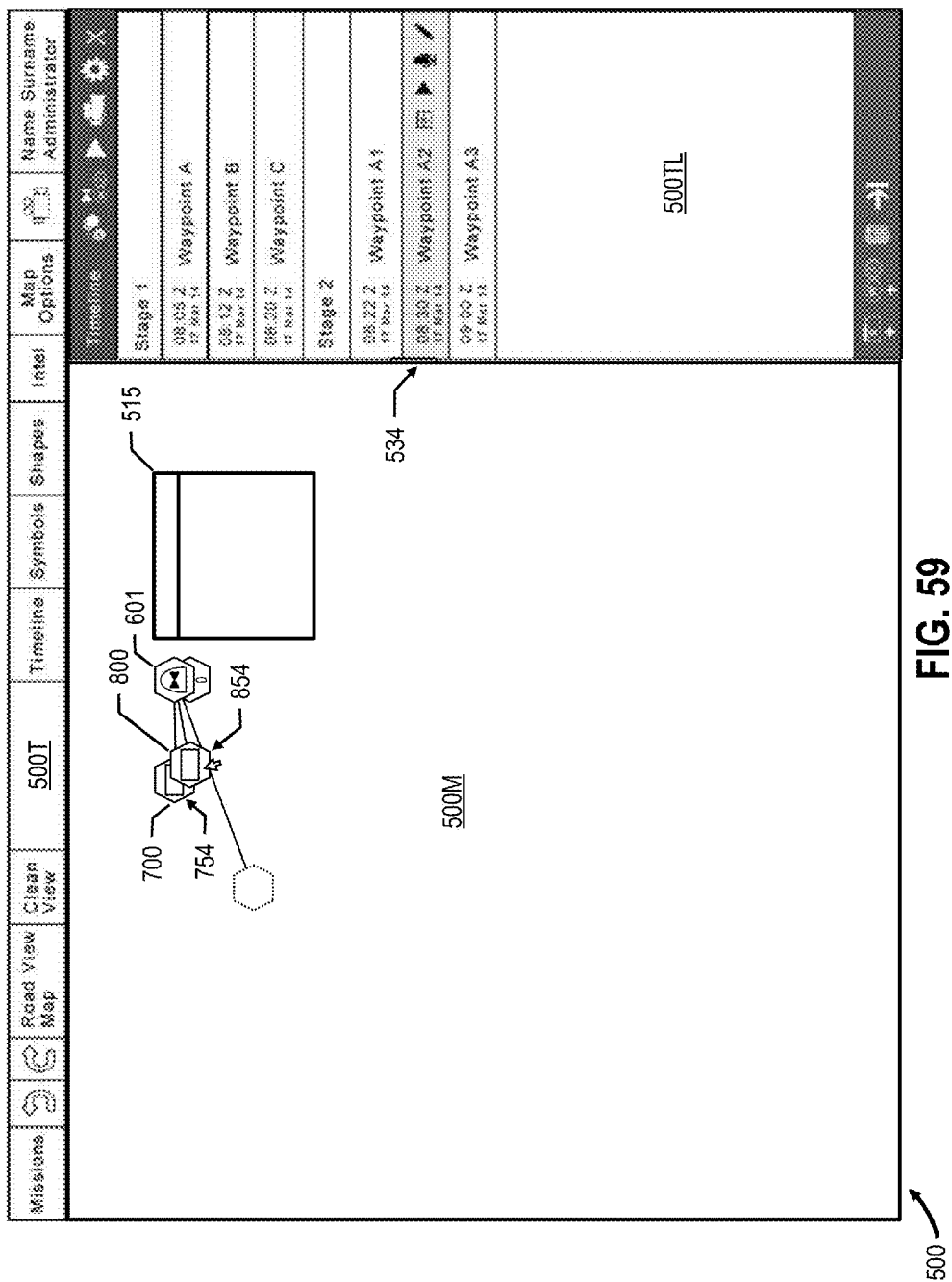
Figure 60:
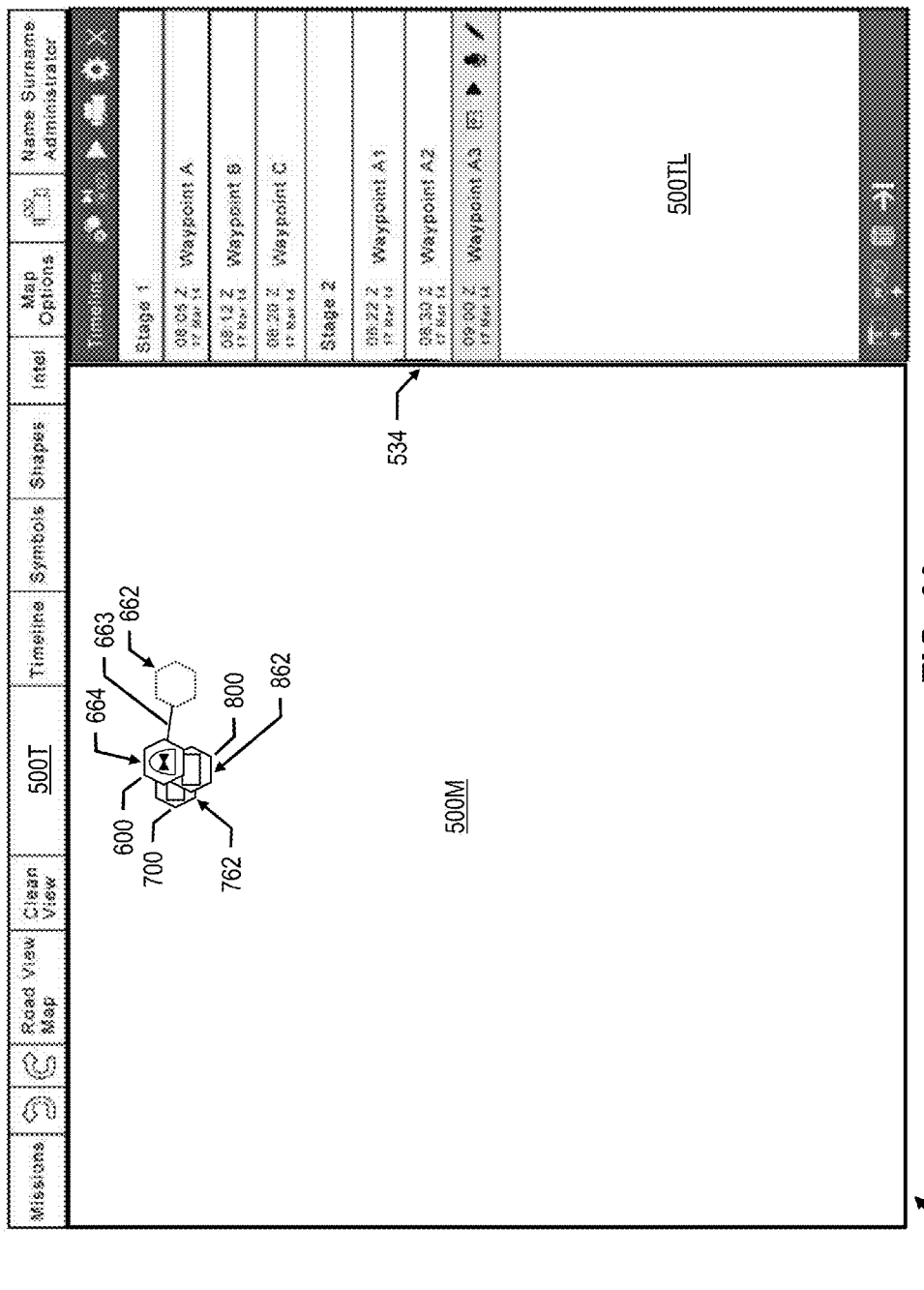

The user first selects the particular waypoint in the timeline panel 500TL, which is then highlighted by the waypoint bar 534. For example, the user may select Waypoint A2 of Stage 2, and then access the symbol context menu 515 for the nested symbol 601, as depicted in FIG. 55. The symbols 700 and 800, nested within nested symbol 601, are depicted within the symbol context menu 515, and can be selected, dragged and dropped onto the map by the user. As depicted in FIG. 56, the user selects symbol 700, and then drags and drops symbol 700 onto the map, as depicted in FIG. 57. As depicted in FIG. 58, the user then selects symbol 800, and then drags and drops symbol 800 onto the map, as depicted in FIG. 59. The end locations 754 and 854, for symbols 700 and 800, respectively, are depicted. Waypoint A3 of Stage 2 is depicted in FIG. 60, in which the nested symbol 601 has changed back to symbol 600, and the symbols 700 and 800 are located at start locations 762 and 862, respectively.

In one embodiment, a computer-based method for planning a mission is provided. The method includes providing a graphical user interface (GUI) to a client computer, the GUI including a mission center screen and a plan edit screen, the mission center screen having a mission panel and a plan panel, and the plan edit screen having at least one map layer, an application toolbar and a mission element panel; in response to a sequence of requests from the client computer, creating a mission including a plan having a plurality of sequential stages, each stage having a plurality of sequential waypoints, each waypoint having a plurality of symbols and associated movement paths along the map layer; in response to a further request from the client computer, updating the plan by changing the movement path end location associated with a symbol in a waypoint of a stage, and changing the movement path start location associated with the symbol in either the subsequent waypoint of the stage or the first waypoint of the subsequent stage, in response to a further request from the client computer, updating the plan by changing the movement path start location associated with a symbol in a waypoint of a stage, and changing the movement path end location associated with the symbol in either the preceding waypoint of the stage or the last waypoint of the preceding stage, and providing the updated plan to the client computer.

In another embodiment, the mission is created in response to a sequence of collaborative requests from two or more client computers, and the updated plan is provided to each client computer.

In another embodiment, the method also includes, in response to a further request from the client computer, updating the plan by adding a symbol to a waypoint of a stage, adding the symbol to each successive waypoint of the stage, and adding the symbol to each waypoint of each successive stage; and providing the updated plan to the client computer.

In another embodiment, each symbol has a type, and the method also includes, in response to a further request from the client computer, updating the plan by hierarchically nesting a plurality of selected symbols in a waypoint of a stage based on symbol type, adding the nested symbols to each successive waypoint of the stage, and adding the nested symbols to each waypoint of each successive stage; and providing the updated plan to the client computer.

In another embodiment, the method also includes, in response to a further request from the client computer, updating the plan by changing the movement path end location associated with the nested symbols in a waypoint of a stage, and changing the movement path start location associated with the nested symbols in either the subsequent waypoint of the stage or the first waypoint of the subsequent stage, in response to a further request from the client computer, updating the plan by changing the movement path start location associated with the nested symbols in a waypoint of a stage, and changing the movement path end location associated with the nested symbols in either the preceding waypoint of the stage or the last waypoint of the preceding stage, and providing the updated plan to the client computer.

In another embodiment, the method also includes, in response to a further request from the client computer, updating the plan by un nesting at least one of a plurality of nested symbols in a waypoint of a stage, adding the un nested symbol to each successive waypoint of the stage; and adding the un nested symbol to each waypoint of each successive stage, and providing the updated plan to the client computer.

In another embodiment, hierarchically nesting the plurality of symbols includes arranging the nested symbols according to a hierarchical rule set, and preventing the nesting of a particular symbol if a rule is violated.

In an alternative embodiment, a plan may be comprised of a single timeline containing one or more layers, each layer having a plurality of symbols and associated movement paths along the map layer, each movement path having a start location and an end location. Business rules defined within the system will automatically determine duration of a symbol's movement, for example, a jet traveling from point A to point B will take X amount of time, given the speed, weight and distance travelled. Additional factors such as weather and terrain may be considered by the system in projecting travel time. Layer duration is comprised of the totality of time required to complete all movements and actions of symbols within the layer. Unlike previously described embodiments of the system, in this embodiment, time becomes the main building block with respect to plan creation, as opposed to Stages and Waypoints. In this embodiment, Stages and Waypoints become markers in time used for identification of milestones within the layer. Layers also provide granular access control for extended collaboration of plan creation and development, for example, User A has access to Layer A of Plan A, while user B has access to Layer B of Plan A.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A system for planning missions, comprising:
at least one client computer coupled to a network; and
a server, coupled to the network, including a processor coupled to a memory storing instructions that, when executed by the processor, perform a method for planning missions, the planning comprising:
providing a graphical user interface (GUI) to the client computer, the GUI including a mission center screen and a plan edit screen, the mission center screen having a mission panel and a plan panel, and the plan edit screen having at least a map layer and a mission element panel,
in response to a sequence of requests from the client computer, creating a mission including a plan having a plurality of sequential stages, each stage having a plurality of sequential waypoints, each waypoint having a plurality of symbols and associated movement paths along the map layer, each movement path having a start location and an end location,
in response to a further request from the client computer, updating the plan by changing the movement path end location associated with a symbol in a waypoint of a stage, and changing the movement path start location associated with the symbol in either the subsequent waypoint of the stage or the first waypoint of the subsequent stage,
in response to a further request from the client computer, updating the plan by changing the movement path start location associated with a symbol in a waypoint of a stage, and changing the movement path end location associated with the symbol in either the preceding waypoint of the stage or the last waypoint of the preceding stage, and
providing the updated plan to the client computer.

2. The system according to claim 1, wherein the mission is created in response to a sequence of collaborative requests from two or more client computers, and the updated plan is provided to each client computer.

3. The system according to claim 1, wherein the planning further comprises:
in response to a further request from the client computer, updating the plan by adding a symbol to a waypoint of a stage, adding the symbol to each successive waypoint of the stage, and adding the symbol to each waypoint of each successive stage; and
providing the updated plan to the client computer.

4. The system according to claim 1, wherein each symbol has a type, and the planning further comprises:
in response to a further request from the client computer, updating the plan by hierarchically nesting a plurality of selected symbols in a waypoint of a stage based on symbol type, adding the nested symbols to each subsequent waypoint of the stage, and adding the nested symbols to each waypoint of each subsequent stage; and
providing the updated plan to the client computer.

5. The system according to claim 4, wherein the planning further comprises:
in response to a further request from the client computer, updating the plan by changing the movement path end location associated with the nested symbols in a waypoint of a stage, and changing the movement path start location associated with the nested symbols in either the subsequent waypoint of the stage or the first waypoint of the subsequent stage;
in response to a further request from the client computer, updating the plan by changing the movement path start location associated with the nested symbols in a waypoint of a stage, and changing the movement path end location associated with the nested symbols in either the preceding waypoint of the stage or the last waypoint of the preceding stage; and providing the updated plan to the client computer.

6. The system according to claim 4, wherein the planning further comprises:

in response to a further request from the client computer, updating the plan by un-nesting at least one of a plurality of nested symbols in a waypoint of a stage, adding the un-nested symbol to each successive waypoint of the stage, and adding the un-nested symbol to each waypoint of each successive stage, and providing the updated plan to the client computer.

7. The system according to claim 4, wherein hierarchically nesting the plurality of symbols includes arranging the nested symbols according to a hierarchical rule set, and preventing the nesting of a particular symbol if a rule is violated.

8. A computer-based method for planning a mission, comprising:

providing a graphical user interface (GUI) to a client computer, the GUI including a mission center screen and a plan edit screen, the mission center screen having a mission panel and a plan panel, and the plan edit screen having at least one map layer, an application toolbar and a mission element panel;

in response to a sequence of requests from the client computer, creating a mission including a plan having a plurality of sequential stages, each stage having a plurality of sequential waypoints, each waypoint having a plurality of symbols and associated movement paths along the map layer;

in response to a further request from the client computer, updating the plan by changing the movement path end location associated with a symbol in a waypoint of a stage, and changing the movement path start location associated with the symbol in either the subsequent waypoint of the stage or the first waypoint of the subsequent stage;

in response to a further request from the client computer, updating the plan by changing the movement path start location associated with a symbol in a waypoint of a stage, and changing the movement path end location associated with the symbol in either the preceding waypoint of the stage or the last waypoint of the preceding stage; and providing the updated plan to the client computer.

9. The method according to claim 8, wherein the mission is created in response to a sequence of collaborative requests from two or more client computers, and the updated plan is provided to each client computer.

10. The method according to claim 8, further comprising:

in response to a further request from the client computer, updating the plan by adding a symbol to a waypoint of a stage, adding the symbol to each successive waypoint of the stage, and adding the symbol to each waypoint of each successive stage; and providing the updated plan to the client computer.

11. The method according to claim 8, wherein each symbol has a type, and the method further comprises:

in response to a further request from the client computer, updating the plan by hierarchically nesting a plurality of selected symbols in a waypoint of a stage based on symbol type, adding the nested symbols to each successive waypoint of the stage, and adding the nested symbols to each waypoint of each successive stage; and providing the updated plan to the client computer.

12. The method according to claim 11, further comprising:

in response to a further request from the client computer, updating the plan by changing the movement path end location associated with the nested symbols in a waypoint of a stage, and changing the movement path start location associated with the nested symbols in either the subsequent waypoint of the stage or the first waypoint of the subsequent stage;

in response to a further request from the client computer, updating the plan by changing the movement path start location associated with the nested symbols in a waypoint of a stage, and changing the movement path end location associated with the nested symbols in either the preceding waypoint of the stage or the last waypoint of the preceding stage; and providing the updated plan to the client computer.

13. The method according to claim 11, further comprising:

in response to a further request from the client computer, updating the plan by un-nesting at least one of a plurality of nested symbols in a waypoint of a stage, adding the un-nested symbol to each successive waypoint of the stage, and adding the un-nested symbol to each waypoint of each successive stage, and providing the updated plan to the client computer.

14. The method according to claim 11, wherein hierarchically nesting the plurality of symbols includes arranging the nested symbols according to a hierarchical rule set, and preventing the nesting of a particular symbol if a rule is violated.

15. A non-transitory computer-readable medium including instructions stored thereon, the instructions, when executed by a processor, perform a method for planning a mission, the planning comprising:

providing a graphical user interface (GUI) to a client computer, the GUI including a mission center screen and a plan edit screen, the mission center screen having a mission panel and a plan panel, and the plan edit screen having at least one map layer, an application toolbar and a mission element panel;

in response to a sequence of requests from the client computer, creating a mission including a plan having a plurality of sequential stages, each stage having a plurality of sequential waypoints, each waypoint having a plurality of symbols and associated movement paths along the map layer;

in response to a further request from the client computer, updating the plan by changing the movement path end location associated with a symbol in a waypoint of a stage, and changing the movement path start location associated with the symbol in either the subsequent waypoint of the stage or the first waypoint of the subsequent stage;

in response to a further request from the client computer, updating the plan by changing the movement path start location associated with a symbol in a waypoint of a stage, and changing the movement path end location associated with the symbol in either the preceding waypoint of the stage or the last waypoint of the preceding stage; and providing the updated plan to the client computer.

16. The computer-readable medium according to claim 15, wherein the planning further comprises:

in response to a further request from the client computer, updating the plan by adding a symbol to a waypoint of a stage, adding the symbol to each successive waypoint of the stage, and adding the symbol to each waypoint of each successive stage; and providing the updated plan to the client computer.

17. The computer-readable medium according to claim 15, wherein each symbol has a type, and the planning further comprises:
   in response to a further request from the client computer, updating the plan by hierarchically nesting a plurality of selected symbols in a waypoint of a stage based on symbol type, adding the nested symbols to each successive waypoint of the stage, and adding the nested symbols to each waypoint of each successive stage; and
   providing the updated plan to the client computer.

18. The computer-readable medium according to claim 17, wherein the planning further comprises:
   in response to a further request from the client computer, updating the plan by changing the movement path end location associated with the nested symbols in a waypoint of a stage, and changing the movement path start location associated with the nested symbols in either the subsequent waypoint of the stage or the first waypoint of the subsequent stage;
   in response to a further request from the client computer, updating the plan by changing the movement path start location associated with the nested symbols in a waypoint of a stage, and changing the movement path end location associated with the nested symbols in either the preceding waypoint of the stage or the last waypoint of the preceding stage; and
   providing the updated plan to the client computer.

19. The computer-readable medium according to claim 17, wherein the planning further comprises:
   in response to a further request from the client computer, updating the plan by un-nesting at least one of a plurality of nested symbols in a waypoint of a stage, adding the un-nested symbol to each successive waypoint of the stage, and adding the un-nested symbol to each waypoint of each successive stage, and
   providing the updated plan to the client computer.

20. The computer-readable medium according to claim 17, wherein hierarchically nesting the plurality of symbols includes arranging the nested symbols according to a hierarchical rule set, and preventing the nesting of a particular symbol if a rule is violated.

* * * * *